US012591346B2

(12) United States Patent
Lim

(10) Patent No.: US 12,591,346 B2
(45) Date of Patent: Mar. 31, 2026

(54) ELECTRONIC DEVICE

(71) Applicant: Samsung Display Co., Ltd., Yongin-si (KR)

(72) Inventor: Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/018,098

(22) Filed: Jan. 13, 2025

(65) Prior Publication Data

US 2025/0264969 A1    Aug. 21, 2025

(30) Foreign Application Priority Data

Feb. 21, 2024    (KR) ........................ 10-2024-0024697

(51) Int. Cl.
| | |
|---|---|
| *G06F 3/046* | (2006.01) |
| *G06F 3/041* | (2006.01) |
| *H02J 50/00* | (2016.01) |
| *H02J 50/10* | (2016.01) |

(52) U.S. Cl.
CPC ............ *G06F 3/046* (2013.01); *G06F 3/0412* (2013.01); *G06F 3/04162* (2019.05); *H02J 50/005* (2020.01); *H02J 50/10* (2016.02)

(58) Field of Classification Search
CPC .... G06F 3/046; G06F 3/04162; G06F 3/0412; H02J 50/10; H02J 50/005
See application file for complete search history.

(56) References Cited

U.S. PATENT DOCUMENTS

| | | | |
|---|---|---|---|
| 5,657,011 A | 8/1997 | Komatsu et al. | |
| 8,466,692 B2 | 6/2013 | Chen et al. | |
| 9,081,447 B2 | 7/2015 | Ishizaki et al. | |
| 9,772,660 B2 | 9/2017 | Ryu | |
| 2011/0080249 A1* | 4/2011 | Hsu | G06F 3/046 |
| | | | 336/225 |
| 2014/0078104 A1* | 3/2014 | Lee | G06F 3/0446 |
| | | | 345/174 |
| 2022/0367576 A1* | 11/2022 | Lee | G06F 3/0446 |

FOREIGN PATENT DOCUMENTS

| | | | | |
|---|---|---|---|---|
| CN | 107015698 A | 8/2017 | | |
| CN | 216083667 U | 3/2022 | | |
| CN | 218768118 U | 3/2023 | | |
| EP | 2713250 A1 | 4/2014 | | |
| JP | 8-249105 A | 9/1996 | | |
| KR | 10-2012-0018711 A | 3/2012 | | |
| KR | 10-2014-0035789 A | 3/2014 | | |
| KR | 10-2015-0004579 A | 1/2015 | | |
| KR | 20240104629 A | * | 7/2024 | ............. H02J 50/12 |

OTHER PUBLICATIONS

International Search Report mailed Apr. 21, 2025, corresponding to PCT/KR2025/001020, 9 pages.

* cited by examiner

*Primary Examiner* — Lisa S Landis

(74) *Attorney, Agent, or Firm* — Womble Bond Dickinson (US) LLP

(57) ABSTRACT

An electronic device includes: a display layer; a sensor layer over the display layer; and a lower conductive layer under the sensor layer, and including: first coils spaced from one another along a first direction; second coils spaced from one another along the first direction, each of the second coils crossing two first coils adjacent to each other from among the first coils; and connecting pins connecting ends of the first coils and ends of the second coils to one another.

32 Claims, 39 Drawing Sheets

DBP1

COL14

COL23

COL13

COL22

COL12

COL21

COL11

MOP2

P6

P5

P4

P3

P2

P1

MOP1

ELECTRONIC DEVICE

CROSS-REFERENCE TO RELATED APPLICATION

The present application claims priority to and the benefit of Korean Patent Application No. 10-2024-0024697, filed on Feb. 21, 2024, in the Korean Intellectual Property Office, the entire disclosure of which is incorporated by reference herein.

BACKGROUND

Aspects of embodiments of the present disclosure relate to an electronic device for sensing an input by a pen.

Multimedia electronic devices, such as televisions, mobile phones, tablet computers, notebook computers, car navigation units, game machines, and the like, include a display device for displaying an image. The electronic devices may include a sensor layer (e.g., an input sensor) capable of providing a touch-based input method that enables a user to intuitively and conveniently input information or instructions in an easy and simple manner, in addition to other input methods, such as a button, a keyboard, a mouse, or the like. The sensor layer may sense the user's touch or pressure. Meanwhile, pens for users who are accustomed to inputting information using writing instruments or pens for more accurate touch inputs in specific application programs (e.g., application programs for sketching or drawing) have been increasingly demanded.

The above information disclosed in this Background section is for enhancement of understanding of the background of the present disclosure, and therefore, it may contain information that does not constitute prior art.

SUMMARY

One or more embodiments of the present disclosure may be directed to an electronic device for sensing an input by a pen.

According to one or more embodiments of the present disclosure, an electronic device includes: a display layer; a sensor layer over the display layer; and a lower conductive layer under the sensor layer, and including: first coils spaced from one another along a first direction; second coils spaced from one another along the first direction, each of the second coils crossing two first coils adjacent to each other from among the first coils; and connecting pins connecting ends of the first coils and ends of the second coils to one another.

In an embodiment, a first-first coil from among the two first coils may include: a first-first extension part extending in a second direction crossing the first direction; a first-second extension part spaced from the first-first extension part in the first direction; and a first-first connecting part connecting the first-first extension part and the first-second extension part to each other. A first-second coil from among the two first coils may include: a second-first extension part extending in the second direction crossing the first direction; a second-second extension part spaced from the second-first extension part in the first direction; and a first-second connecting part connecting the second-first extension part and the second-second extension part to each other. Each of the second coils may include: a third extension part extending in the second direction crossing the first direction; a fourth extension part spaced from the third extension part in the first direction; and a second connecting part connecting the third extension part and the fourth extension part to each other.

In an embodiment, the first-second extension part and the third extension part may be connected to a first connecting pin from among the connecting pins, and the second-first extension part and the fourth extension part may be connected to a second connecting pin from among the connecting pins.

In an embodiment, the second connecting part may cross the first-second extension part and the second-first extension part.

In an embodiment, the second connecting part may include: a plurality of body portions; and a bridge portion electrically connecting the body portions to each other. The body portions, the first-second extension part, and the second-first extension part may be located on a first layer, and the bridge portion may be located on a second layer different from the first layer.

In an embodiment, the sensor layer may include: a sensor base layer; and a conductive layer on the sensor base layer. The bridge portion may be located on the sensor base layer.

In an embodiment, a gap between the second-first extension part and the second-second extension part may be equal to a gap between the third extension part and the fourth extension part.

In an embodiment, a gap between the first-first extension part and the first-second extension part may be equal to at least one of a gap between the third extension part and the fourth extension part or a gap between the second-first extension part and the second-second extension part.

In an embodiment, a first sub-gap between the first-second extension part and the third extension part may be equal to a second sub-gap between the second-first extension part and the fourth extension part.

In an embodiment, a third sub-gap between the first-second extension part and the second-first extension part may be equal to each of the first and second sub-gaps.

In an embodiment, the lower conductive layer may include: an effective area; and a non-effective area surrounding around the effective area. The first-first connecting part, the first-second connecting part, and the second connecting part may not overlap with the effective area in a plan view, and the connecting pins may not overlap with the effective area in a plan view.

In an embodiment, a first outermost coil adjacent to a first side of the effective area from among the first coils may include a first-first outermost extension part and a first-second outermost extension part, the first-first outermost extension part may not overlap with the effective area, and the first-second outermost extension part may overlap with the effective area. A second outermost coil adjacent to a second side of the effective area from among the first coils may include a second-first outermost extension part and a second-second outermost extension part, the second-first outermost extension part may overlap with the effective area, and the second-second outermost extension part may not overlap with the effective area.

In an embodiment, the connecting pins may include: a first outermost connecting pin connected to the first-first outermost extension part; and a second outermost connecting pin connected to the second-second outermost extension part.

In an embodiment, the lower conductive layer may further include a dummy electrode that may not overlap with the first coils and the second coils.

In an embodiment, the dummy electrode may include a plurality of dummy bar patterns extending in a second direction crossing the first direction, and located along the first direction.

In an embodiment, the dummy electrode may include a plurality of dummy electrode patterns located in a matrix form along the first direction and a second direction crossing the first direction.

In an embodiment, the dummy electrode may be configured to be electrically floated.

In an embodiment, the lower conductive layer may further include: third coils spaced from one another along a second direction crossing the first direction; fourth coils spaced from one another along the second direction, each of the fourth coils crossing two third coils adjacent to each other from among the third coils; and connecting pins connecting ends of the third coils and ends of the fourth coils to one another.

In an embodiment, the third coils and the fourth coils may cross the first coils and the second coils.

In an embodiment, the lower conductive layer may be located under the display layer.

In an embodiment, the lower conductive layer may be located between the display layer and the sensor layer.

In an embodiment, the sensor layer may include: a plurality of first electrodes along the first direction, and extending in a second direction crossing the first direction; a plurality of second electrodes along the second direction, and extending in the first direction; a plurality of third electrodes along the first direction, extending in the second direction, and overlapping with the plurality of first electrodes; and a plurality of fourth electrodes along the second direction, extending in the first direction, and overlapping with the plurality of second electrodes.

In an embodiment, the electronic device may further include a sensor driver configured to drive the sensor layer, and the sensor driver may be configured to selectively operate in a first mode to sense a touch input, or in a second mode to sense an input of a pen. The second mode may include: a sensing driving mode in which the sensor layer is configured to sense the input of the pen; and a charging driving mode in which the lower conductive layer is configured to charge the pen.

In an embodiment, the electronic device may further include a sensor driver configured to drive the lower conductive layer, and the sensor driver may be configured to operate in a sensing driving mode to sense an input of a pen, or in a charging driving mode to charge the pen. The sensor driver may be configured to alternately drive the lower conductive layer in the sensing driving mode and the charging driving mode.

In an embodiment, the sensor driver may include: a charging circuit configured to apply a first charging signal to one of two connecting pins selected from among the connecting pins, and apply a second charging signal to another one of the two connecting pins in the charging driving mode; a sensor circuit electrically connected to the connecting pins, and configured to sense currents induced in the first and second coils by the pen in the sensing driving mode; first switching elements between the connecting pins and the charging circuit; and second switching elements between the connecting pins and the sensor circuit.

In an embodiment, the first and second charging signals may be alternating current signals having opposite phases from each other.

According to one or more embodiments of the present disclosure, an electronic device includes: a display layer; a sensor layer over the display layer; a lower conductive layer under the sensor layer; and a sensor driver configured to drive the sensor layer and the lower conductive layer, and operate in a pen sensing mode. The lower conductive layer includes: first coils spaced from one another along a first direction; second coils spaced from one another along the first direction, each of the second coils crossing two first coils adjacent to each other from among the first coils; and connecting pins connecting ends of the first coils and ends of the second coils to each other. The pen sensing mode includes: a sensing driving mode in which the sensing layer is configured to sense an input of a pen; and a charging driving mode in which the lower conductive layer is configured to charge the pen.

In an embodiment, the sensor layer may include: a plurality of first electrodes along the first direction, and extending in a second direction crossing the first direction; a plurality of second electrodes along the second direction, and extending in the first direction; a plurality of third electrodes along the first direction, extending in the second direction, and overlapping with the plurality of first electrodes; and a plurality of fourth electrodes along the second direction, extending in the first direction, and overlapping with the plurality of second electrodes.

In an embodiment, the sensor driver may be configured to additionally operate in a touch sensing mode to sense a touch input, the sensor driver may be configured to sense the touch input using the first and second electrodes in the touch sensing mode, and the sensor driver may be configured to sense the input of the pen using the third and fourth electrodes in the sensing driving mode.

In an embodiment, the sensor driver may include: a charging circuit configured to apply a first charging signal to one of two connecting pins selected from the connecting pins, and apply a second charging signal to another one of the two connecting pins, in the charging driving mode; a sensor circuit electrically connected to the connecting pins, and configured to sense currents induced in the first and second coils by the pen in the sensing driving mode; first switching elements between the connecting pins and the charging circuit; and second switching elements between the connecting pins and the sensor circuit.

In an embodiment, a first-first coil of the two first coils may include: a first-first extension part extending in a second direction crossing the first direction; a first-second extension part spaced from the first-first extension part in the first direction; and a first-first connecting part connecting the first-first extension part and the first-second extension part to each other. A first-second coil of the two first coils may include: a second-first extension part extending in the second direction crossing the first direction; a second-second extension part spaced from the second-first extension part in the first direction; and a first-second connecting part connecting the second-first extension part and the second-second extension part to each other. Each of the second coils may include: a third extension part extending in the second direction crossing the first direction; a fourth extension part spaced from the third extension part in the first direction; and a second connecting part connecting the third extension part and the fourth extension part to each other.

In an embodiment, the first-second extension part and the third extension part may be connected to a first connecting pin from among the connecting pins, and the second-first extension part and the fourth extension part may be connected to a second connecting pin from among the connecting pins.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 8A is a schematic plan view illustrating a lower conductive layer according to an embodiment of the present disclosure.

FIG. 15 is a plan view illustrating a lower conductive layer according to an embodiment of the present disclosure.

DETAILED DESCRIPTION

Figure 1A:
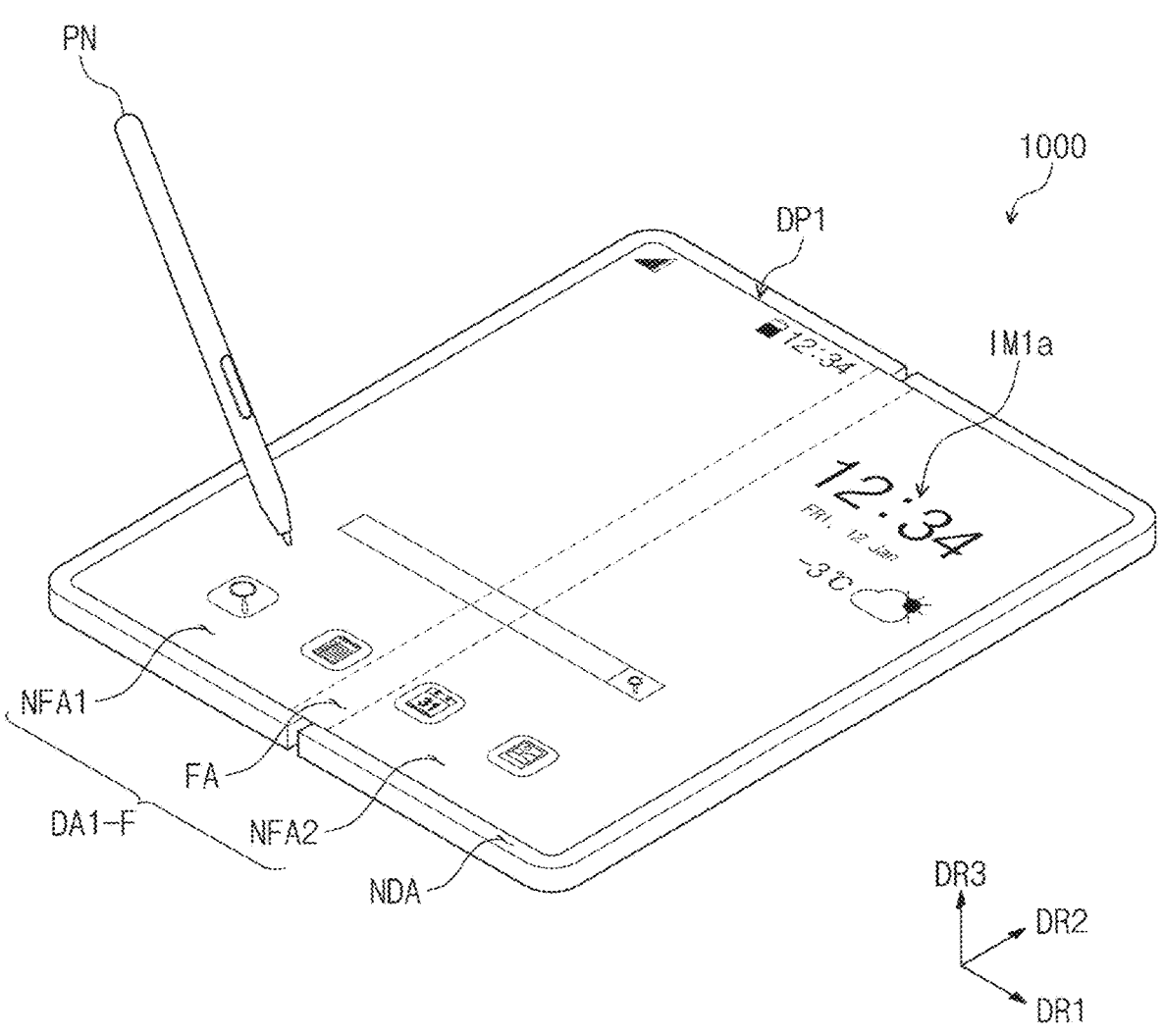
FIG. 1A is a perspective view of an electronic device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
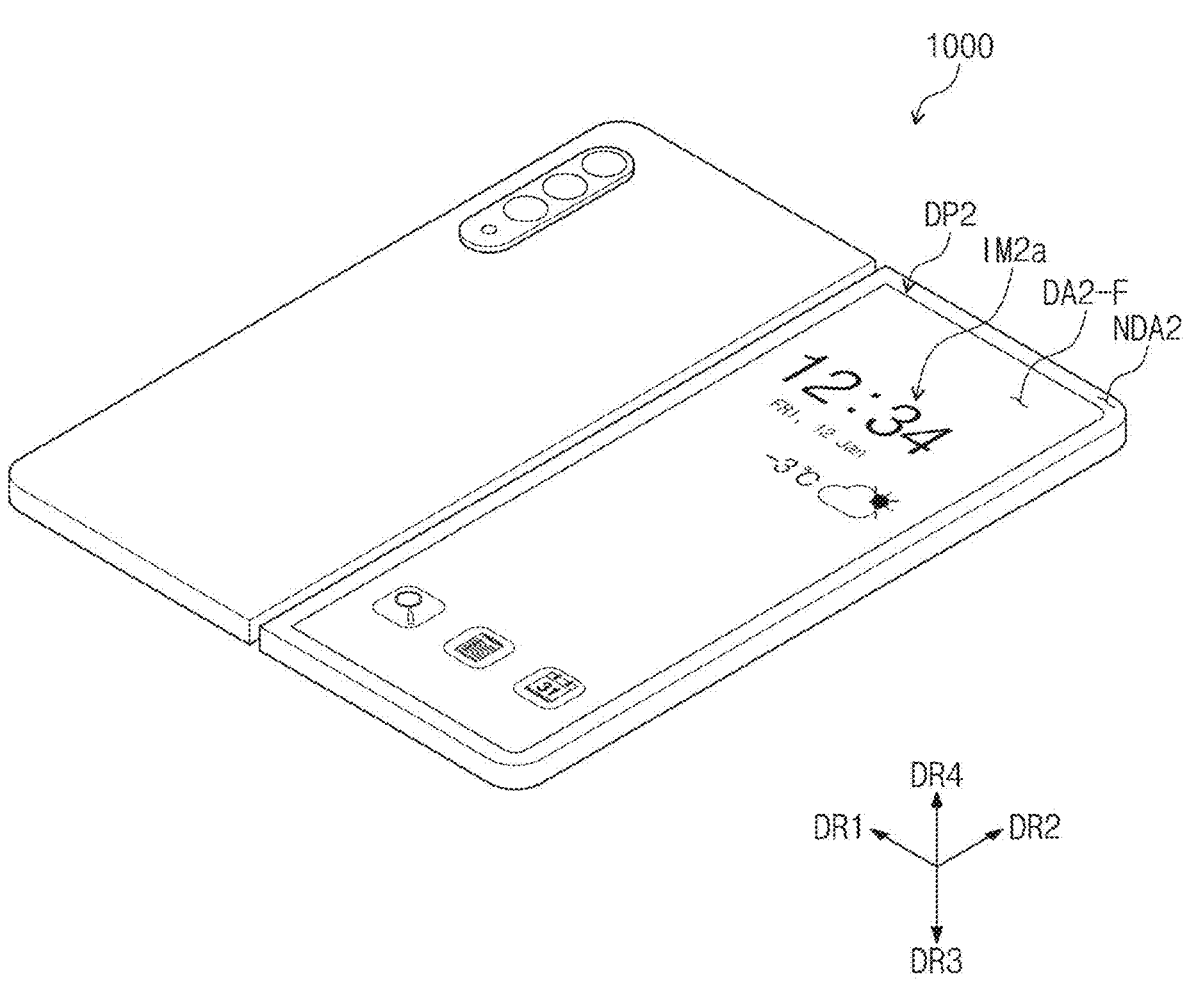
FIG. 1B is a rear perspective view of the electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be activated depending on an electrical signal. For example, the electronic device 1000 may display an image, and may sense an input (e.g., an external input) applied from the outside. The external input may be a user input. The user input may include various suitable kinds of external inputs, such as a part of a user's body, a pen PN, light, heat, or pressure.

The electronic device 1000 may include a first display panel DP1 and a second display panel DP2. The first display panel DP1 and the second display panel DP2 may be separate panels that are distinct (e.g., that are separated) from each other. The first display panel DP1 may be referred to as a main display panel, and the second display panel DP2 may be referred to as an auxiliary display panel or an external display panel.

The first display panel DP1 includes a first display part DA1-F (e.g., referred to as a display area) and a first non-display part NDA1 (e.g., referred to as a non-display area) that surrounds (e.g., around a periphery of) the first display part DA1-F. The second display panel DP2 includes a second display part DA2-F, and a second non-display part NDA2 surrounding (e.g., around a periphery of) the second display part DA2-F. The second display panel DP2 may have a smaller area than the that of first display panel DP1. The area of the first display part DA1-F may be greater than the area of the second display part DA2-F to correspond to the sizes of the first display panel DP1 and the second display panel DP2.

In an unfolded state of the electronic device 1000, the first display part DA1-F may have a plane that is parallel to or substantially parallel to a first direction DR1 and a second direction DR2. A thickness direction of the electronic device 1000 may be parallel to or substantially parallel to a third direction DR3 that crosses the first direction DR1 and the second direction DR2. Accordingly, front surfaces (e.g., upper surfaces) and rear surfaces (e.g., lower surfaces) of the members constituting the electronic device 1000 may be defined based on the third direction DR3.

The first display panel DP1 or the first display part DA1-F may include a folding area FA that may be folded and unfolded, and a plurality of non-folding areas NFA1 and NFA2 spaced apart from each other with the folding area FA therebetween. The second display panel DP2 may overlap with one of the plurality of non-folding areas NFA1 and NFA2. For example, the second display panel DP2 may overlap with the first non-folding area NFA1.

A display direction of a first image IM1a displayed on a portion of the first display panel DP1, for example, such as on the first non-folding area NFA1, may be opposite to a display direction of a second image IM2a displayed on the second display panel DP2. For example, the first image IM1a may be displayed in the third direction DR3, and the second image IM2a may be displayed in a fourth direction DR4 opposite to the third direction DR3.

In an embodiment of the present disclosure, the folding area FA may be bent about a folding axis extending in a direction parallel to or substantially parallel to the long sides of the electronic device 1000, for example, such as in a direction parallel to or substantially parallel to the second direction DR2. The folding area FA has a curvature (e.g., a certain or predetermined curvature) and a radius of curvature (e.g., a certain or predetermined radius of curvature) in a folded state of the electronic device 1000. The electronic device 1000 may be folded in an in-folding manner, such that the first non-folding area NFA1 and the second non-folding area NFA2 face each other and the first display part DA1-F is not exposed to the outside.

In an embodiment of the present disclosure, the electronic device 1000 may be folded in an out-folding manner, such that the first display part DA1-F is exposed to the outside. In an embodiment of the present disclosure, the electronic device 1000 may be folded in an in-folding manner and/or an out-folding manner from the unfolded state. However, the present disclosure is not limited thereto.

Although FIG. 1A illustrates an example in which one folding area FA is defined in the electronic device 1000, the present disclosure is not limited thereto. For example, a plurality of folding axes and a plurality of folding areas corresponding thereto may be defined in the electronic device 1000. In this case, the electronic device 1000 may be folded about the plurality of folding axes in an in-folding manner and/or an out-folding manner from the unfolded state.

According to an embodiment of the present disclosure, at least one of the first display panel DP1 or the second display panel DP2 may sense an input by the pen PN even without using or including a digitizer. Because the digitizer for sensing the pen PN may be omitted, an increase in the thickness and the weight of the electronic device 1000, and a decrease in the flexibility of the electronic device 1000 depending on the addition of a digitizer may not occur. Accordingly, not only the first display panel DP1, but also the second display panel DP2, may be configured to sense the pen PN.

Figure 2:
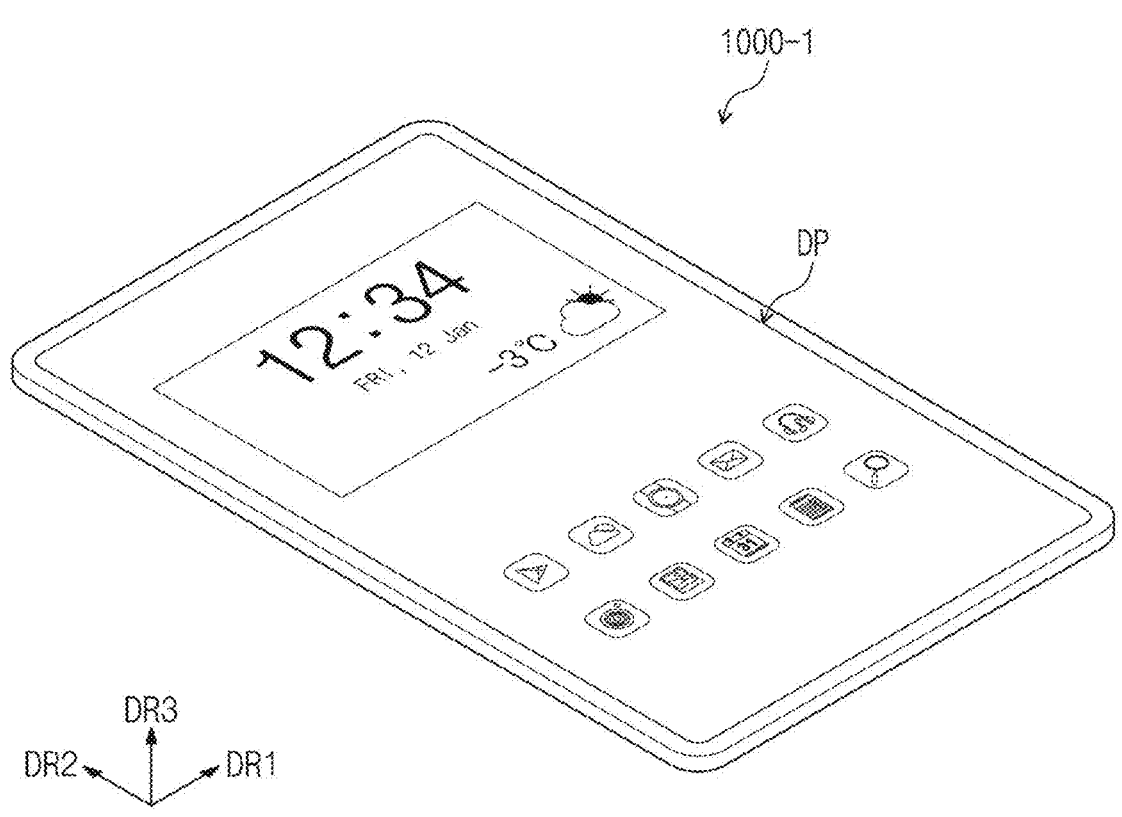
FIG. 2 is a perspective view of an electronic device according to an embodiment of the present disclosure.
Figure 3:
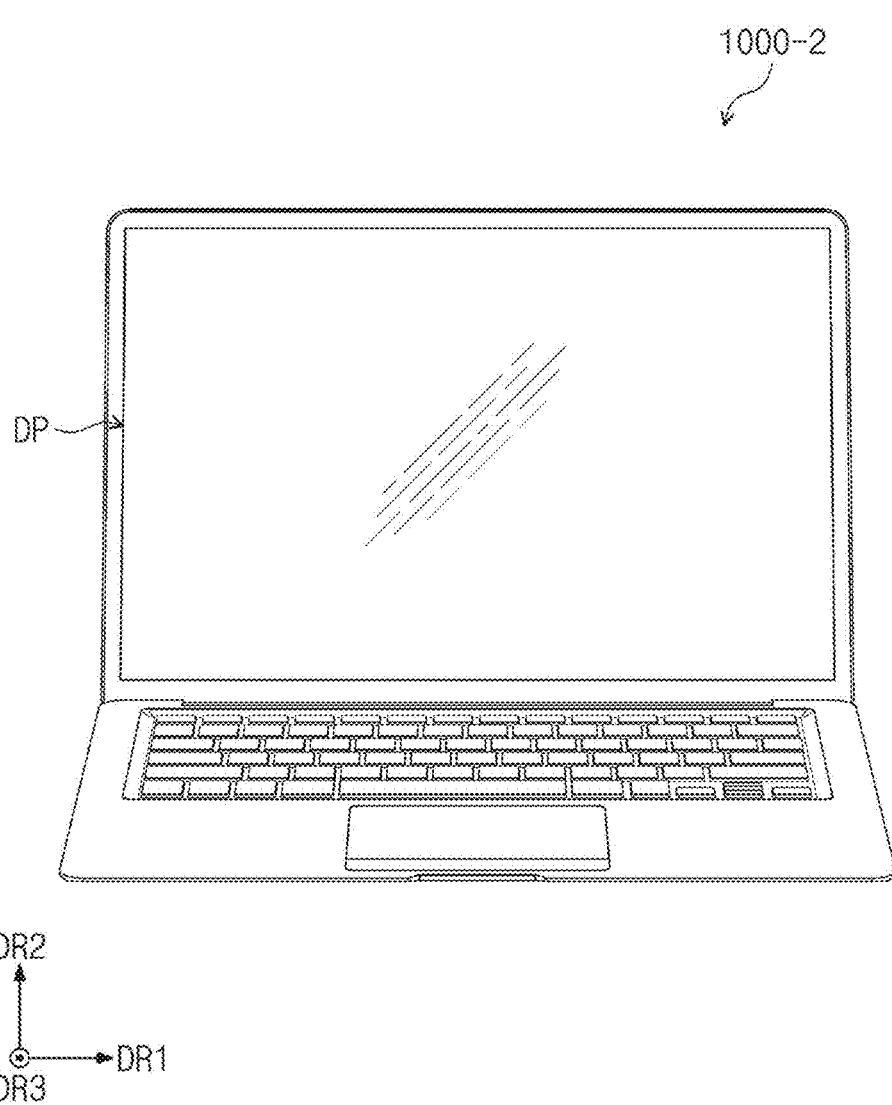
FIG. 3 is a perspective view of an electronic device according to an embodiment of the present disclosure.

FIG. 2 is a perspective view of an electronic device 1000-1 according to an embodiment of the present disclosure. FIG. 3 is a perspective view of an electronic device 1000-2 according to an embodiment of the present disclosure.

FIG. 2 illustrates an example in which the electronic device 1000-1 is a mobile phone, and the electronic device 1000-1 may include a display panel DP. FIG. 3 illustrates an example in which the electronic device 1000-2 is a notebook computer, and the electronic device 1000-2 may include a display panel DP.

In an embodiment of the present disclosure, the display panel DP may sense an input (e.g., an external input) applied from the outside. The external input may be a user input. The user input may include various suitable kinds of external inputs, such as a part of the user's body, the pen PN (e.g., refer to FIG. 1A), light, heat, or pressure.

According to an embodiment of the present disclosure, the display panel DP may sense an input by the pen PN even without using or including a digitizer. Because the digitizer for sensing the pen PN may be omitted, an increase in the thickness and the weight of the electronic device 1000-1 or 1000-2 depending on the addition of a digitizer may not occur.

Although a foldable electronic device 1000 is illustrated in FIG. 1A and a bar-kind of electronic device 1000-1 is illustrated in FIG. 2, the present disclosure is not limited thereto. For example, various suitable electronic devices, such as a rollable electronic device, a slidable electronic device, and a stretchable electronic device, may be applied to some embodiments of the present disclosure described herein.

FIGS. 4A through 4D are sectional views of the electronic device 1000 according to an embodiment of the present disclosure. The sectional views illustrated in FIGS. 4A to 4D may be sectional views illustrating a portion of the electronic device 1000 that includes the first display panel DP1 described above with reference to FIG. 1A.

Figure 4A:
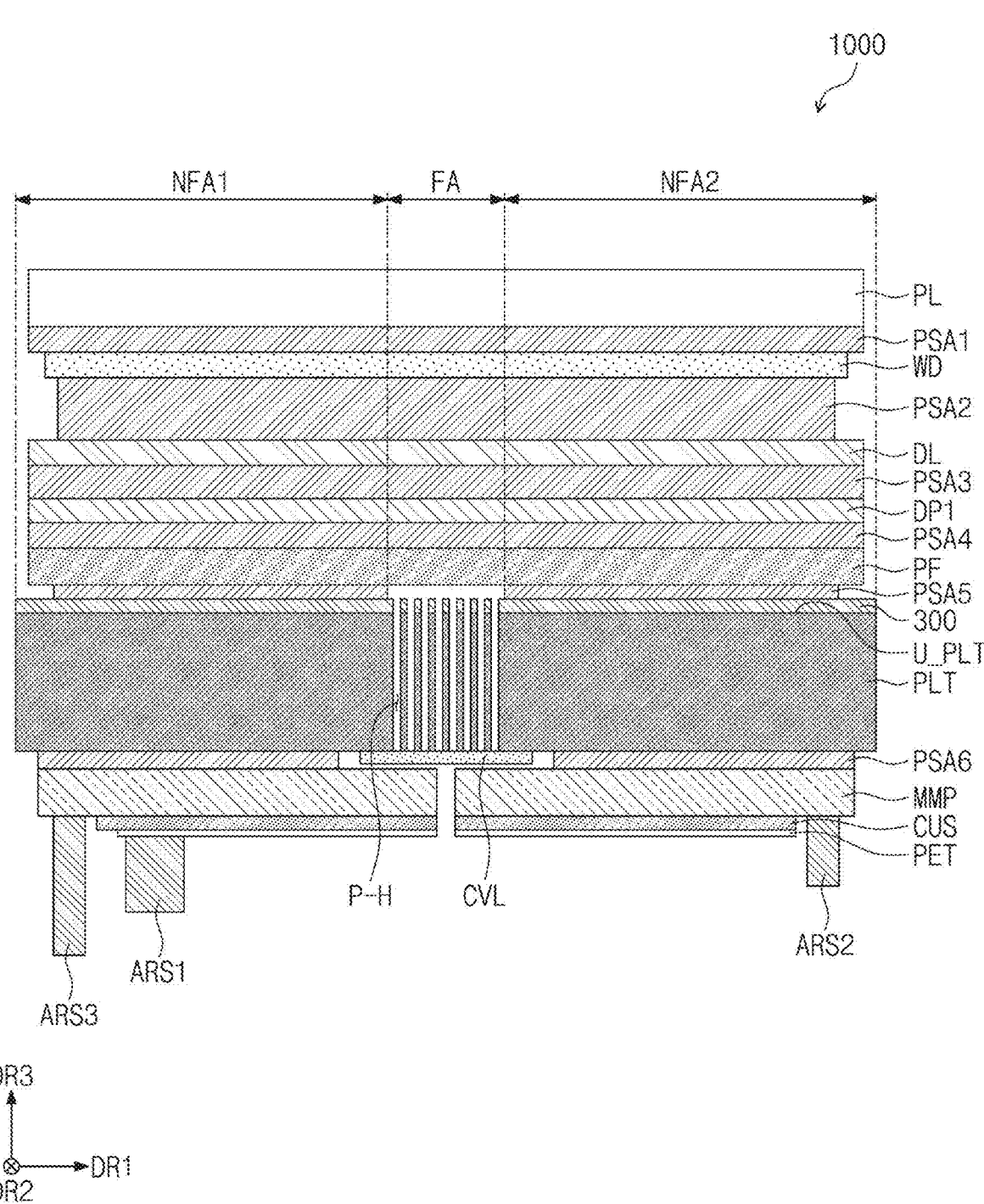
FIGS. 4A-4D are sectional views of an electronic device according to an embodiment of the present disclosure.

Referring to FIG. 4A, the electronic device 1000 may include the first display panel DP1, upper functional layers, and lower functional layers. The upper functional layers may include components that are disposed on the first display panel DP1, and the lower functional layers may include components that are disposed under the first display panel DP1.

The first display panel DP1 may be a component that generates an image, and senses an input applied from the outside. For example, the first display panel DP1 may include a display layer 100 (e.g., refer to FIG. 5), and a sensor layer 200.

The upper functional layers may include a protective layer PL, a window WD, an impact absorbing layer DL, and first to third adhesive layers PSA1, PSA2, and PSA3. The components included in the upper functional layers are not limited thereto. At least some of the aforementioned components may be omitted as needed or desired, and other suitable components may be added.

The protective layer PL may protect the components disposed under the protective layer PL. The protective layer PL may have a thickness of about 60 μm to about 70 μm, for example, such as a thickness of about 65 μm. However, the thickness of the protective layer PL is not limited thereto.

A hard coating layer, an anti-fingerprint layer, and the like may be additionally provided on the protective layer PL to improve various characteristics, such as a chemical resistance, a wear resistance, and the like. For example, the hard coating layer may be a functional layer for improving usage characteristics of the electronic device 1000, and may be provided on the protective layer PL by coating. For example, anti-fingerprint characteristics, anti-contamination characteristics, and anti-scratch characteristics may be improved by the hard coating layer. For example, the hard coating layer may have a thickness of about 5 μm, but the present disclosure is not particularly limited thereto.

The window WD may be disposed under the protective layer PL. The first adhesive layer PSA1 may be disposed between the window WD and the protective layer PL. The first adhesive layer PSA1 may have a thickness of about 30 μm to about 40 μm, for example, such as a thickness of about 35 μm. However, the thickness of the first adhesive layer PSA1 is not limited thereto. In an embodiment of the present disclosure, a bezel pattern may be disposed between the first adhesive layer PSA1 and the protective layer PL.

The window WD may include an optically clear insulating material. For example, the window WD may include a glass substrate or a synthetic resin film. The window WD may have a multi-layered structure or a single-layer structure. For example, the window WD may include a plurality of synthetic resin films that are connected to (e.g., coupled to or attached to) each other through an adhesive, or may include a glass substrate and a synthetic resin film connected to (e.g., coupled to or attached to) each other through an adhesive. When the window WD is a glass substrate, the window WD may have a thickness of about 80 μm or less, for example, such as a thickness of about 30 μm. However, the thickness of the window WD is not limited thereto.

The impact absorbing layer DL may be disposed under the window WD. The second adhesive layer PSA2 may be disposed between the window WD and the impact absorbing layer DL. The second adhesive layer PSA2 may have a thickness of about 70 μm to about 80 μm, for example, such as a thickness of about 75 μm. However, the thickness of the second adhesive layer PSA2 is not limited thereto.

The impact absorbing layer DL may protect the first display panel DP1 by absorbing an impact applied toward the first display panel DP1. The impact absorbing layer DL may be manufactured in the form of a stretchable film. For example, the impact absorbing layer DL may include a flexible plastic material. The flexible plastic material may be defined as a synthetic resin film. For example, the impact absorbing layer DL may include a flexible plastic material, such as polyimide or polyethylene terephthalate. The impact absorbing layer DL may have a thickness of about 18 μm to about 28 μm, for example, such as a thickness of about 23 μm. However, the thickness of the impact absorbing layer DL is not limited thereto. In an embodiment of the present disclosure, the impact absorbing layer DL may be omitted as needed or desired.

The third adhesive layer PSA3 may be disposed between the impact absorbing layer DL and the first display panel DP1. The third adhesive layer PSA3 may have a thickness of about 45 μm to about 55 μm, for example, such as a thickness of about 50 μm. However, the thickness of the third adhesive layer PSA3 is not limited thereto.

The lower functional layers may include a protective film PF, a lower conductive layer 300, a plate PLT, a cover layer CVL, a shielding layer MMP, a lower sheet CUS, an insulating film PET, step compensation members ARS1, ARS2, and ARS3, and fourth to sixth adhesive layers PSA4, PSA5, and PSA6. The components included in the lower functional layers are not limited thereto. At least some of the aforementioned components may be omitted as needed or desired, and other suitable components may be added.

The protective film PF may be connected to (e.g., coupled to or attached to) the rear surface of the first display panel DP1 through the fourth adhesive layer PSA4. The fourth adhesive layer PSA4 may have a thickness of about 20 μm to about 30 μm, for example, such as a thickness of about 25 μm. However, the thickness of the fourth adhesive layer PSA4 is not limited thereto.

The protective film PF may prevent or substantially prevent a scratch from occurring on the rear surface of the first display panel DP1 during a manufacturing process of the first display panel DP1. The protective film PF may include (e.g., may be) a colored polyimide film. For example, the protective film PF may include (e.g., may be) an opaque yellow film, but the present disclosure is not limited thereto. The protective film PF may have a thickness of about 45 μm to about 55 μm, for example, such as a thickness of about 50 μm. However, the thickness of the protective film PF is not limited thereto.

The plate PLT may be disposed under the protective film PF. The fifth adhesive layer PSA5 may be disposed between the plate PLT and the protective film PF. The fifth adhesive layer PSA5 may have a thickness of about 11 μm to about 21 μm, for example, such as a thickness of about 16 μm. However, the thickness of the fifth adhesive layer PSA5 is not limited thereto.

The plate PLT may include a carbon fiber reinforced plastic (CFRP), a metal, or a metal alloy. The plate PLT may support the components disposed thereon. Openings P-H may be defined (e.g., may be formed or provided) in a portion of the plate PLT. For example, the plate PLT may include the openings P-H having a shape penetrating the plate PLT from the upper surface to the lower surface of the plate PLT. The openings P-H may be defined in an area overlapping with the folding area FA. The openings P-H may overlap with the folding area FA when viewed from above the plane (e.g., in a plan view), for example, when viewed in the third direction DR3 or in the thickness direction of the plate PLT. A portion of the plate PLT may be more easily deformed by the openings P-H. The plate PLT may have a thickness of about 160 μm to about 180 μm, for example, such as a thickness of about 170 μm. However, the thickness of the plate PLT is not limited thereto.

The lower conductive layer 300 may be disposed under the first display panel DP1 and over the shielding layer MMP. In an embodiment, the lower conductive layer 300 may be disposed on an upper surface U_PLT of the plate PLT. The lower conductive layer 300 may include patterned electrodes (e.g., referred to as coils) and/or lines. The lower conductive layer 300 may constitute a sensing module SM (e.g., refer to FIGS. 6A to 6C) together with the sensor layer 200 (e.g., refer to FIG. 5) included in the first display panel DP1, which will be described in more detail below. In some embodiments, the lower functional layers may further include an insulating layer disposed between the lower conductive layer 300 and the plate PLT. In some embodiments, the lower functional layers may further include an insulating layer that covers the lower conductive layer 300.

The cover layer CVL may be attached to the plate PLT. The cover layer CVL may cover the openings P-H of the plate PLT. Accordingly, the cover layer CVL may prevent or substantially prevent the infiltration of foreign matter into the openings P-H. The cover layer CVL may include a thermoplastic polyurethane, but the present disclosure is not particularly limited thereto. The cover layer CVL may have a thickness of about 11 μm to about 21 μm, for example, such as a thickness of about 16 μm. However, the thickness of the cover layer CVL is not limited thereto.

The shielding layer MMP may be disposed under the plate PLT and the cover layer CVL. The sixth adhesive layer PSA6 may be disposed between the shielding layer MMP and the plate PLT. The sixth adhesive layer PSA6 may have a thickness of about 15 μm to about 25 μm, for example, such as a thickness of about 20 μm. However, the thickness of the sixth adhesive layer PSA6 is not limited thereto.

The shielding layer MMP may include a magnetic metal powder. The shielding layer MMP may be referred to as a ferrite sheet, a magnetic metal powder layer, a magnetic layer, a magnetic circuit layer, or a magnetic path layer. The shielding layer MMP may shield a magnetic field that may be transmitted through the first display panel DP1. For example, the shielding layer MMP may serve to induce a transmitted magnetic field in another direction. Accordingly, the magnetic field that reaches the shielding layer MMP may be shielded without being leaked to the outside, for example, such as from below the shielding layer MMP. The shielding layer MMP may have a thickness of about 53 μm to about 63 μm, for example, such as a thickness of about 58 μm. However, the thickness of the shielding layer MMP is not limited thereto.

The lower sheet CUS may be disposed under the shielding layer MMP. The lower sheet CUS may serve to reflect a magnetic field toward the shielding layer MMP. The lower sheet CUS may include a metal or a metal alloy. For example, the lower sheet CUS may include aluminum, copper, or a copper alloy. The lower sheet CUS may have a thickness of about 15 μm to about 25 μm, for example, such as a thickness of about 20 μm. However, the thickness of the lower sheet CUS is not limited thereto.

The insulating film PET may be disposed under the lower sheet CUS. The insulating film PET may include polyethylene terephthalate, but is not particularly limited thereto. The insulating film PET may prevent or substantially prevent the introduction of static electricity. For example, the insulating film PET may prevent or substantially prevent an electrical interference between members disposed on the insulating film PET and members disposed under the insulating film PET. The insulating film PET may have a thickness of about 3 μm to about 9 μm, for example, such as a thickness of about 6 μm. However, the thickness of the insulating film PET is not limited thereto.

The step compensation members ARS1, ARS2, and ARS3 may include a first step compensation member ARS1 attached to the insulating film PET, a second step compensation member ARS2 attached to the shielding layer MMP, and a third step compensation member ARS3 attached to the shielding layer MMP. The thicknesses of the first to third step compensation members ARS1, ARS2, and ARS3 may be variously modified depending on a product structure or an arrangement relationship between the components. For example, the first step compensation member ARS1 may have a thickness of about 90 μm, the second step compensation member ARS2 may have a thickness of about 87 μm, and the third step compensation member ARS3 may have a thickness of about 87 μm. However, the present disclosure is not particularly limited thereto.

In an embodiment of the present disclosure, the sixth adhesive layer PSA6, the shielding layer MMP, the lower sheet CUS, and the insulating film PET may each have a structure that is divided at a portion overlapping with the folding area FA. For example, the sixth adhesive layer PSA6, the shielding layer MMP, the lower sheet CUS, and the insulating film PET may each be divided into two components that are spaced apart from each other with a gap (e.g., a certain or predetermined gap) therebetween at the portion overlapping with the folding area FA. The gap may range from about 0.6 mm to about 1.7 mm, but the present disclosure is not particularly limited thereto.

Figure 4B:
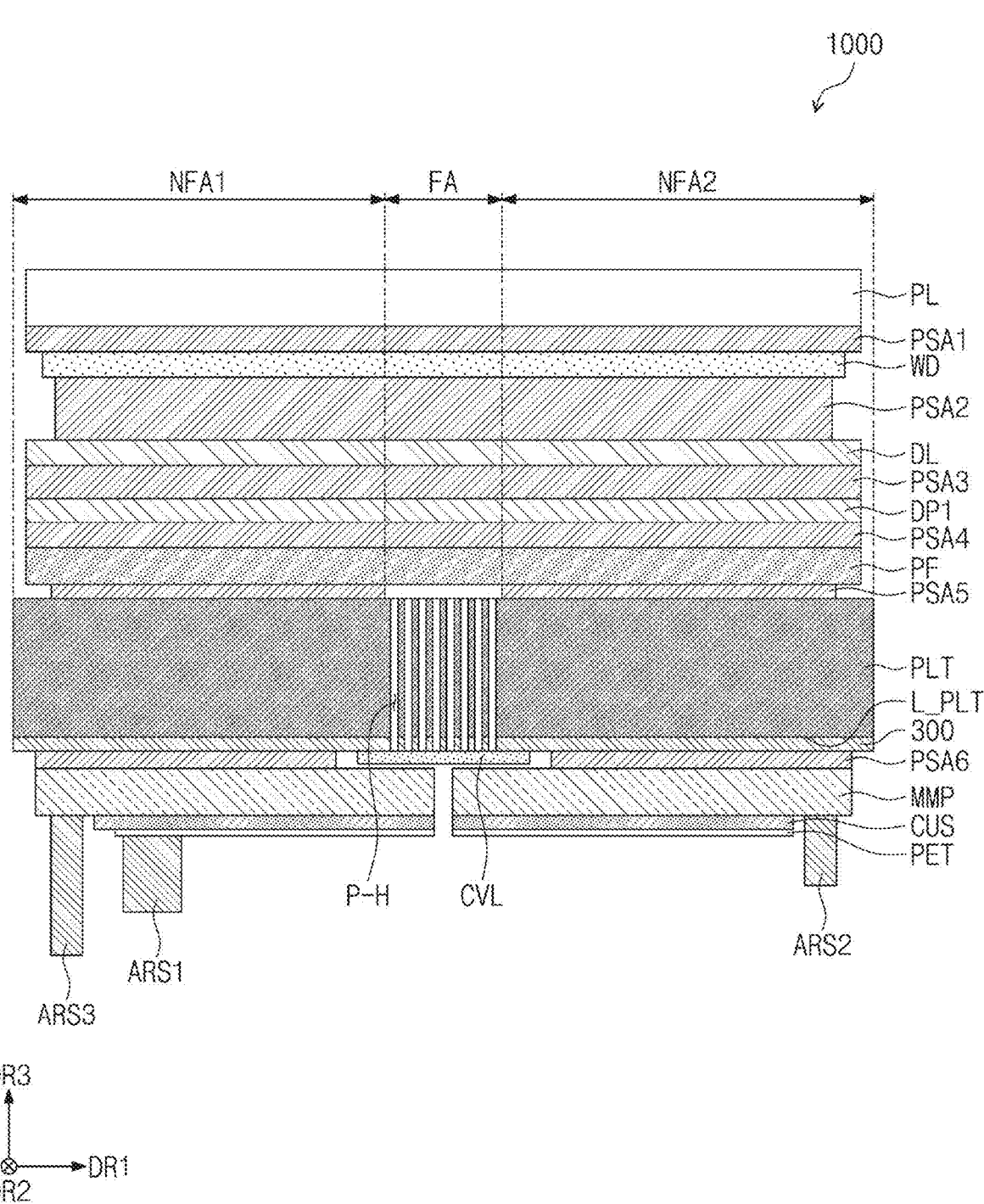

Referring to FIG. 4B, the lower conductive layer 300 according to an embodiment may be disposed on the lower surface L_PLT of the plate PLT. In some embodiments, the lower functional layers may further include an insulating layer disposed between the plate PLT and the lower conductive layer 300. In some embodiments, the lower functional layers may further include an insulating layer that covers the lower conductive layer 300.

Figure 4C:
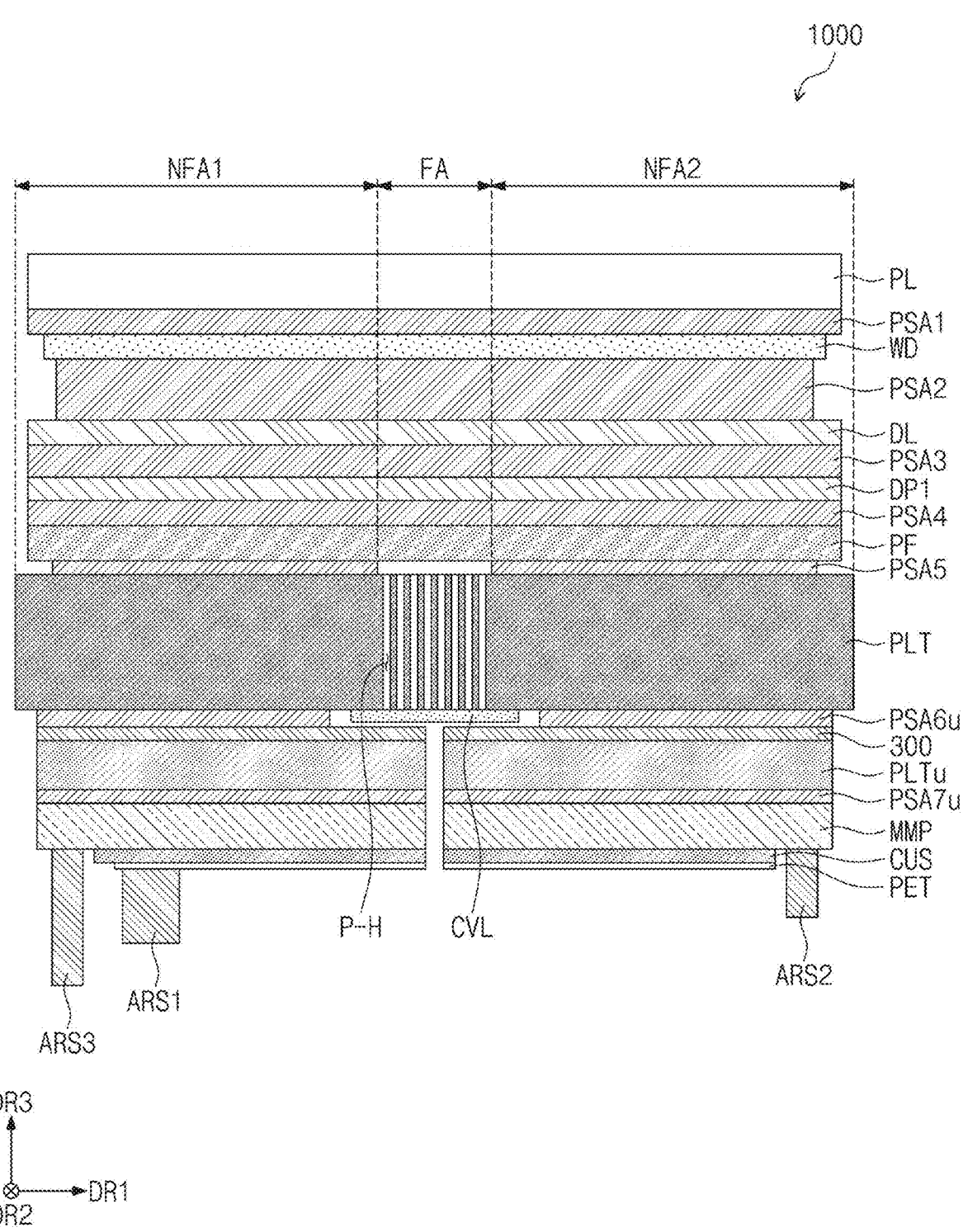

Referring to FIG. 4C, the lower functional layers according to an embodiment may include the protective film PF, the plate PLT, the cover layer CVL, the lower conductive layer 300, a lower plate PLTu, the shielding layer MMP, the lower sheet CUS, the insulating film PET, the step compensation members ARS1, ARS2, and ARS3, and fourth to seventh adhesive layers PSA4, PSA5, PSA6u, and PSA7u.

The lower plate PLTu may be disposed between the plate PLT and the shielding layer MMP. The lower plate PLTu may be disposed under the plate PLT and the cover layer CVL. The sixth adhesive layer PSA6u may be disposed between the plate PLT and the lower plate PLTu. The seventh adhesive layer PSA7u may be disposed between the lower plate PLTu and the shielding layer MMP. In an embodiment, the lower plate PLTu may include a first lower plate and a second lower plate that are spaced apart from each other, and that overlap with the first non-folding area NFA1 and the second non-folding area NFA2, respectively. In an embodiment, the lower plate PLTu may include a non-metallic material, such as a fiber reinforced composite. The fiber reinforced composite may include (e.g., may be) a carbon fiber reinforced plastic (CFRP) or a glass fiber reinforced plastic (GFRP).

In an embodiment, the lower conductive layer 300 may be disposed on an upper surface of the lower plate PLTu. In some embodiments, the lower functional layers may further include an insulating layer disposed between the lower plate PLTu and the lower conductive layer 300. In some embodiments, the lower functional layers may further include an insulating layer that covers the lower conductive layer 300. In an embodiment of the present disclosure, the lower conductive layer 300 may be disposed on the lower surface of the lower plate PLTu.

Figure 4D:
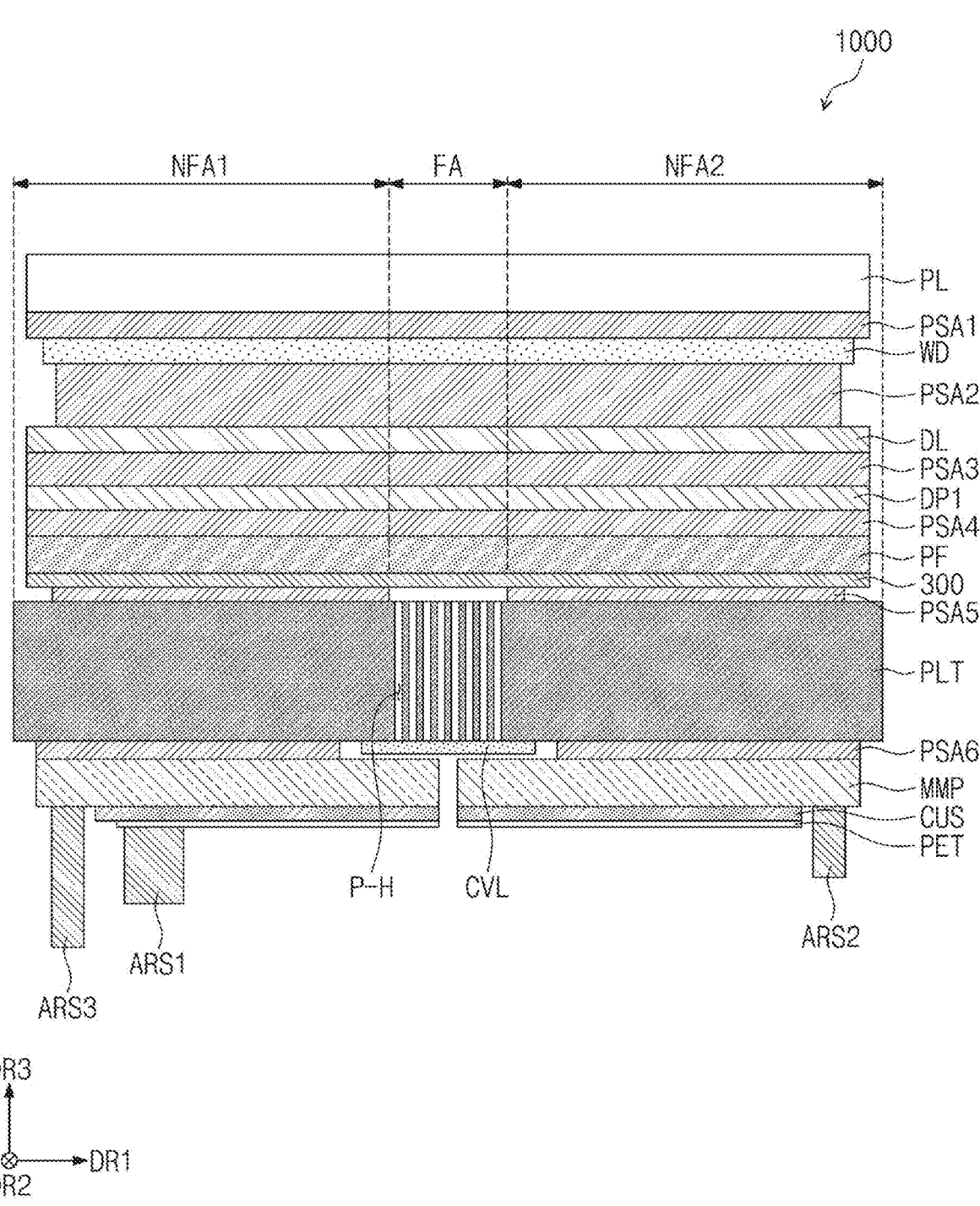

Referring to FIG. 4D, the lower conductive layer 300 according to an embodiment may be disposed between the protective film PF and the plate PLT. For example, the lower conductive layer 300 may be disposed between the protective film PF and the fifth adhesive layer PSA5, and the fifth adhesive layer PSA5 may be disposed between the lower conductive layer 300 and the plate PLT. In some embodiments, the lower functional layers may further include an insulating layer disposed between the protective film PF and the lower conductive layer 300, and/or between the lower conductive layer 300 and the fifth adhesive layer PSA5. In some embodiments, an adhesive layer may be additionally disposed between the protective film PF and the lower conductive layer 300.

Figure 5:
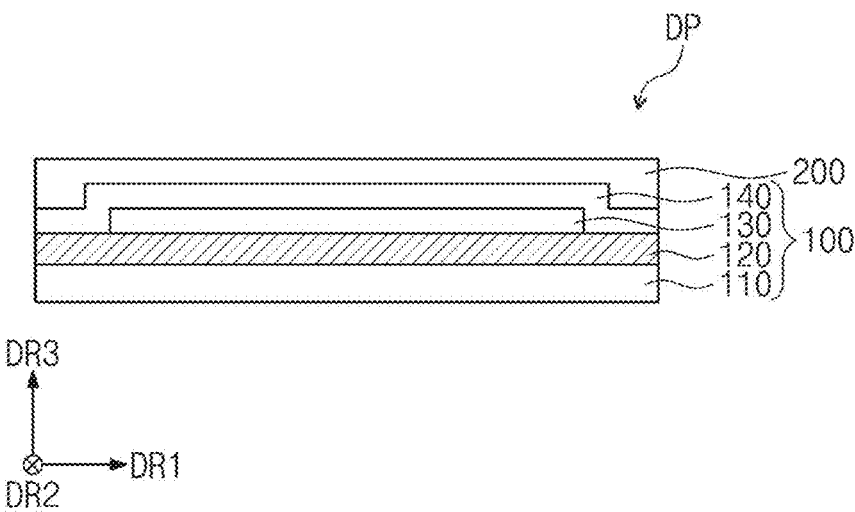
FIG. 5 is a schematic sectional view of a display panel according to an embodiment of the present disclosure.

FIG. 5 is a schematic sectional view of the display panel DP according to an embodiment of the present disclosure.

Referring to FIG. 5, the display panel DP may include the display layer 100 and the sensor layer 200.

The display layer 100 may be a component that generates or substantially generates an image. The display layer 100 may be an emissive display layer. For example, the display layer 100 may be an organic light emitting display layer, an inorganic light emitting display layer, an organic-inorganic light emitting display layer, a quantum-dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may have a multi-layered structure or a single-layer structure. The base layer 110 may be a glass substrate, a metal substrate, a silicon substrate, or a polymer substrate, but the present disclosure is not particularly limited thereto.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a suitable process, such as coating or deposition, and may be selectively subjected to patterning by performing a photo-lithography process a plurality of times.

The light emitting element layer 130 may be disposed on the circuit layer 120. The light emitting element layer 130 may include light emitting elements. For example, the light emitting element layer 130 may include an organic luminescent material, an inorganic luminescent material, an organic-inorganic luminescent material, a quantum dot, a quantum rod, a micro LED, or a nano LED.

The encapsulation layer 140 may be disposed on the light emitting element layer 130. The encapsulation layer 140 may protect the light emitting element layer 130 from foreign matter, such as moisture, oxygen, and dust particles.

The sensor layer 200 may be disposed over the display layer 100. The sensor layer 200 may sense an external input applied from the outside. The sensor layer 200 may be an integrated sensor that is continuously formed in a process of manufacturing the display layer 100. As another example, the sensor layer 200 may be an external sensor that is attached to the display layer 100. The sensor layer 200 may be referred to as a sensor, an input sensing layer, an input sensing panel, or an electronic device for sensing input coordinates.

According to an embodiment of the present disclosure, the sensor layer 200, together with the lower conductive layer 300, may sense both an input by a passive input means, such as a part of the user's body, and an input by an input device that generates a magnetic field having a suitable resonant frequency (e.g., a certain or predetermined resonant frequency). The input device may be referred to as a pen, an input pen, a magnetic pen, a stylus pen, or an electromagnetic resonance pen.

Figure 6A:
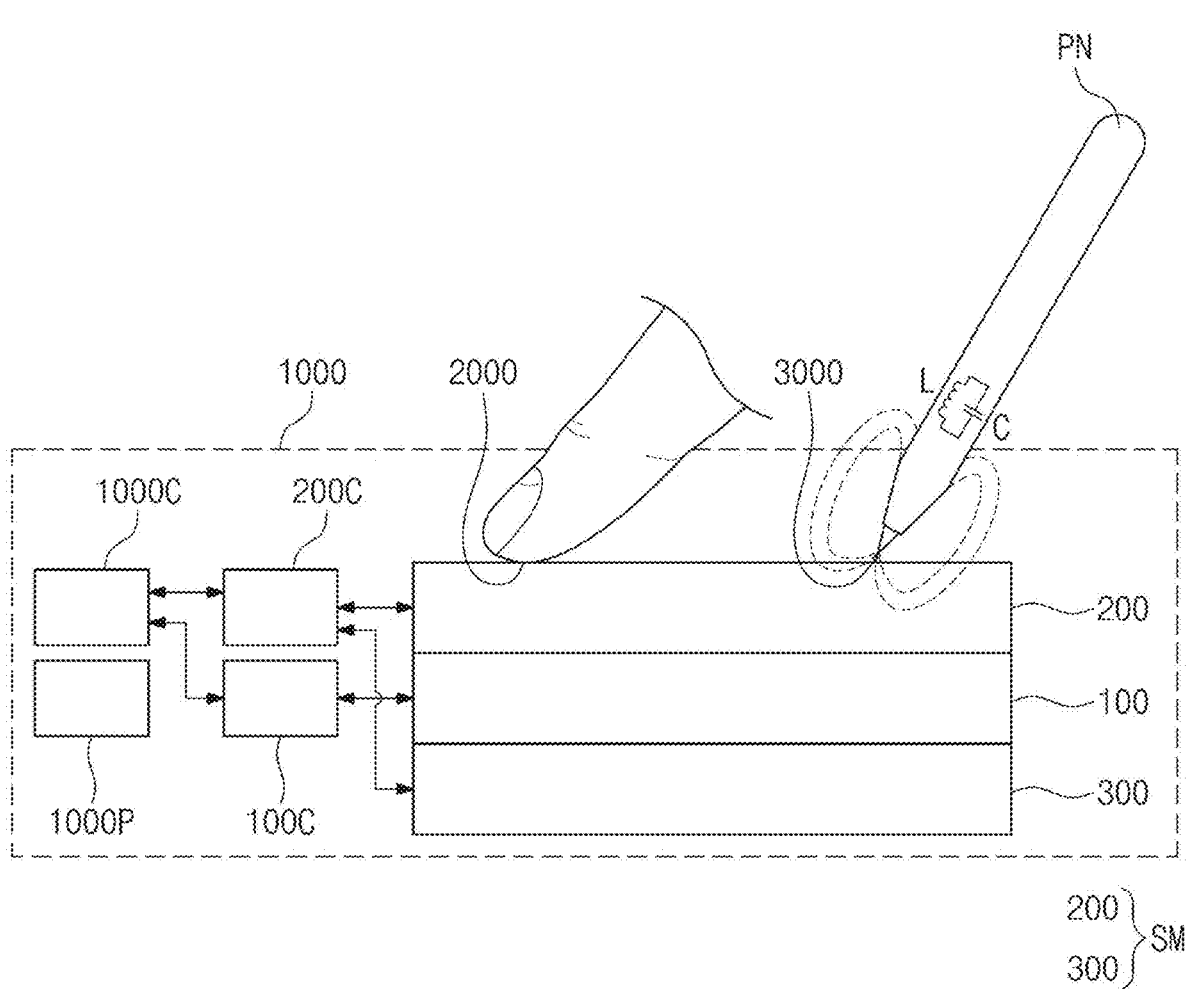
FIGS. 6A-6C are views illustrating an operation of an electronic device according to one or more embodiments of the present disclosure.
Figure 6B:
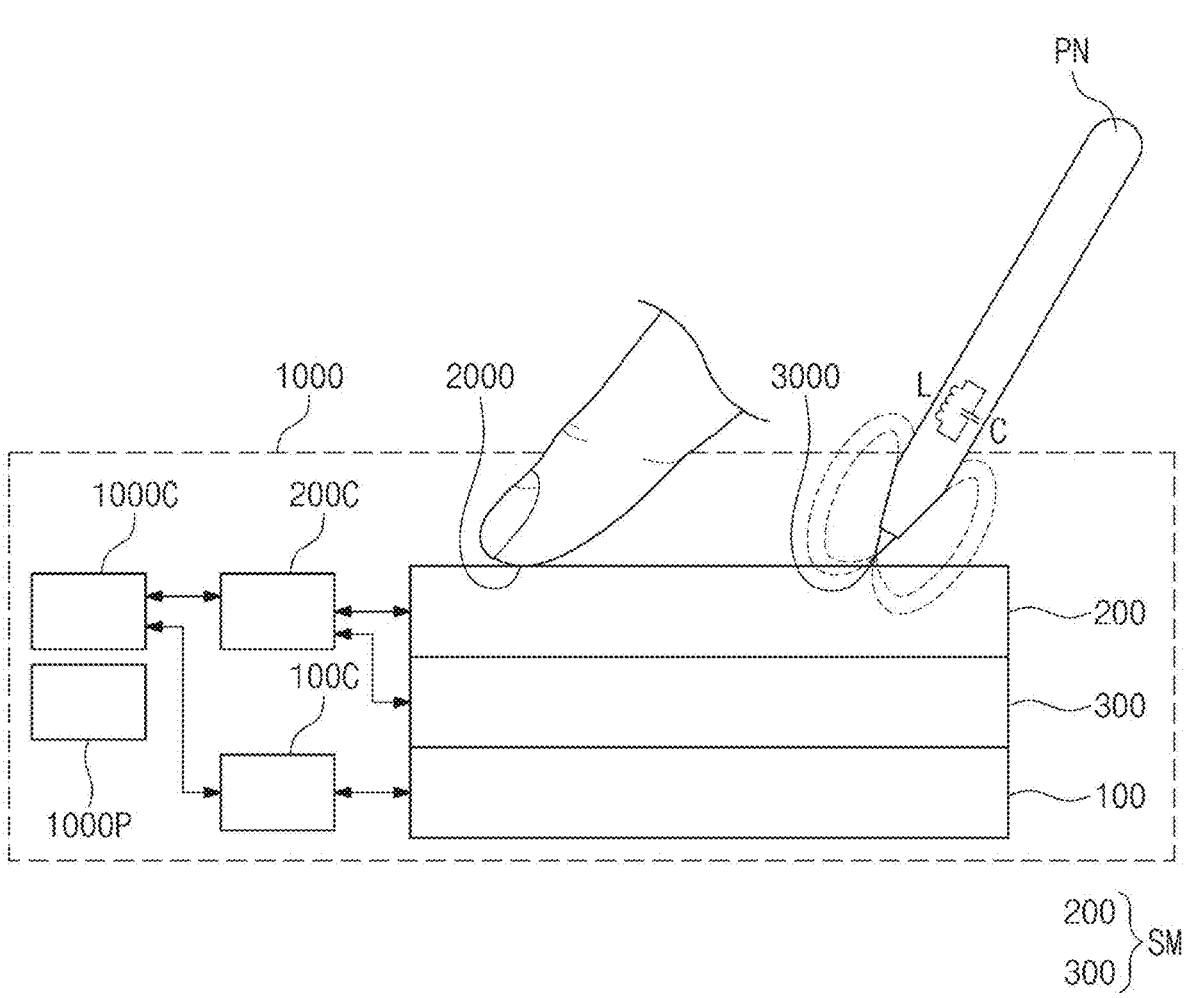
Figure 6C:
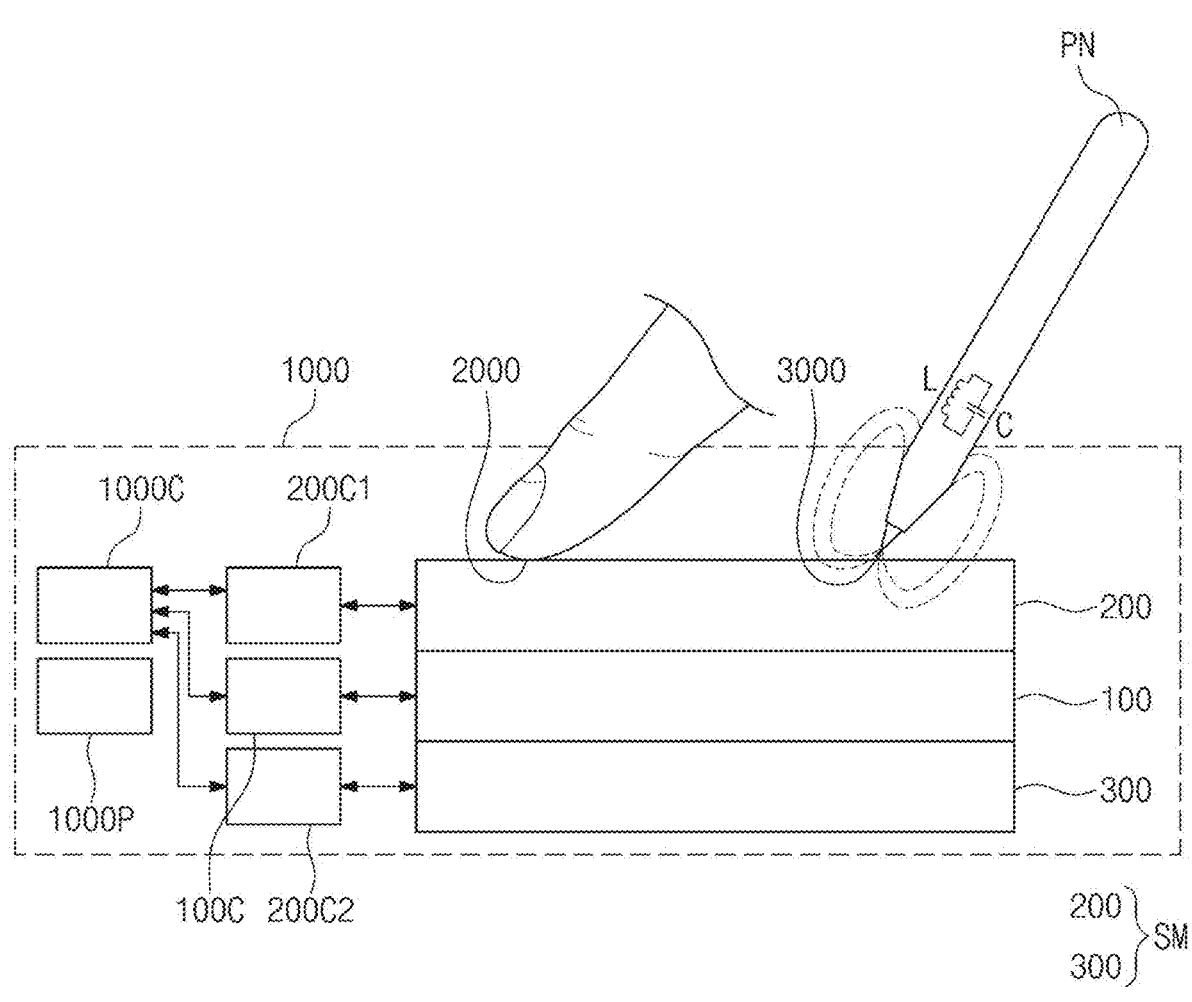

FIGS. 6A through 6C are views illustrating an operation of the electronic device 1000 according to one or more embodiments of the present disclosure.

Referring to FIG. 6A, the electronic device 1000 may include the display layer 100, the sensing module SM, a display driver 100C, a sensor driver 200C, a main driver 1000C, and a power circuit 1000P. The sensing module SM may include the sensor layer 200 and the lower conductive layer 300.

The sensing module SM may sense a first input 2000 or a second input 3000 applied from the outside. Each of the first input 2000 and the second input 3000 may be an input by an input means capable of providing a change in the capacitance of the sensor layer 200, or an input by an input means capable of causing an induced current in the sensor layer 200 and/or the lower conductive layer 300. For example, the first input 2000 may be an input by a passive input means, such as a part of the user's body. The second input 3000 may be an input by the pen PN or an input by an RFIC tag. For example, the pen PN may be a pen of a passive kind or a pen of an active kind.

In an embodiment of the present disclosure, the pen PN may be a device that generates a magnetic field having a suitable resonant frequency (e.g., a certain or predetermined resonant frequency). The pen PN may transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the present disclosure, the RLC resonance circuit may be a variable resonance circuit that varies the resonant frequency. In this case, the inductor L may be a variable inductor, and/or the capacitor C may be a variable capacitor. However, the present disclosure is not particularly limited thereto.

The inductor L generates a current by a magnetic field formed in the lower conductive layer 300. However, the present disclosure is not particularly limited thereto. For example, when the pen PN operates in an active kind, the pen PN may generate a current even though a magnetic field is not provided to the pen PN from the outside. The generated current is transferred to the capacitor C. The capacitor C charges the current input from the inductor L, and discharges the charged current to the inductor L. Thereafter, the inductor L may emit a magnetic field having a resonant frequency. An induced current may flow in the lower conductive layer 300 by the magnetic field emitted by the pen PN. The induced current may be transferred to the sensor driver 200C as a reception signal (e.g., a sensing signal or a signal).

The main driver 1000C may control the overall operations of the electronic device 1000. For example, the main driver 1000C may control operations of the display driver 100C and the sensor driver 200C. The main driver 1000C may include at least one microprocessor, and may further include a graphic controller. The main driver 1000C may be referred to as an application processor, a central processing unit, or a main processor.

The display driver 100C may drive the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200 and the lower conductive layer 300. The sensor driver 200C may receive a control signal from the main driver 1000C. The control signal may include a clock signal of the sensor driver 200C. In addition, the control signal may further include a mode determination signal for determining a driving mode of the sensor driver 200C and the sensing module SM.

The sensor driver 200C may be implemented with an integrated circuit (IC), and may be electrically connected with the sensor layer 200 and the lower conductive layer 300. For example, the sensor driver 200C may be directly mounted on a suitable area (e.g., a certain or predetermined area) of the display panel, or may be mounted on a separate printed circuit board using a chip on film (COF) method to be electrically connected with the sensor layer 200.

The sensor driver 200C and the sensing module SM may selectively operate in a first mode or a second mode. For example, the first mode may be a mode for sensing a touch input, for example, such as the first input 2000. The second mode may be a mode for sensing an input by the pen PN, for example, such as the second input 3000. The first mode may be referred to as a touch sensing mode, and the second mode may be referred to as a pen sensing mode.

In an embodiment, in the first mode, the sensor driver 200C may drive the sensor layer 200, and in the second mode, the sensor driver 200C may drive the sensor layer 200 and the lower conductive layer 300 or may drive only the lower conductive layer 300.

Switching between the first mode and the second mode may be performed in various suitable manners. For example, the sensor driver 200C and the sensing module SM may be driven in the first mode and the second mode in a time-division manner, and may sense the first input 2000 and the second input 3000. As another example, the switching between the first mode and the second mode may be performed by the user's selection or the user's specific action, or by activating or deactivating a specific application. Further, one of the first mode or the second mode may be activated or deactivated, or the driving mode may be switched from one mode to the other mode. As another example, while the sensor driver 200C and the sensing module SM alternately operate in the first mode and the second mode, when the first input 2000 is sensed, the sensor driver 200C and the sensing module SM may be maintained in the first mode, and when the second input 3000 is sensed, the sensor driver 200C and the sensing module SM may be maintained in the second mode.

The sensor driver 200C may calculate coordinate information of an input based on a signal received from the sensor layer 200 and/or the lower conductive layer 300, and may provide a coordinate signal having the coordinate information to the main driver 1000C. The main driver 1000C executes an operation corresponding to the user input, based on the coordinate signal. For example, the main driver 1000C may operate the display driver 100C, such that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high-voltage, a gate low-voltage, a first driving voltage (e.g., an ELVSS voltage), a second driving voltage (e.g., an ELVDD voltage), an initialization voltage, and the like, but the present disclosure is not particularly limited thereto.

Although FIG. 6A illustrates a structure in which the lower conductive layer 300 is provided under the display layer 100, the present disclosure is not limited thereto. As illustrated in FIG. 6B, the lower conductive layer 300 may be disposed under the sensor layer 200. For example, the lower conductive layer 300 may be disposed between the sensor layer 200 and the display layer 100.

Referring to FIG. 6C, the electronic device 1000 according to an embodiment may include the display layer 100, the sensing module SM, the display driver 100C, a first sensor driver 200C1, a second sensor driver 200C2, the main driver 1000C, and the power circuit 1000P. The sensing module SM may include the sensor layer 200 and the lower conductive layer 300. The main driver 1000C may control operations of the display driver 100C, the first sensor driver 200C1, and the second sensor driver 200C2.

The first sensor driver 200C1 may drive the sensor layer 200 in the first mode. The first sensor driver 200C1 may sense the first input 2000 in the first mode. The second sensor driver 200C2 may drive the lower conductive layer 300 in the second mode. The second sensor driver 200C2 may sense the second input 3000 in the second mode. In an embodiment, the first mode and the second mode may be driven by different drivers, and may each independently operate.

In the structure in which the sensor layer 200 and the lower conductive layer 300 are independently driven by the first and second sensor drivers 200C1 and 200C2, respectively, the position of the lower conductive layer 300 is not limited to that shown in FIG. 6C, and the lower conductive layer 300 may be disposed under the sensor layer 200 (e.g., between the sensor layer 200 and the display layer 100).

Figure 7:
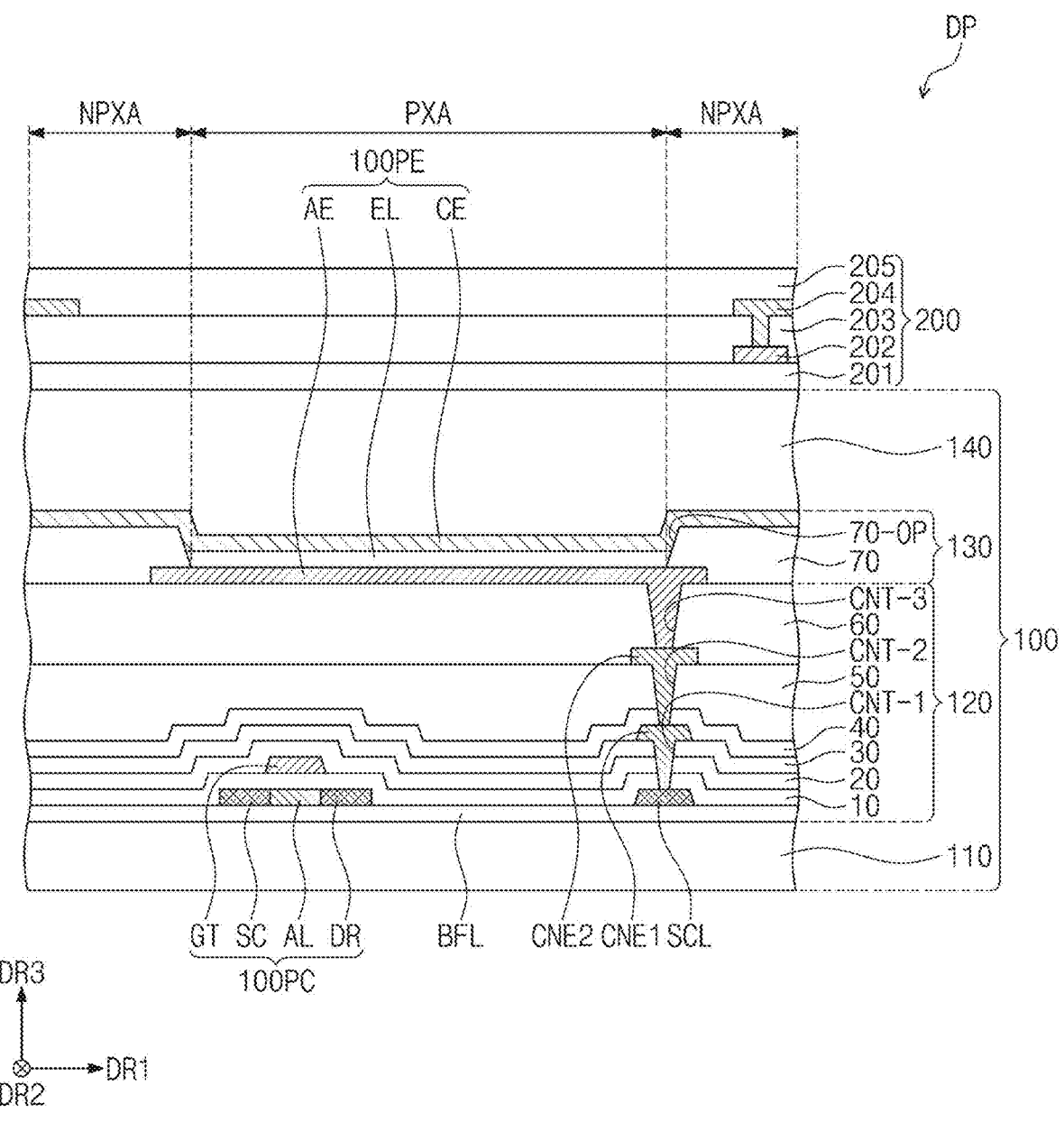
FIG. 7 is a sectional view of a display panel according to an embodiment of the present disclosure.

FIG. 7 is a sectional view of the display panel DP according to an embodiment of the present disclosure.

Referring to FIG. 7, at least one buffer layer BFL may be formed on the upper surface of the base layer 110. The buffer layer BFL may improve a coupling force between the base layer 110 and a semiconductor pattern. The buffer layer BFL may be formed of multiple layers. As another example, the display layer 100 may further include a barrier layer. The buffer layer BFL may include at least one of silicon oxide, silicon nitride, or silicon oxy nitride. For example, the buffer layer BFL may include a structure in which silicon oxide layers and silicon nitride layers are alternately stacked one above another.

The semiconductor pattern SC, AL, DR, and SCL may be disposed on the buffer layer BFL. The semiconductor pattern SC, AL, DR, and SCL may include poly silicon. However, the present disclosure is not limited thereto, and the semiconductor pattern SC, AL, DR, and SCL may include amorphous silicon, a low-temperature polycrystalline silicon, or an oxide semiconductor.

FIG. 7 illustrates a portion of the semiconductor pattern SC, AL, DR, and SCL, and the semiconductor pattern may be additionally disposed in other areas. The semiconductor pattern SC, AL, DR, and SCL may be arranged over pixels according to a suitable rule (e.g., a specific or predetermined rule). The semiconductor pattern SC, AL, DR, and SCL may have different electrical properties depending on whether doping is performed or not. The semiconductor pattern SC, AL, DR, and SCL may include first areas SC, DR, and SCL having a higher conductivity, and a second area AL having a lower conductivity. The first areas SC, DR, and SCL may be doped with an N-type dopant or a P-type dopant. A P-type transistor may include a doped area that is doped with the P-type dopant, and an N-type transistor may include a doped area that is doped with the N-type dopant. The second area AL may be a non-doped area, or may be an area that is more lightly doped than those of the first areas.

The first areas SC, DR, and SCL may have a higher conductivity than that of the second area AL, and may serve or substantially serve as electrodes or signal lines. The second area AL may correspond to or substantially correspond to an active area AL (e.g., a channel) of a transistor 100PC. In other words, one portion AL of the semiconductor pattern SC, AL, DR, and SCL may be the active area AL of the transistor 100PC, another portion SC or DR of the semiconductor pattern SC, AL, DR, and SCL may be a source area SC or a drain area DR of the transistor 100PC, and another portion SCL of the semiconductor pattern SC, AL, DR, and SCL may be a connecting electrode or a connecting signal line SCL.

Each of the pixels may have an equivalent circuit including seven transistors, one capacitor, and a light emitting element, but the present disclosure is not limited thereto, and the equivalent circuit of the pixel may be variously modified as needed or desired. In FIG. 7, one transistor 100PC and one light emitting element 100PE included in the pixel are illustrated as an example.

The source area SC, the active area AL, and the drain area DR of the transistor 100PC may be formed from the semiconductor pattern SC, AL, DR, and SCL. The source area SC and the drain area DR may extend from the active area AL in opposite directions from each other on the section (e.g., in a cross-sectional view). In FIG. 7, a portion of the connecting signal line SCL formed from the semiconductor pattern SC, AL, DR, and SCL is illustrated. The connecting signal line SCL may be connected to the drain area DR of the transistor 100PC when viewed from above the plane (e.g., in a plan view).

A first insulating layer 10 may be disposed on the buffer layer BFL. The first insulating layer 10 may commonly overlap with the plurality of pixels, and may cover the semiconductor pattern SC, AL, DR, and SCL. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon nitride, silicon oxy nitride, zirconium oxide, or hafnium oxide. In the present embodiment, the first insulating layer 10 may be a single silicon oxide layer. Not only the first insulating layer 10, but also insulating layers of the circuit layer 120 that will be described in more detail below, may be inorganic layers and/or organic layers, and may have a single-layer structure or a multi-layered structure. The inorganic layers may include at least one of the aforementioned inorganic materials, but the present disclosure is not limited thereto.

A gate GT of the transistor 100PC is disposed on the first insulating layer 10. The gate GT may be a portion of a metal pattern. The gate GT overlaps with the active area AL. The gate GT may function as a mask in a process of doping or reducing the semiconductor pattern SC, AL, DR, and SCL.

A second insulating layer 20 may be disposed on the first insulating layer 10, and may cover the gate GT. The second insulating layer 20 may commonly overlap with the pixels. The second insulating layer 20 may be an inorganic layer and/or an organic layer, and may have a single-layer structure or a multi-layered structure. The second insulating layer 20 may include at least one of silicon oxide, silicon nitride, or silicon oxy nitride. In the present embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer structure or a multi-layered structure. For example, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 penetrating the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic luminescent material, an inorganic luminescent material, an organic-inorganic luminescent material, a quantum dot, a quantum rod, a micro LED, or a nano LED. Hereinafter, the light emitting element 100PE may be described in more detail in the context of an organic light emitting element as a representative illustration. However, the present disclosure is not particularly limited thereto.

The light emitting element 100PE may include a first electrode AE, an emissive layer EL, and a second electrode CE.

The first electrode AE may be disposed on the sixth insulating layer 60. The first electrode AE may be connected to the second connecting electrode CNE2 through a contact hole CNT-3 penetrating the sixth insulating layer 60.

A pixel defining layer 70 may be disposed on the sixth insulating layer 60, and may cover a portion of the first electrode AE. The pixel defining layer 70 may have an opening 70-OP defined therein. The opening 70-OP of the pixel defining layer 70 exposes at least a portion of the first electrode AE.

The first display part DA1-F (e.g., refer to FIG. 1A) may include an emissive area PXA, and a non-emissive area NPXA adjacent to the emissive area PXA. The non-emissive area NPXA may surround (e.g., around a periphery of) the emissive area PXA. In the present embodiment, the emissive area PXA is defined to correspond to a partial region of the first electrode AE exposed by the opening 70-OP.

The emissive layer EL may be disposed on the first electrode AE. The emissive layer EL may be disposed in an area corresponding to the opening 70-OP. In other words, the emissive layer EL may be separately formed for each of the pixels. When the emissive layer EL is separately formed for each of the pixels, each of the emissive layers EL may emit at least one of a blue light, a red light, or a green light. However, without being limited thereto, the emissive layer EL may be connected to the pixels, and may be commonly included in the pixels. In this case, the emissive layer EL may provide a blue light or a white light.

The second electrode CE may be disposed on the emissive layer EL. The second electrode CE may have a one-body shape, and may be commonly included in the plurality of pixels.

In an embodiment of the present disclosure, a hole control layer may be disposed between the first electrode AE and the emissive layer EL. The hole control layer may be commonly disposed in the emissive area PXA and the non-emissive area NPXA. The hole control layer may include a hole transport layer, and may further include a hole injection layer. An electron control layer may be disposed between the emissive layer EL and the second electrode CE. The electron control layer may include an electron transport layer, and may further include an electron injection layer. The hole control layer and the electron control layer may be commonly formed in the plurality of pixels using an open mask or an ink-jet process.

The encapsulation layer 140 may be disposed on the light emitting element layer 130. The encapsulation layer 140 may include an inorganic layer, an organic layer, and an inorganic layer that are sequentially stacked one above another. However, the layers constituting the encapsulation layer 140 are not limited thereto. The inorganic layers may protect the light emitting element layer 130 from moisture and oxygen, and the organic layer may protect the light emitting element layer 130 from foreign matter, such as dust particles. The inorganic layers may include a silicon nitride layer, a silicon oxy nitride layer, a silicon oxide layer, a titanium oxide layer, or an aluminum oxide layer. The organic layer may include an acrylic organic layer, but the present disclosure is not limited thereto.

The sensor layer 200 may include a sensor base layer 201, a first conductive layer 202, an intermediate insulating layer 203, a second conductive layer 204, and a cover insulating layer 205.

The sensor base layer 201 may be an inorganic layer including at least one of silicon nitride, silicon oxy nitride, or silicon oxide. As another example, the sensor base layer 201 may be an organic layer including an epoxy resin, an acrylic resin, or an imide-based resin. The sensor base layer 201 may have a single-layer structure, or may have a multi-layered structure stacked in the third direction DR3.

Each of the first conductive layer 202 and the second conductive layer 204 may have a single-layer structure, or may have a multi-layered structure stacked in the third direction DR3.

Each of the first conductive layer 202 and the second conductive layer 204 that have a single-layer structure may include a metal layer or a transparent conductive layer. The metal layer may include molybdenum, silver, titanium, copper, aluminum, or a suitable alloy thereof. The transparent conductive layer may include transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as poly(3,4-ethylenedioxythiophene) (PEDOT), a metal nano wire, or graphene.

Each of the first conductive layer 202 and the second conductive layer 204 that have a multi-layered structure may include a plurality of metal layers. The metal layers may have, for example, a three-layered structure of titanium/aluminum/titanium. The conductive layer having the multi-layered structure may include at least one metal layer and at least one transparent conductive layer.

At least one of the intermediate insulating layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least one of the intermediate insulating layer 203 or the cover insulating layer 205 may include an organic film. The organic film may include at least one of an acrylic resin, a methacrylic resin, a polyisoprene resin, a vinyl resin, an epoxy resin, a urethane-based resin, a celluosic resin, a siloxane-based resin, a polyimide resin, a polyamide resin, or a perylene-based resin.

Although the sensor layer 200 including the first conductive layer 202 and the second conductive layer 204, or in other words, a total of two conductive layers has been illustrated, the present disclosure is not particularly limited thereto. For example, the sensor layer 200 may include three or more conductive layers.

Figure 8A:
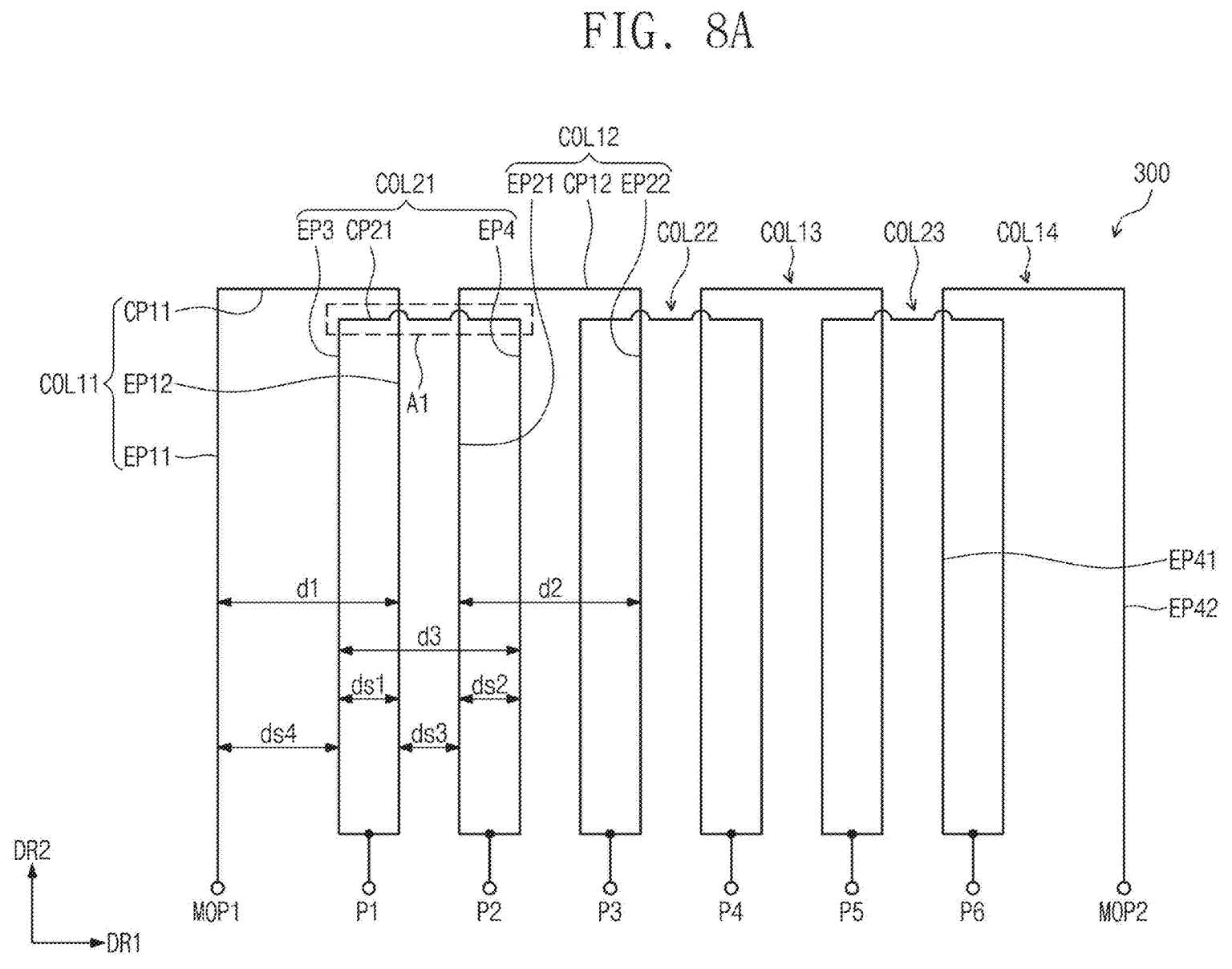
Figure 8B:
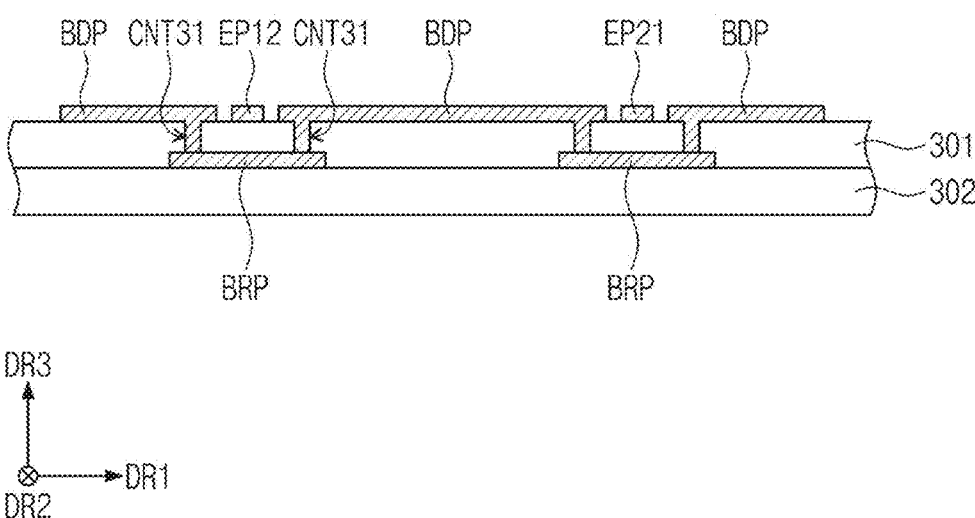
FIG. 8B is a sectional view of a first portion illustrated in FIG. 8A.
Figure 8C:
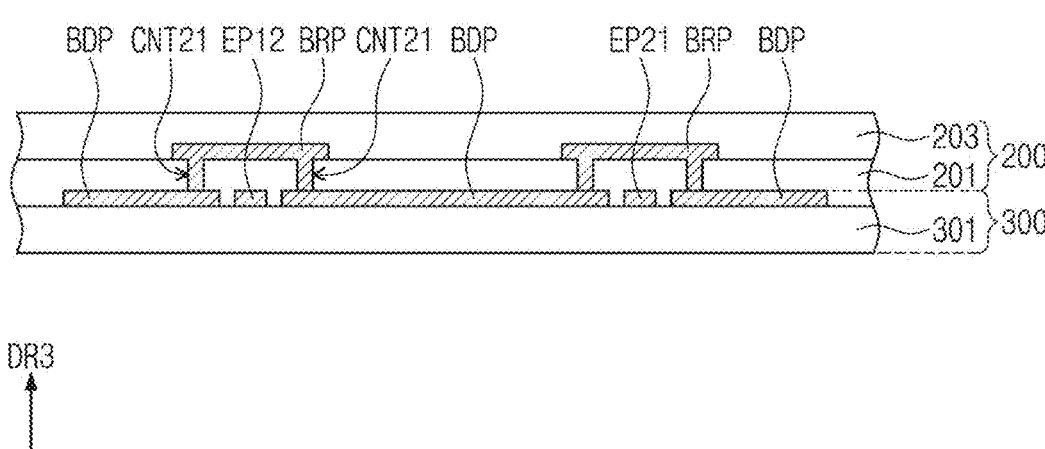
FIG. 8C is a sectional view of the lower conductive layer and a sensor layer according to an embodiment of the present disclosure.

FIG. 8A is a schematic plan view illustrating the lower conductive layer according to an embodiment of the present disclosure. FIG. 8B is a sectional view of a first portion A1 illustrated in FIG. 8A. FIG. 8C is a sectional view of the lower conductive layer and the sensor layer according to an embodiment of the present disclosure.

Referring to FIG. 8A, the lower conductive layer 300 includes first coils COL11, COL12, COL13, and COL14 and second coils COL21, COL22, and COL23. The first coils COL11, COL12, COL13, and COL14 are spaced apart from one another along the first direction DR1, and the second coils COL21, COL22, and COL23 are spaced apart from one another along the first direction DR1. Each of the second coils COL21, COL22, and COL23 may cross two first coils that are adjacent to each other. Although FIG. 8A illustrates an example in which four first coils COL11, COL12, COL13, and COL14 and three second coils COL21, COL22, and COL23 are shown, the number of first coils COL11, COL12, COL13, and COL14 and the number of second coils COL21, COL22, and COL23 are not particularly limited. The four first coils COL11, COL12, COL13, and COL14 may be referred to as a first-first coil COL11, a first-second coil COL12, a first-third coil COL13, and a first-fourth coil COL14, respectively. Among the four first coils COL11, COL12, COL13, and COL14, two coils disposed at the outermost positions (e.g., the first-first coil COL11 and the first-fourth coil COL14) may be referred to as the first and second outermost coils, respectively. The three second coils COL21, COL22, and COL23 may be referred to as a second-first coil COL21, a second-second coil COL22, and a second-third coil COL23, respectively.

The first-first coil COL11 includes a first-first extension part EP11, a first-second extension part EP12, and a first-first connecting part CP11. The first-first extension part EP11 extends in the second direction DR2 crossing the first direction DR1. The first-second extension part EP12 is spaced apart from the first-first extension part EP11 in the first direction DR1. The first-first connecting part CP11 connects the first-first extension part EP11 and the first-second extension part EP12 to each other.

The first-second coil COL12 includes a second-first extension part EP21, a second-second extension part EP22, and a first-second connecting part CP12. The second-first extension part EP21 extends in the second direction DR2, and the second-second extension part EP22 is spaced apart from the second-first extension part EP21 in the first direction DR1. The first-second connecting part CP12 connects the second-first extension part EP21 and the second-second extension part EP22 to each other. In other words, each of the first-first coil COL11 and the first-second coil COL12 may have the shape of an "n".

Each of the second coils COL21, COL22, and COL23 includes a third extension part EP3, a fourth extension part EP4, and a second connecting part CP21. The third extension part EP3 extends in the second direction DR2, and the fourth extension part EP4 is spaced apart from the third extension part EP3 in the first direction DR1. The second connecting part CP21 connects the third extension part EP3 and the fourth extension part EP4 to each other. The second connecting portion CP21 crosses the first-second extension part EP12 and the second-first extension part EP21. Each of the second coils COL21, COL22, and COL23 may have the shape of an "n".

As illustrated in FIGS. 8A and 8B, the second connecting part CP21 includes a plurality of body portions BDP, and bridge portions BRP electrically connecting the body portions BDP to each other. The body portions BDP may be spaced apart from one another along the first direction DR1. In an embodiment of the present disclosure, the body portions BDP, the first-second extension part EP12, and the second-first extension part EP21 are disposed on a first layer 301, and the bridge portions BRP are disposed on a second layer 302 different from the first layer 301. Although FIG. 8B illustrates an example in which the first layer 301 is disposed on the second layer 302, the present disclosure is not limited thereto. For example, the second layer 302 may be disposed on the first layer 301.

Contact holes CNT31 for exposing the bridge portions BRP are provided in (e.g., penetrate) the first layer 301, and the body portions BDP are connected to the bridge portions BRP through the contact holes CNT31. The bridge portions BRP may overlap with the first-second extension part EP12 and the second-first extension part EP21 when viewed from above the plane (e.g., in a plan view). However, the bridge portions BRP may be disposed on a layer different from the layer on which the first-second extension part EP12 and the second-first extension part EP21 are disposed, and may be electrically insulated from the first-second extension part EP12 and the second-first extension part EP21.

The lower conductive layer 300 may further include a third layer. When the first layer 301 is disposed on the second layer 302 as illustrated in FIG. 8B, the third layer may be disposed on the first layer 301, and may cover the body portions BDP, the first-second extension part EP12, and the second-first extension part EP21. On the other hand, when the second layer 302 is disposed on the first layer 301, the third layer may be disposed on the second layer 302, and may cover the bridge portions BRP.

As another example, when the sensor layer 200 is disposed on the lower conductive layer 300, the bridge portions BRP may be disposed in the sensor layer 200. Referring to FIG. 8C, the lower conductive layer 300 may include the first layer 301. The lower conductive layer 300 may further include the body portions BDP, the first-second extension part EP12, and the second-first extension part EP21 that are disposed on the first layer 301. The sensor layer 200 includes the sensor base layer 201, the first conductive layer 202 (e.g., refer to FIG. 7), the intermediate insulating layer 203, and the second conductive layer 204.

The body portions BDP, the first-second extension part EP12, and the second-first extension part EP21 may be covered by the sensor base layer 201, and contact holes CNT21 for exposing the body portions BDP may be provided in (e.g., may penetrate) the sensor base layer 201. The bridge patterns BRP are provided on the sensor base layer 201, and connected to the body portions BDP through the contact holes CNT21.

When the bridge portions BRP are disposed in the sensor layer 200, the bridge portions BRP may be formed by using the first conductive layer 202, and thus, a process may be simplified.

Referring to FIG. 8A, the lower conductive layer 300 may further include connecting pins P1 to P6, MOP1, and MOP2, which connect ends of the first coils COL11, COL12, COL13, and COL14 and ends of the second coils COL21, COL22, and COL23 to one another. In an embodiment of the present disclosure, the connecting pins P1 to P6, MOP1, and MOP2 may include first to sixth connecting pins P1 to P6, and the first and second outermost connecting pins MOP1 and MOP2.

The first connecting pin P1 is connected to the first-second extension part EP12 and the third extension part EP3. The second connecting pin P2 is connected to the second-first extension part EP21 and the fourth extension part EP4. The first outermost connecting pin MOP1 is connected to the first-first extension part EP11, and the second outermost connecting pin MOP2 is connected to a fourth-second extension part EP42 of the first-fourth coil COL14. When the first-first coil COL11 is the first outermost coil and the first-fourth coil COL14 is the second outermost coil, the first-first extension part EP11 and the first-second extension part EP12 may be referred to as the first-first outermost extension part and the first-second outermost extension part, respectively. The fourth-first extension part EP41 and the fourth-second extension part EP42 of the first-fourth coil COL14 may be referred to as the second-first outermost extension part and the second-second outermost extension part, respectively.

A first gap d1 between the first-first extension part EP11 and the first-second extension part EP12 may be equal to or different from the second gap d2 between the second-first extension part EP21 and the second-second extension part EP22. Although FIG. 8A illustrates an example in which the first and second gaps d1 and d2 are equal to or substantially equal to each other, the first gap d1 may be smaller than the second gap d2. A third gap d3 between the third extension part EP3 and the fourth extension part EP4 may be equal to or different from the first gap d1 and/or the second gap d2. Although FIG. 8A illustrates an example in which the third gap d3 is equal to or substantially equal to the first and second gaps d1 and d2, the third gap d3 may be smaller than or greater than the first gap d1 and/or the second gap d2.

A first sub-gap ds1 between the first-second extension part EP12 and the third extension part EP3 may be equal to or different from a second sub-gap ds2 between the second-first extension part EP21 and the fourth extension part EP4. A gap ds3 between the first-second extension part EP12 and the second-first extension part EP21 may be equal to or substantially equal to the first and second sub-gaps ds1 and ds2. A gap ds4 between the first-first extension part EP11 and the third extension part EP3 may be different from the first and second sub-gaps ds1 and ds2.

According to the above, two coils may be disposed to overlap with each other, and one connecting pin may be commonly connected to the two coils. Accordingly, the total number of connecting pins P1 to P6, MOP1, and MOP2 provided in the lower conductive layer 300 may be decreased. In addition, because the number of connecting pins P1 to P6, MOP1, and MOP2 may be decreased, the number of elements connected to the lower conductive layer 300 and the sizes of the parts connected thereto may be decreased, and thus, a configuration of the electronic device may be simplified.

Figure 9:
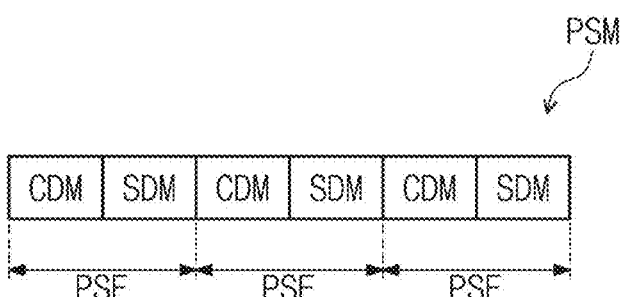
FIG. 9 is a view illustrating an operation of a pen sensing mode according to an embodiment of the present disclosure.
Figure 10A:
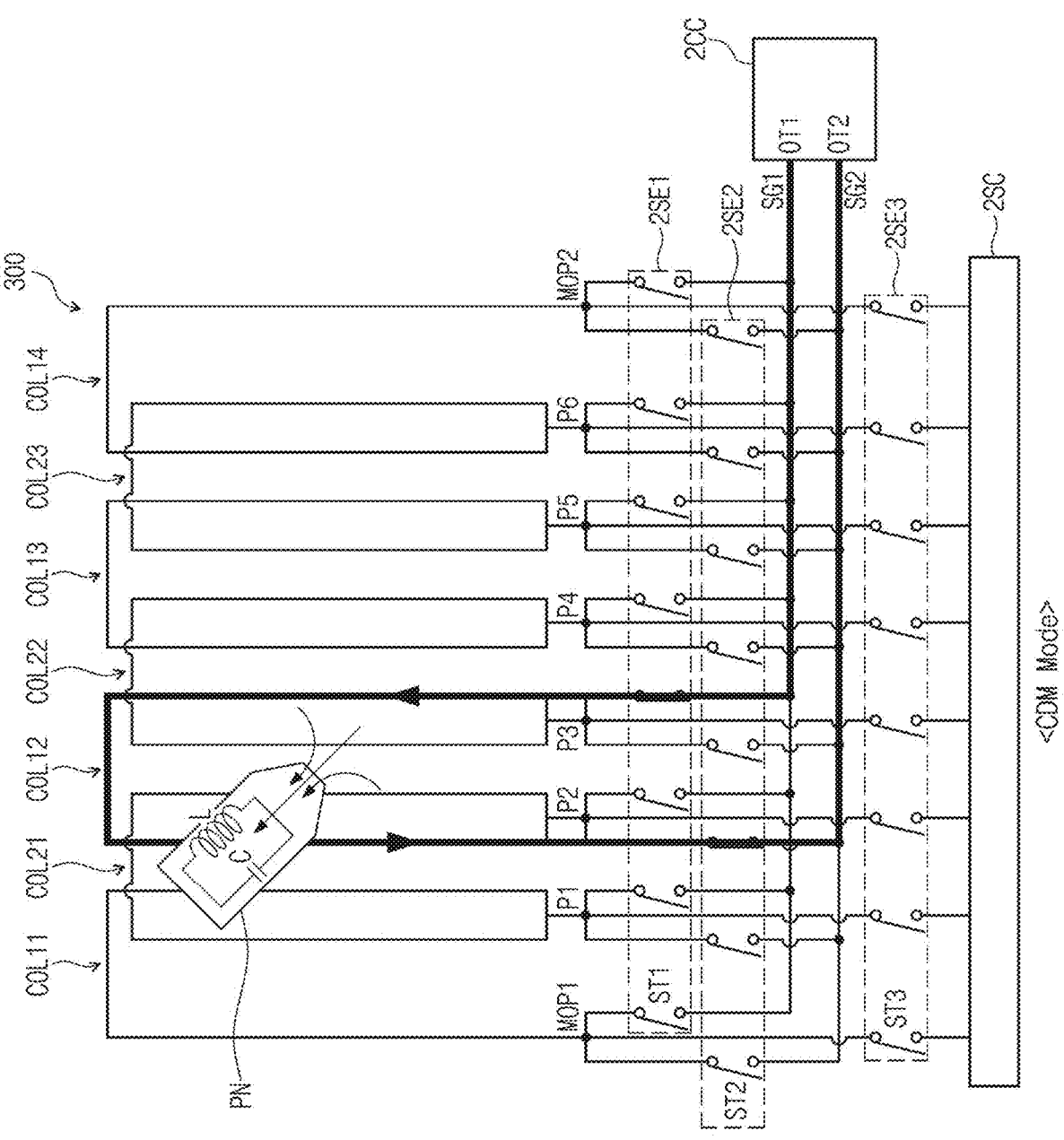
FIG. 10A is a view illustrating the lower conductive layer operating in a charging driving mode of FIG. 9.
Figure 10B:
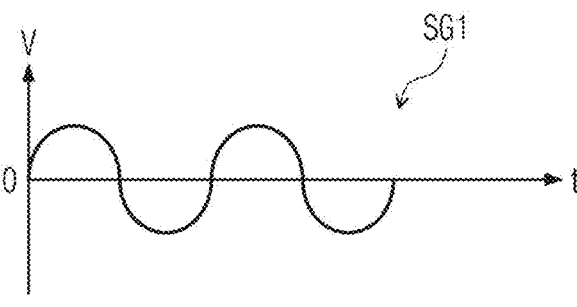
FIG. 10B illustrates graphs depicting waveforms of a first signal and a second signal according to an embodiment of the present disclosure.
Figure 10B:
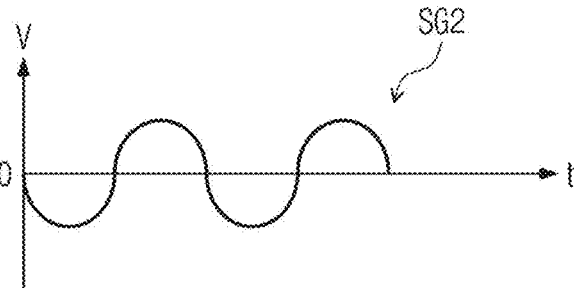
Figure 10C:
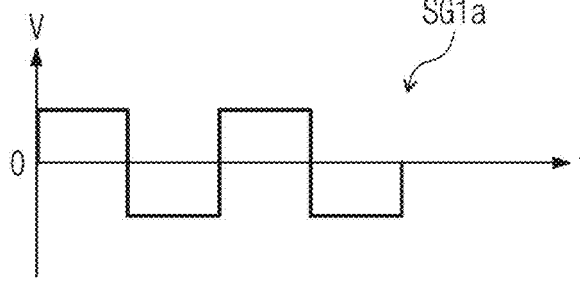
FIG. 10C illustrates graphs depicting waveforms of a first signal and a second signal according to an embodiment of the present disclosure.
Figure 10C:
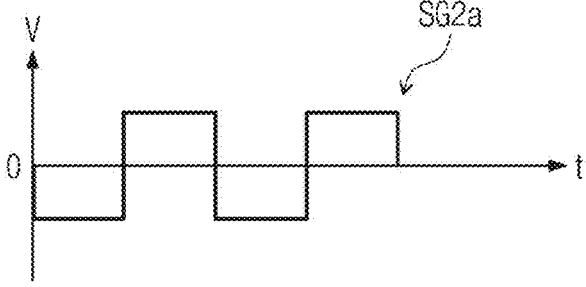
Figure 11:
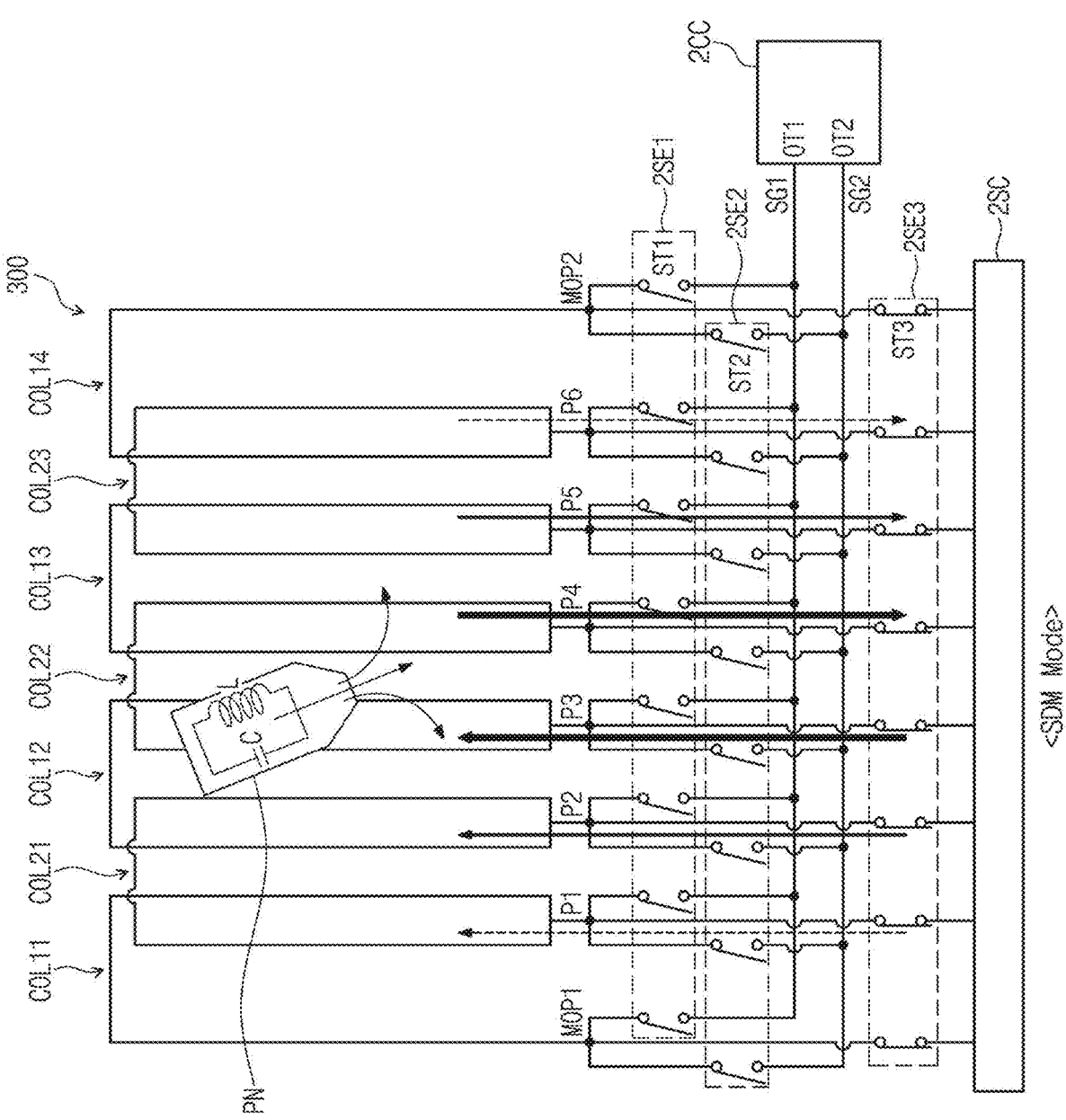
FIG. 11 is a view illustrating the lower conductive layer operating in a sensing driving mode of FIG. 9.

FIG. 9 is a view illustrating an operation of a pen sensing mode according to an embodiment of the present disclosure. FIG. 10A is a view illustrating the lower conductive layer operating in a charging driving mode of FIG. 9. FIG. 10B illustrates graphs depicting waveforms of a first charging signal SG1 and a second charging signal SG2 according to an embodiment of the present disclosure. FIG. 10C illustrates graphs depicting waveforms of a first charging signal SG1*a* and a second charging signal SG2*a* according to an embodiment of the present disclosure. FIG. 11 is a view illustrating the lower conductive layer operating in a sensing driving mode of FIG. 9.

Referring to FIGS. 9 and 10A, the pen sensing mode PSM may include a charging driving mode CDM and a sensing driving mode SDM. The charging driving mode CDM may be for charging the pen PN, and the resonance circuit of the pen PN may be charged by forming a current path in the lower conductive layer 300 in the charging driving mode CDM. The sensing driving mode SDM may be for sensing an input of the pen PN. In the sensing driving mode SDM, the position of the pen PN may be sensed.

In the pen sensing mode PSM, a plurality of pen sensing frames PSF may be continuously generated. Each of the pen sensing frames PSF may include a section in which the lower conductive layer operates in the charging driving mode CDM, and a section in which the lower conductive layer operates in the sensing driving mode SDM. Accordingly, in the pens sensing mode PSM, the charging driving mode CDM and the sensing driving mode SDM may be alternately generated.

Referring to FIGS. 10A to 11, the sensor driver 200C (e.g., refer to FIG. 6A) includes a charging circuit 2CC, a sensor circuit 2SC, a first switching circuit 2SE1, a second switching circuit 2SE2, and a third switching circuit 2SE3. The charging circuit 2CC may be connected to the lower conductive layer 300 through the first and second switching circuits 2SE1 and 2SE2. The charging circuit 2CC may include a first terminal OT1 that outputs the first charging signal SG1, and a second terminal OT2 that outputs the second charging signal SG2.

The first switching circuit 2SE1 may include a plurality of first switching elements ST1 that switch a connection between the connecting pins P1 to P6, MOP1, and MOP2 of the lower conductive layer 300 and the first terminal OT1. The second switching circuit 2SE2 may include a plurality of second switching elements ST2 that switch a connection between the connecting pins P1 to P6, MOP1, and MOP2 of the lower conductive layer 300 and the second terminal OT2.

When the pen PN is charged using the first-second coil COL12 in the charging driving mode CDM, the second and third connecting pins P2 and P3 may be connected to the charging circuit 2CC through the first and second switching circuits 2SE1 and 2SE2. In more detail, from among the first switching elements ST1, the first switching element ST1 (e.g., only the first switching element ST1) connected to the third connecting pin P3 may be turned on, and the first switching elements ST1 connected to the other remaining connecting pins P1, P2, P4 to P6, MOP1, and MOP2 may be turned off. Accordingly, the first charging signal SG1 output from the first terminal OT1 of the charging circuit 2CC may be provided to the third connecting pin P3 through the first switching element ST1 connected to the third connecting pin P3. From among the second switching elements ST2, the second switching element ST2 (e.g., only the second switching element ST2) connected to the second connecting pin P2 may be turned on, and the second switching elements ST2 connected to the other remaining connecting pins P1, P3 to P6, MOP1, and MOP2 may be turned off. Accordingly, the second charging signal SG2 output from the second terminal OT2 of the charging circuit 2CC may be provided to the second connecting pin P2 through the second switching element ST2 connected to the second connecting pin P2.

Referring to FIG. 10B, the first and second charging signals SG1 and SG2 may be alternating current signals having opposite phases from each other. For example, the first and second charging signals SG1 and SG2 may be sinusoidal signals. Because the first and second charging signals SG1 and SG2 may have opposite phases from each other, a current path may be formed in the first-second coil COL12. In addition, because the first charging signal SG1 and the second charging signal SG2 may be sinusoidal signals having an inverse phase relationship with each other, a direction of the current path may be periodically varied (e.g., may be periodically alternated).

Referring to FIG. 10C, the first charging signal SG1_a_ and the second charging signal SG2_a_ may be square-wave signals. The second charging signal SG2_a_ may be an inverse signal of the first charging signal SG1_a_. Because the first and second charging signals SG1_a_ and SG2_a_ may be signals having opposite phases from each other, a current path may be formed in the first-second coil COL12. In addition, because the first charging signal SG1_a_ and the second charging signal SG2_a_ may be square-wave signals having an inverse phase relationship with each other, a direction of the current path may be periodically varied (e.g., may be periodically alternated).

Although FIG. 10A illustrates an example in which the pen PN is charged using the first-second coil COL12, a coil used to charge the pen PN (hereinafter, referred to as the charging coil) may be selected based on the position where the pen PN is sensed.

The third switching circuit 2SE3 includes a plurality of third switching elements ST3 disposed between the sensor circuit 2SC and the connecting pins P1 to P6, MOP1, and MOP2. In the charging driving mode CDM, the third switching elements ST3 may be in a turned-off state. Thereafter, in the sensing driving mode SDM, the third switching elements ST3 may all be switched to a turned-on state. In the sensing driving mode SDM, the first and second switching elements ST1 and ST2 may all be switched to a turned-off state.

In the sensing driving mode SDM, the sensor circuit 2SC may be electrically connected with the connecting pins P1 to P6, MOP1, and MOP2 through the third switching circuit 2SE3. Due to a magnetic field generated from the pen PN, an induced current may flow in the coils disposed in the lower conductive layer 300. The generated induced current may be provided to the sensor circuit 2SC through the third switching circuit 2SE3. The sensor circuit 2SC may detect the position (e.g., the coordinates) of the pen using the sensed induced current.

The direction of a current path flowing in the coils located on the left side with respect to the pen PN may be opposite to the direction of a current path flowing in the coils located on the right side with respect to the pen PN. Accordingly, the pen PN may be located between two connecting pins where the directions of current paths are opposite to each other. In this case, the charging coil in a next pen sensing frame may be selected as a coil connected to the two connecting pins where the directions of current paths are opposite to each other.

When the pen PN is not located at the center between two connecting pins where the directions of the current paths are opposite to each other, absolute current values of the current paths may be different from each other. The absolute current value of the current path close to the pen PN may be greater than the absolute current value of the current path farther away from the pen PN. In this case, the sensor driver 200C (e.g., refer to FIG. 6A) may select the connecting pin having the larger absolute current value of the two connecting pins, and may select a coil connected to the selected connecting pin and one pin adjacent to the selected connecting pin as a charging coil.

In some embodiments, each of the charging circuit 2CC and the sensor circuit 2SC may be implemented as an integrated circuit (IC). In some embodiments, the charging circuit 2CC and the sensor circuit 2SC may be implemented together in the same integrated circuit (IC), or may be implemented in separate integrated circuits (IC). However, the present disclosure is not limited thereto, and the charging circuit 2CC and the sensor circuit 2SC may be implemented as any suitable hardware, firmware, software, or a combination thereof, including one or more processors (e.g., a CPU, GPU, ASIC, FPGA, and/or the like).

Figure 12:
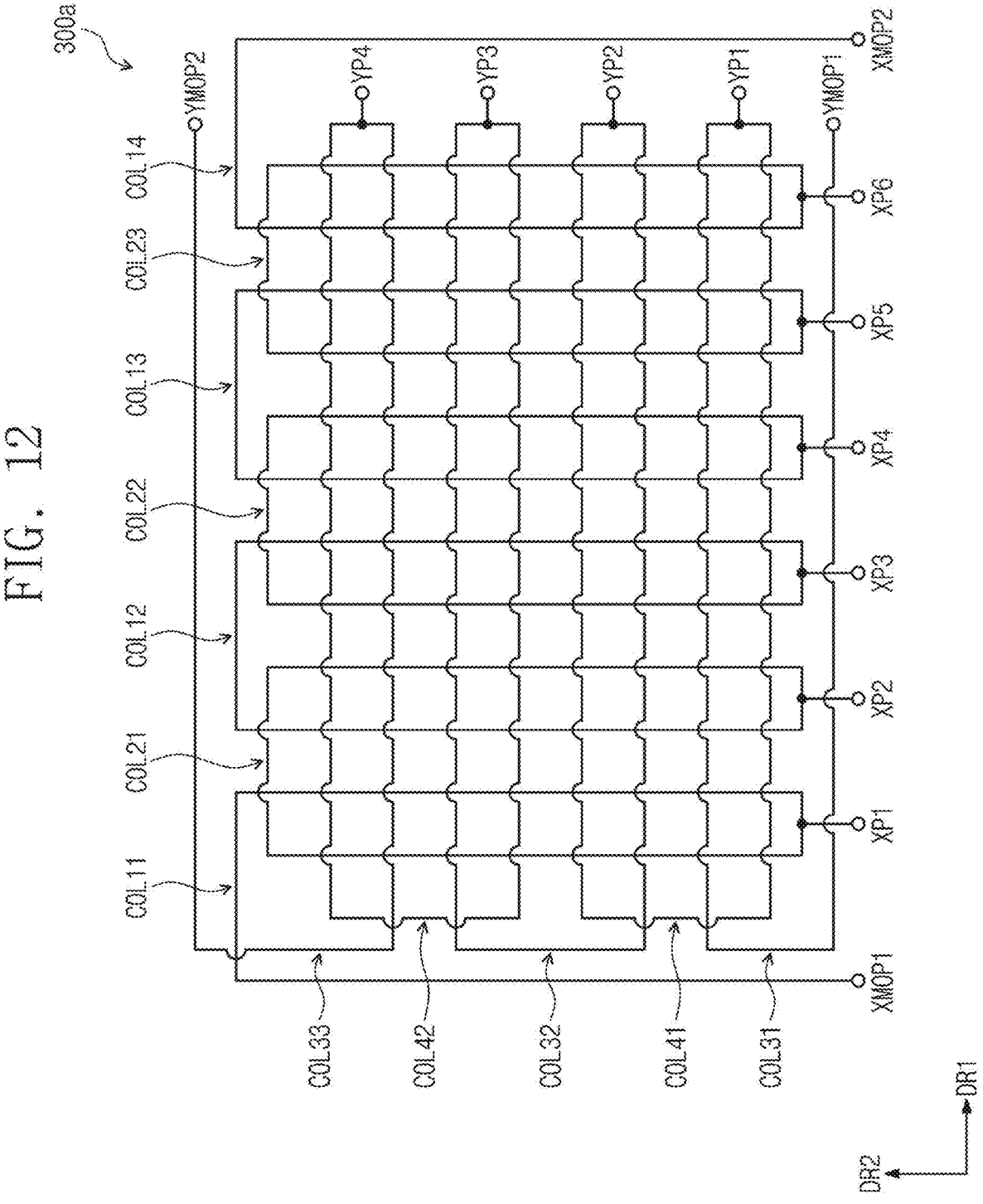
FIG. 12 is a schematic plan view illustrating a lower conductive layer according to an embodiment of the present disclosure.

FIG. 12 is a schematic plan view illustrating a lower conductive layer according to an embodiment of the present disclosure.

Referring to FIG. 12, the lower conductive layer 300a according to an embodiment of the present disclosure includes first x-axis coils COL11, COL12, COL13, and COL14, second x-axis coils COL21, COL22, and COL23, first y-axis coils COL31, COL32, and COL33 (e.g., referred to as third coils) and second y-axis coils COL41 and COL42 (e.g., referred to as fourth coils).

The first x-axis coils COL11, COL12, COL13, and COL14 may be spaced apart from one another along the first direction DR1, and the second x-axis coils COL21, COL22, and COL23 may be spaced apart from one another along the first direction DR1. Each of the second x-axis coils COL21, COL22, and COL23 may cross two first x-axis coils adjacent to each other. Although FIG. 12 illustrates an example in which four first x-axis coils COL11, COL12, COL13, and COL14 and three second x-axis coils COL21, COL22, and COL23 are provided, the number of first x-axis coils COL11, COL12, COL13, and COL14 and the number of second x-axis coils COL21, COL22, and COL23 are not particularly limited thereto. The four first x-axis coils COL11, COL12, COL13, and COL14 may be referred to as the first-first x-axis coil COL11, the first-second x-axis coil COL12, the first-third x-axis coil COL13, and the first-fourth x-axis coil COL14, respectively. The three second x-axis coils COL21, COL22, and COL23 may be referred to as the second-first x-axis coil COL21, the second-second x-axis coil COL22, and the second-third x-axis coil COL23, respectively.

The first y-axis coils COL31, COL32, and COL33 may be spaced apart from one another along the second direction DR2, and the second y-axis coils COL41 and COL42 may be spaced apart from each another in the second direction DR2. Each of the second y-axis coils COL41 and COL42 may cross two first y-axis coils adjacent to each other. Although FIG. 12 illustrates an example in which three first y-axis coils COL31, COL32, and COL33 and two second y-axis coils COL41 and COL42 are provided, the number of first y-axis coils COL31, COL32, and COL33 and the number of second y-axis coils COL41 and COL42 are not particularly limited thereto. The three first y-axis coils COL31, COL32, and COL33 may be referred to as the third-first y-axis coil COL31, the third-second y-axis coil COL32, and the third-third y-axis coil COL33, respectively. The two second y-axis coils COL41 and COL42 may be referred to as the fourth-first y-axis coil COL41 and the fourth-second y-axis coil COL42, respectively.

The lower conductive layer 300a may further includes x-axis connecting pins XP1 to XP6, XMOP1, and XMOP2 that connect to ends of the first x-axis coils COL11, COL12, COL13, and COL14 and to ends of the second x-axis coils COL21, COL22, and COL23. In an embodiment of the present disclosure, the x-axis connecting pins XP1 to XP6, XMOP1, and XMOP2 include first to sixth connecting pins XP1 to XP6, and first and second outermost connecting pins XMOP1 and XMOP2.

The lower conductive layer 300a may further include y-axis connecting pins YP1 to YP4, YMOP1, and YMOP2 that connect to ends of the first y-axis coils COL31, COL32, and COL33 and to ends of the second y-axis coils COL41 and COL42. In an embodiment of the present disclosure, the y-axis connecting pins YP1 to YP4, YMOP1, and YMOP2 include seventh to tenth connecting pins YP1 to YP4, and the third and fourth outermost connecting pins YMOP1 and YMOP2.

The sensor driver 200C (e.g., refer to FIG. 6A) may be connected to the x-axis coils COL11 to COL14 and COL21 to COL23 through the x-axis connecting pins XP1 to XP6, XMOP1, and XMOP2, and may be connected to the y-axis coils COL31 to COL33, COL41, and COL42 through the y-axis connecting pins YP1 to YP4, YMOP1, and YMOP2.

In the charging driving mode CDM, the sensor driver 200C may select one of the first x-axis coils COL11, COL12, COL13, and COL14 and/or the second x-axis coils COL21, COL22, and COL23 as a charging coil, and may perform a charging operation for charging the pen PN. In other words, the first y-axis coils COL31, COL32, and COL33 and the second y-axis coils COL41 and COL42 may not be used in the charging operation.

In the sensing driving mode, the sensor driver 200C may detect the x-axis coordinate of the pen PN using the first x-axis coils COL11, COL12, COL13, and COL14 and the second x-axis coils COL21, COL22, and COL23, and may detect the y-axis coordinate of the pen PN using the first y-axis coils COL31, COL32, and COL33 and the second y-axis coils COL41 and COL42.

Figure 13A:
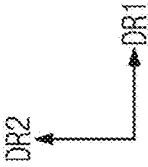
FIGS. 13A and 13B are schematic plan views illustrating lower conductive layers according to some embodiments of the present disclosure.
Figure 13B:
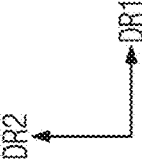

FIGS. 13A and 13B are schematic plan views illustrating lower conductive layers 300b and 300c according to some embodiments of the present disclosure. In FIGS. 13A and 13B, first and second coils COL11 to COL14 and COL21 to COL23 may have the same or substantially the same structure as those of the first and second coils COL11 to COL14 and COL21 to COL23 described above with reference to FIG. 8A, and therefore, redundant description thereof may not be repeated.

Referring to FIGS. 8A and 13A, the lower conductive layer 300b according to an embodiment of the present disclosure includes the first coils COL11, COL12, COL13, and COL14, the second coils COL21, COL22, and COL23, and a dummy electrode.

In an embodiment of the present disclosure, the dummy electrode includes a plurality of dummy bar patterns DBP1 that extend in the second direction DR2, and that are arranged along the first direction DR1. The plurality of dummy bar patterns DBP1 may be disposed in spaces between the first and second coils COL11 to COL14 and COL21 to COL23, and may improve a surface flatness of the lower conductive layer 300b. In other words, because the dummy bar patterns DBP1 may be provided, steps that may be caused by the first and second coils COL11 to COL14 and COL21 to COL23 on the surface of the lower conductive layer 300b may be removed or reduced. Further, a deterioration in the visibility of the electronic device 1000 due to the surface steps of the lower conductive layer 300b may be prevented or substantially prevented.

At least one dummy bar pattern (e.g., two dummy bar patterns DBP1) may be disposed between the first-second extension part EP12 and the second-first extension part EP21. In addition, at least one dummy bar pattern (e.g., two dummy bar patterns DBP1) may be disposed between the first-second extension part EP12 and the third extension part EP3, and at least one dummy bar pattern (e.g., two dummy bar patterns DBP1) may be disposed between the second-first extension part EP21 and the fourth extension part EP4.

Although FIG. 13A illustrates a structure in which the same number of dummy bar patterns DBP1 are provided between the first-second extension part EP12 and the second-first extension part EP21, between the first-second extension part EP12 and the third extension part EP3, and between the second-first extension part EP21 and the fourth extension part EP4, the present disclosure is not limited thereto.

At least one dummy bar pattern (e.g., four dummy bar patterns DBP1) may be disposed between the first-first extension part EP11 and the third extension part EP3. The number of dummy bar patterns DBP1 disposed between the first-first extension part EP11 and the third extension part EP3 may be different from the number of dummy bar patterns DBP1 disposed between the first-second extension part EP12 and the third extension part EP3. As another example, the dummy bar patterns DBP1 between the first-first extension part EP11 and the third extension part EP3 may have a different width in the first direction DR1 than that of the dummy bar patterns DBP1 between the first-second extension part EP12 and the third extension part EP3.

In an embodiment of the present disclosure, the dummy bar patterns DBP1 may be disposed on the first layer 301 (e.g., refer to FIG. 8B). In other words, the dummy bar patterns DBP1, the first-second extension part EP12, and the second-first extension part EP21 may be disposed at (e.g., in or on) the same layer as each other.

The dummy bar patterns DBP1 may be disposed in the form of an island, and may be in an electrically floated state. However, the present disclosure is not limited thereto. For example, the dummy bar patterns DBP1 may be electrically connected together. In this case, the dummy bar patterns DBP1 may be grounded, or may receive a voltage having a suitable potential (e.g., a specific or predetermined potential).

Although FIG. 13A illustrates a structure in which the dummy electrode includes the dummy bar patterns DBP1, the form of the dummy electrode is not limited thereto, and may be modified in various suitable forms as needed or desired.

Referring to FIG. 13B, a dummy electrode DDE according to an embodiment of the present disclosure includes a plurality of dummy electrode patterns DEPa, and at least one dummy bar pattern DBPa. The plurality of dummy electrode patterns DEPa and the at least one dummy bar pattern DBPa may be disposed in spaces between the first and second coils COL11 to COL14 and COL21 to COL23, and may improve a surface flatness of the lower conductive layer 300c.

The plurality of dummy electrode patterns DEPa may be arranged in a matrix form along the first direction DR1 and the second direction DR2. Each of the dummy electrode patterns DEPa may have a polygonal shape, but the present disclosure is not particularly limited thereto.

Dummy electrode patterns (e.g., eleven dummy electrode patterns DEPa) arranged along the second direction DR2 may be disposed between the first-second extension part EP12 and the second-first extension part EP21, between the first-second extension part EP12 and the third extension part EP3, and between the second-first extension part EP21 and the fourth extension part EP4. Two columns of dummy electrode patterns DEPa and one dummy bar pattern DBPa may be disposed between the first-first extension part EP11 and the third extension part EP3.

Figure 14A:
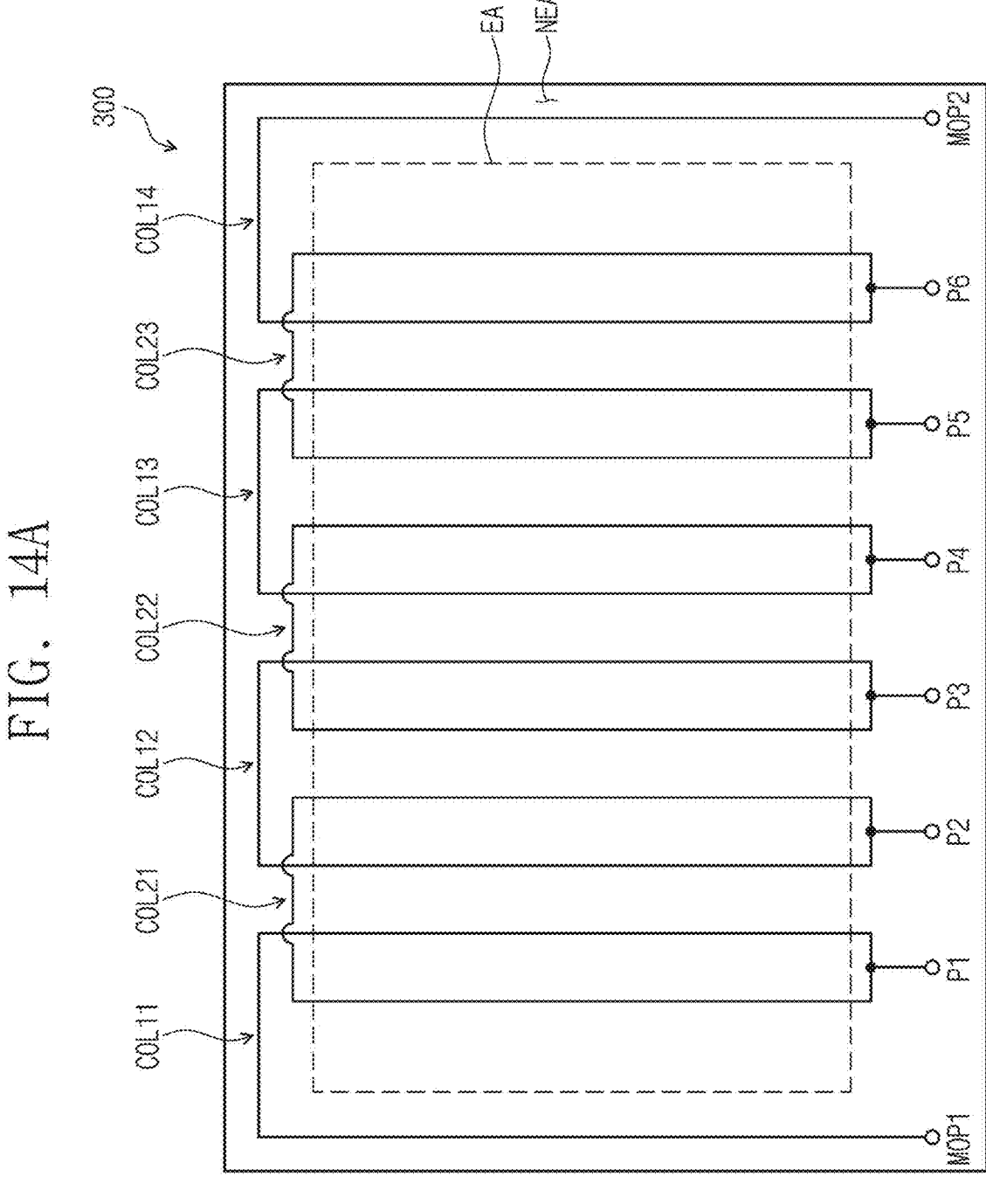
FIGS. 14A and 14B are plan views illustrating effective areas and non-effective areas of lower conductive layers according to some embodiments of the present disclosure.
Figure 14B:
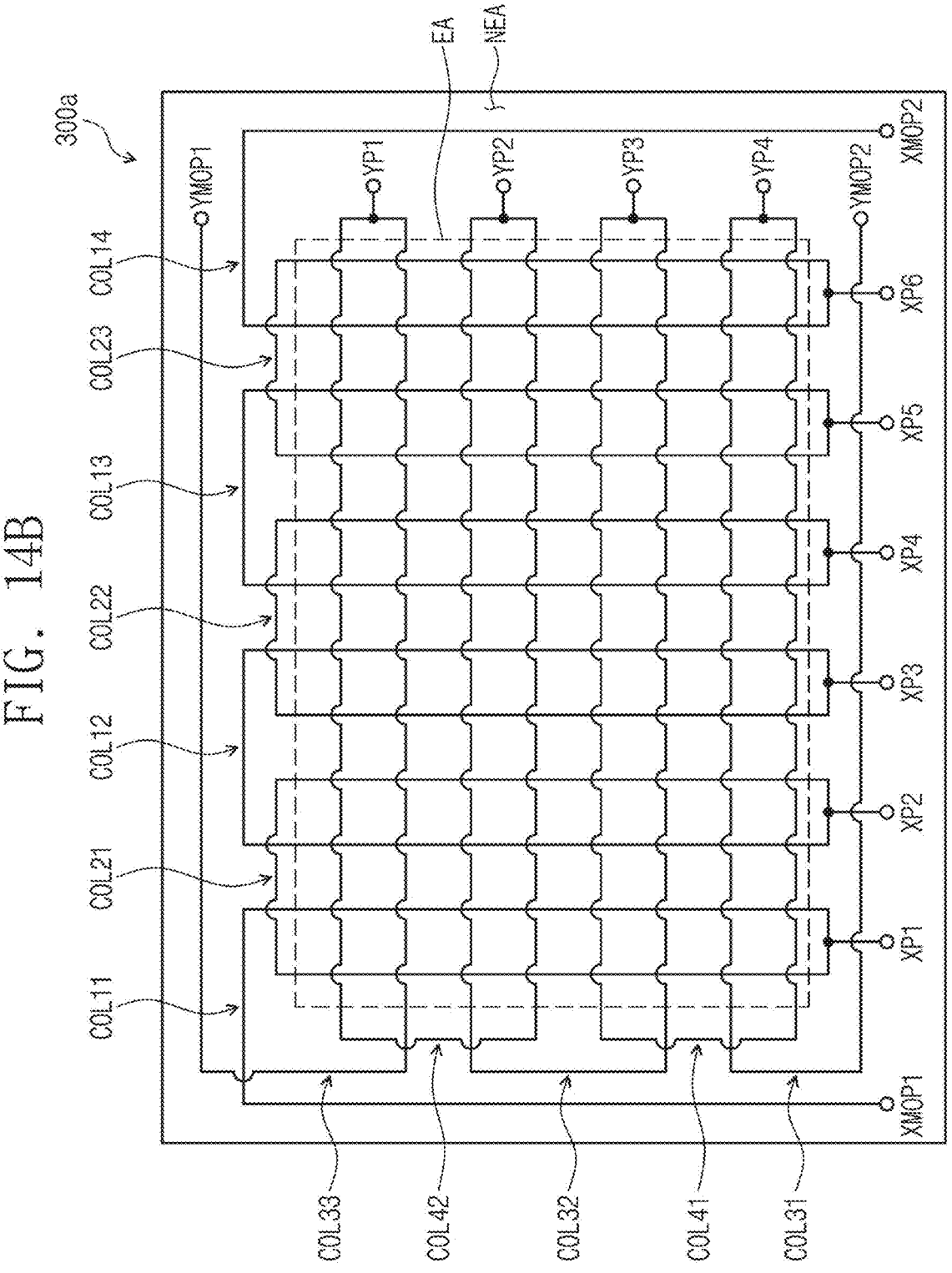

FIGS. 14A and 14B are plan views illustrating effective areas and non-effective areas of lower conductive layers according to some embodiments of the present disclosure. FIG. 14A is a plan view illustrating an effective area EA and a non-effective area NEA of the lower conductive layer 300 according to an embodiment of the present disclosure, and FIG. 14B is a plan view illustrating an effective area EA and a non-effective area NEA of the lower conductive layer 300a according to an embodiment of the present disclosure.

Referring to FIGS. 8A and 14A, the lower conductive layer 300 may include the effective area EA, and the non-effective area NEA adjacent to the effective area EA. The effective area EA may be an area that is used or substantially used to sense the pen PN, and the non-effective area NEA may be an area that is not used or substantially used for pen sensing. In an embodiment of the present disclosure, the non-effective area NEA may surround (e.g., around a periphery of) the effective area EA.

The effective area EA may be an area corresponding to the first display part DA1-F described above with reference to FIG. 1A, and the non-effective area NEA may be an area corresponding to the first non-display part NDA1.

In an embodiment of the present disclosure, the connecting parts of the first coils COL11 to COL14 and the connecting parts of the second coils COL21 to COL23 may not overlap with the effective area EA when viewed from above the plane (e.g., in a plan view). In other words, the first-first connecting part CP11 and the first-second connecting part CP12 may be disposed outside the effective area EA (e.g., in the non-effective area NEA). In addition, the second connecting parts CP21 of the second coils COL21 to COL23 may also be disposed outside the effective area EA (e.g., in the non-effective area NEA).

From among the first coils COL11, COL12, COL13, and COL14, the first-first coil COL11 may be defined as the first outermost coil adjacent to a first side (e.g., the left side) of the effective area EA. The first-first extension part EP11 (e.g., referred to as the first-first outermost extension part) of the first-first coil COL11 may not overlap with the effective area EA, and the first-second extension part EP12 (e.g., referred to as the first-second outermost extension part) of the first-first coil COL11 may overlap with the effective area EA.

From among the first coils COL11, COL12, COL13, and COL14, the first-fourth coil COL14 may be defined as the second outermost coil adjacent to a second side (e.g., the right side) of the effective area EA. The first-fourth extension part EP14 (e.g., referred to as the second-first outermost extension) of the first-fourth coil COL14 may not overlap with the effective area EA, and the fourth-second extension part EP42 (e.g., referred to as the second-second outermost extension) of the first-fourth coil COL14 may overlap with the effective area EA. In other words, the first-first outermost extension part EP11 of the first outermost coil COL11 and the first-second outermost extension part EP42 of the second outermost coil COL14 may be disposed in the non-effective area NEA, and may be used to charge the pen PN in the charging driving mode CDM, but may not be used to detect the coordinates of the pen PN in the sensing driving mode SDM.

The connecting pins P1 to P6, MOP1, and MOP2 may not overlap with the effective area EA when viewed from above the plane (e.g., in a plan view). The connecting pins P1 to P6, MOP1, and MOP2 may be disposed in the non-effective area NEA. The connecting pins P1 to P6, MOP1, and MOP2 may be electrically connected with the sensor driver 200C (e.g., refer to FIG. 6A) through a flexible circuit film attached to the non-effective area NEA of the lower conductive layer 300.

Referring to FIG. 14B, the lower conductive layer 300a may include the effective area EA, and the non-effective area NEA adjacent to the effective area EA.

The connecting parts of the first x-axis coils COL11 to COL14 and the connecting parts of the second x-axis coils COL21 to COL23 may not overlap with the effective area EA when viewed from above the plane (e.g., in a plan view). In addition, the connecting parts of the first y-axis coils COL31 to COL33 and the connecting parts of the second y-axis coils COL41 and COL42 may not overlap with the effective area EA when viewed from above the plane (e.g., in a plan view).

A portion of the first outermost coil COL11 adjacent to a first side (e.g., the left side) of the effective area EA from among the first x-axis coils COL11 to COL14 may be disposed in the non-effective area NEA. A portion of the second outermost coil COL14 adjacent to a second side (e.g., the right side) of the effective area EA from among the first x-axis coils COL11 to COL14 may overlap with the non-effective area NEA. A portion of the third outermost coil COL31 adjacent to a third side (e.g., the lower side) of the effective area EA from among the first y-axis coils COL31 to COL33 may be disposed in the non-effective area NEA, and a portion of the fourth outermost coil COL33 adjacent to a fourth side (e.g., the upper side) of the effective area EA from among the first y-axis coils COL31 to COL33 may overlap with the non-effective area NEA.

The x-axis connecting pins XP1 to XP6, XMOP1, and XMOP2 and the y-axis connecting pins YP1 to YP4, YMOP1, and YMOP2 may not overlap with the effective area EA when viewed from above the plane (e.g., in a plan view). The x-axis connecting pins XP1 to XP6, XMOP1, and XMOP2 and the y-axis connecting pins YP1 to YP4, YMOP1, and YMOP2 may be disposed in the non-effective area NEA. The x-axis connecting pins XP1 to XP6, XMOP1, and XMOP2 and the y-axis connecting pins YP1 to YP4, YMOP1, and YMOP2 may be electrically connected with the sensor driver 200C (e.g., refer to FIG. 6A) through a flexible circuit film attached to the non-effective area NEA of the lower conductive layer 300a.

Figure 15:
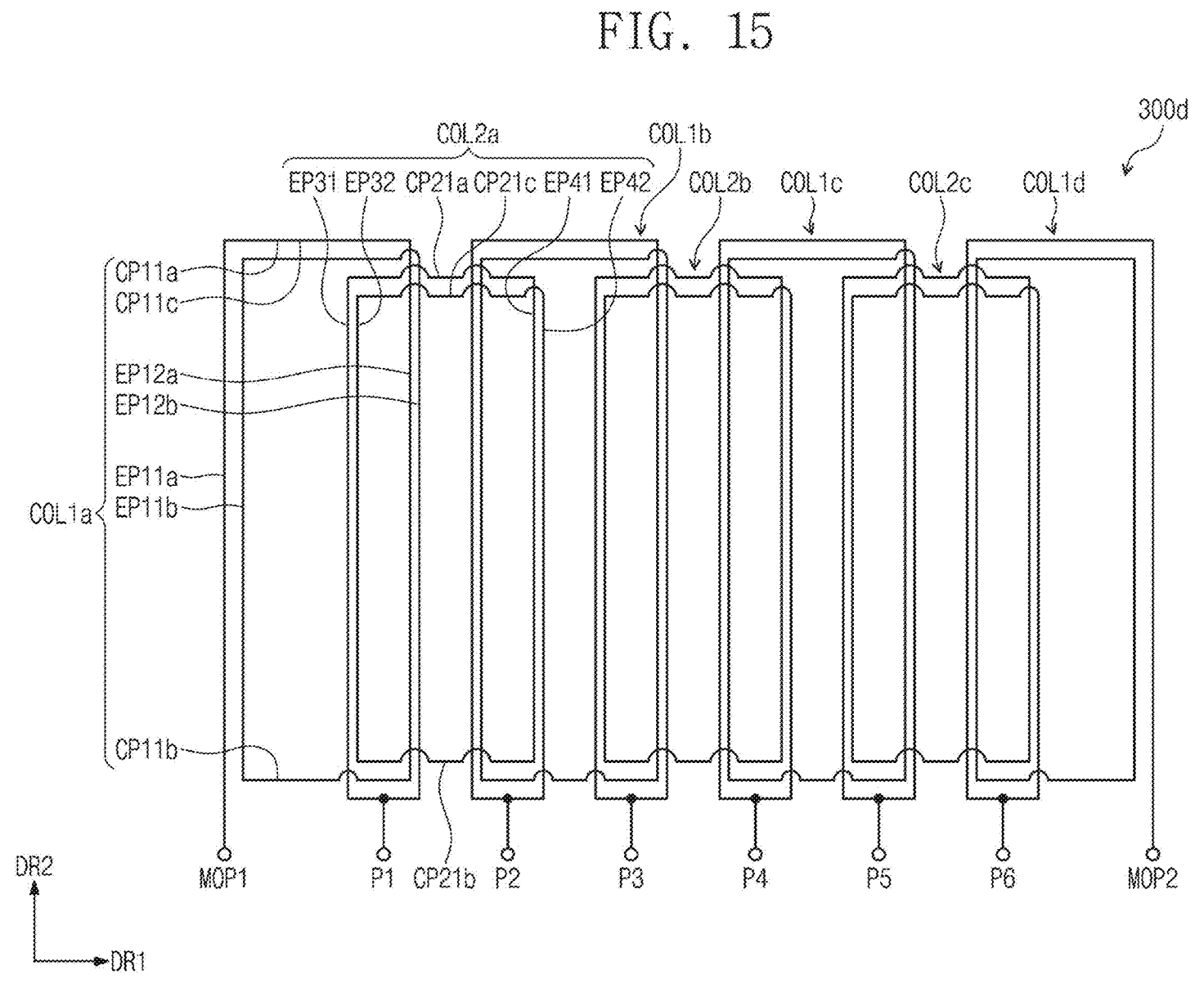

FIG. 15 is a plan view illustrating a lower conductive layer 300d according to an embodiment of the present disclosure.

Referring to FIG. 15, the lower conductive layer 300d includes first coils COL1a, COL1b, COL1c, and COL1d and second coils COL2a, COL2b, and COL2c. The first coils COL1a, COL1b, COL1c, and COL1d may be spaced apart from one another along the first direction DR1. The second coils COL2a, COL2b, and COL2c may be spaced apart from one another along the first direction DR1. Each of the second coils COL2a, COL2b, and COL2c may cross two first coils adjacent to each other.

From among the first coils COL1a, COL1b, COL1c, and COL1d, the first-first coil COL1a includes a first-first extension part EP11a, a first-second extension part EP12a, a first-first connecting part CP11a, a first-third extension part EP11b, a first-third extension part EP12b, a first-second connecting part CP11b, and a first-third connecting part CP11c. The first-first to first-fourth extension parts EP11a, EP12a, EP11b, and EP12b extend in the second direction DR2. The first-first coil COL1a may have a loop shape that is wound one or more turns. The first-first coil COL1a may have a shape that is the same or substantially the same as (or similar to) those of the other remaining first coils COL1b, COL1c, and COL1d. When the first-first coil COL1a has a loop shape that is wound one or more turns as described above, the magnitude of a current induced in the first-first coil COL1a may be increased.

From among the second coils COL2a, COL2b, and COL2c, the second-first coil COL2a includes a third-first extension part EP31, a fourth-first extension part EP41, a second-first connecting part CP21a, a third-second extension part EP32, a fourth-second extension part EP42, a second-second connecting part CP21b, and a second-third connecting part CP21c. The second-first coil COL2a may have a loop shape that is wound one or more turns. The second-first coil COL2a may have a shape that is the same or substantially the same as (or similar to) those of the other remaining second coils COL2b and COL2c. When the second-first coil COL2a has a loop shape that is wound one or more turns as described above, the magnitude of a current induced in the second-first coil COL2a may be increased.

Figure 16:
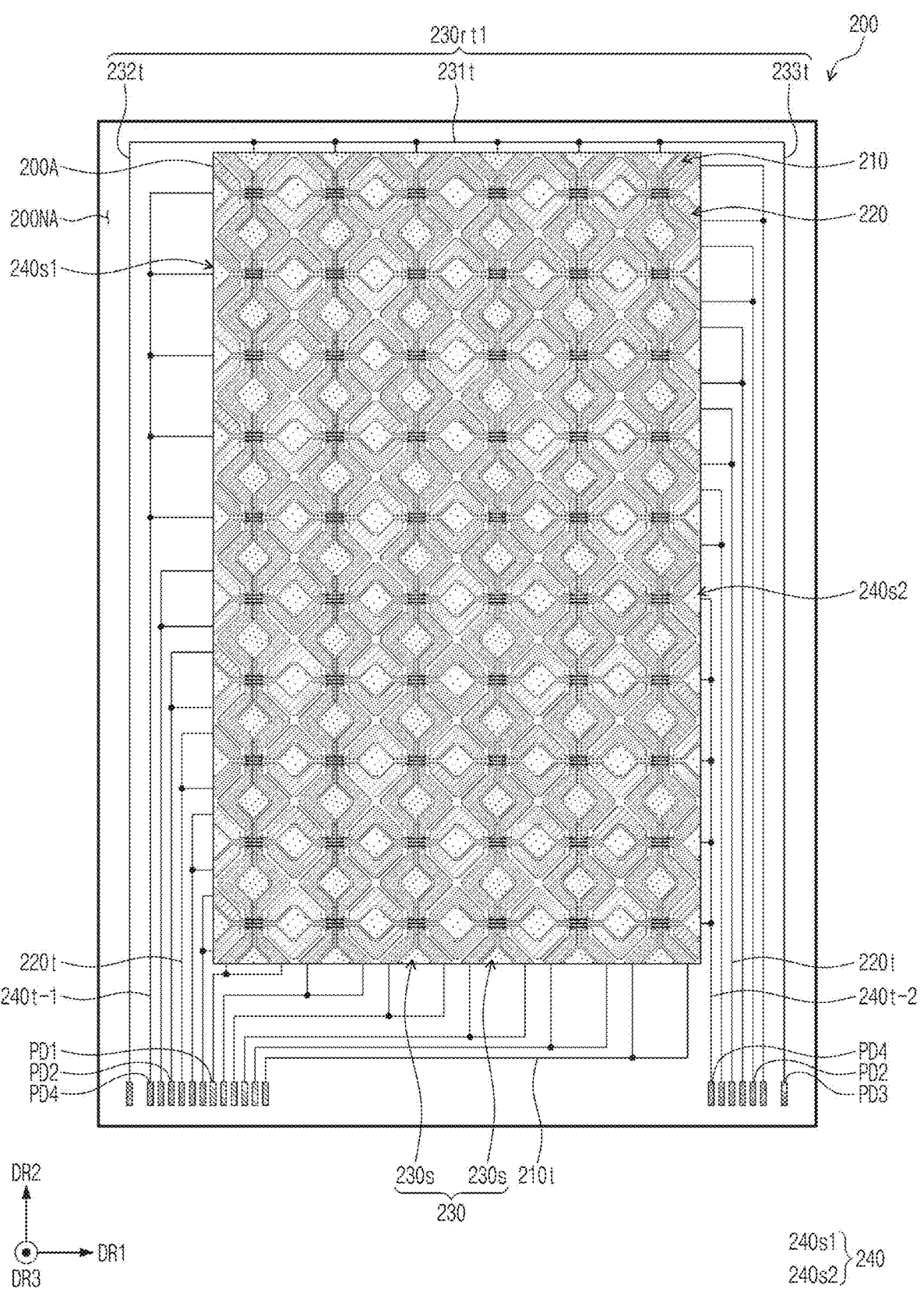
FIG. 16 is a plan view of the sensor layer according to an embodiment of the present disclosure.
Figure 17:
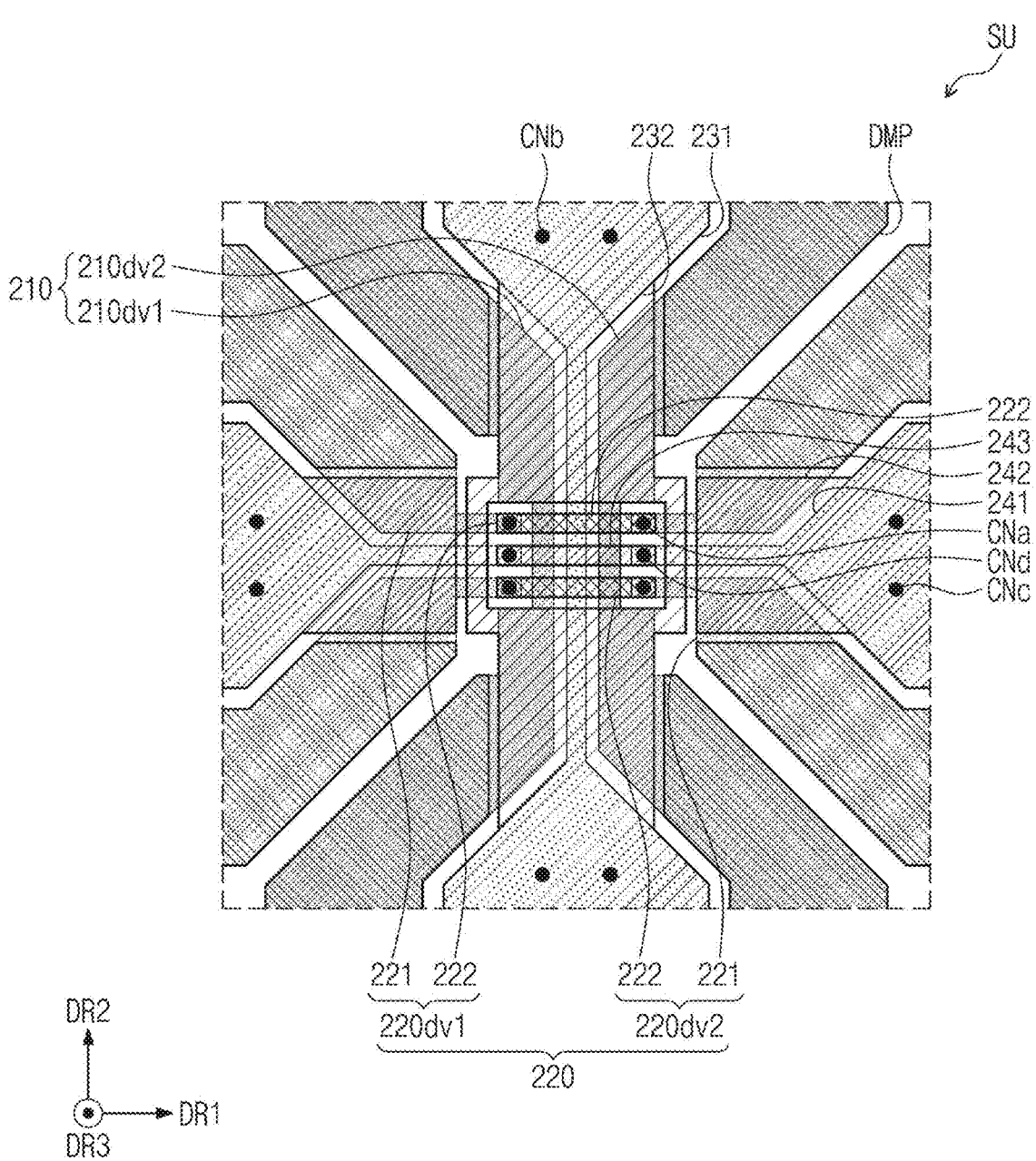
FIG. 17 is an enlarged plan view illustrating one sensing unit according to an embodiment of the present disclosure.
Figure 18A:
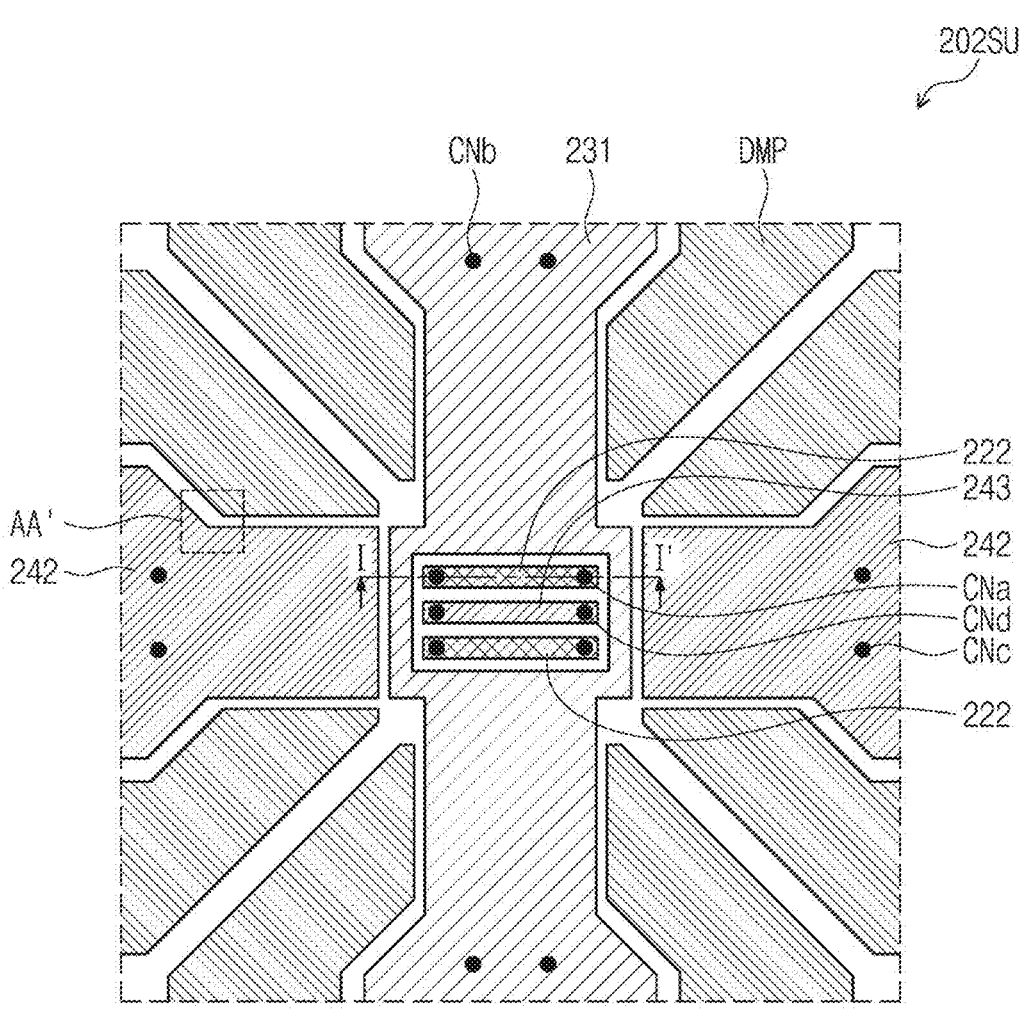
FIG. 18A is a plan view illustrating a first conductive layer of the sensing unit according to an embodiment of the present disclosure.
Figure 18A:
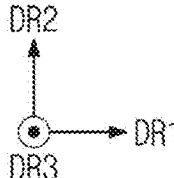
Figure 18B:
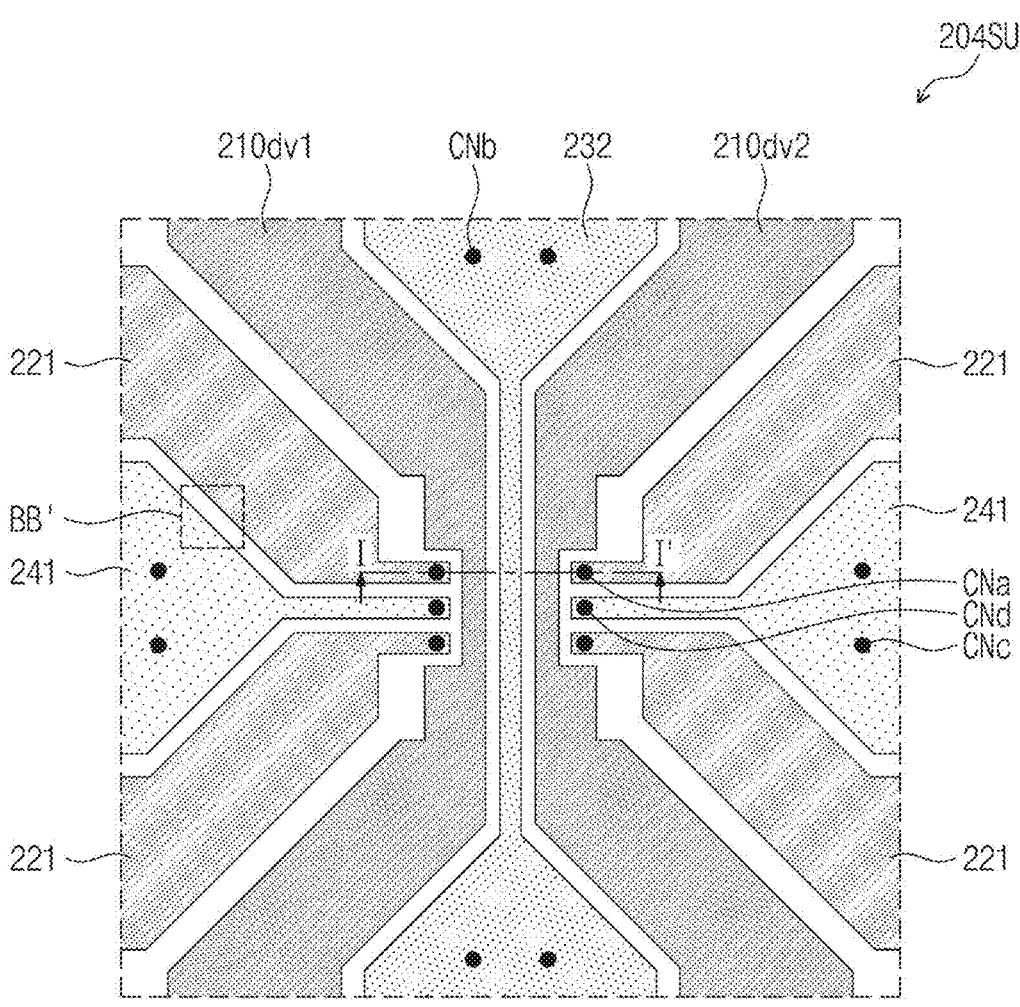
FIG. 18B is a plan view illustrating a second conductive layer of the sensing unit according to an embodiment of the present disclosure.
Figure 18B:
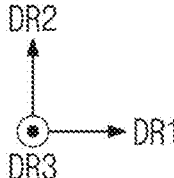
Figure 19:
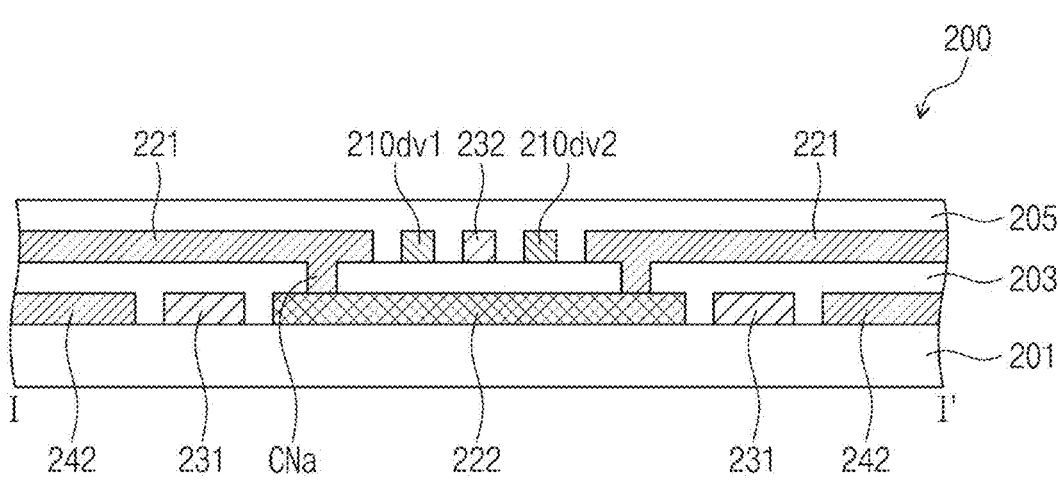
FIG. 19 is a sectional view of the sensor layer taken along the line I-I' illustrated in FIGS. 18A and 18B according to an embodiment of the present disclosure.
Figure 19:
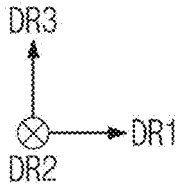

FIG. 16 is a plan view of the sensor layer 200 according to an embodiment of the present disclosure. FIG. 17 is an enlarged plan view illustrating one sensing unit SU according to an embodiment of the present disclosure. FIG. 18A is a plan view illustrating a first conductive layer 202SU of the sensing unit SU according to an embodiment of the present disclosure. FIG. 18B is a plan view illustrating a second conductive layer 204SU of the sensing unit SU according to an embodiment of the present disclosure. FIG. 19 is a sectional view of the sensor layer 200 taken along the line I-I' illustrated in FIGS. 18A and 18B according to an embodiment of the present disclosure.

Referring to FIG. 16, a sensing area 200A and a peripheral area 200NA adjacent to the sensing area 200A may be defined in the sensor layer 200.

The sensor layer 200 may include a plurality of first electrodes 210, a plurality of second electrodes 220, a plurality of third electrodes 230, and a plurality of fourth electrodes 240 disposed in the sensing area 200A.

Each of the first electrodes 210 may cross the second electrodes 220. Each of the first electrodes 210 may extend in the second direction DR2. The first electrodes 210 may be arranged along the first direction DR1 so as to be spaced apart from one another. Each of the second electrodes 220 may extend in the first direction DR1. The second electrodes 220 may be arranged along the second direction DR2 so as to be spaced apart from one another. The sensing unit SU of the sensor layer 200 may be an area where one first electrode 210 and one second electrode 220 cross each other.

In FIG. 16, six first electrodes 210 and ten second electrodes 220 are illustrated as an example, and thus, sixty sensing units SU are illustrated as an example. However, the number of first electrodes 210 and the number of second electrodes 220 are not limited thereto.

Referring to FIGS. 16 and 17, each of the first electrodes 210 may include first divided electrodes 210dv1 and 201dv2. The first divided electrodes 210dv1 and 210dv2 may extend in the second direction DR2, and may be spaced apart from each other in the first direction DR1. The first divided electrodes 210dv1 and 210dv2 may have suitable shapes having a line symmetry with each other with respect to a line extending in the second direction DR2.

Each of the second electrodes 220 may include second divided electrodes 220dv1 and 220dv2. The second electrodes 220 may extend in the first direction DR1, and may be spaced apart from one another in the second direction DR2. The second divided electrodes 220dv1 and 220dv2 may have suitable shapes having a line symmetry with each other with respect to a line extending in the first direction DR1.

Referring to FIGS. 17, 18A, 18B, and 19, each of the second divided electrodes 220dv1 and 220dv2 may include a sensing pattern 221 and a bridge pattern 222. The sensing pattern 221 and the bridge pattern 222 may be disposed at (e.g., in or on) different layers from each other. The sensing pattern 221 and the bridge pattern 222 may be electrically connected with each other through a first contact CNa. For example, the bridge pattern 222 may be included in the first conductive layer 202SU, and the sensing pattern 221 and the first divided electrodes 210*dv*1 and 210*dv*2 may be included in the second conductive layer 204SU. The first conductive layer 202SU may be included in the first conductive layer 202 described above with reference to FIG. 7, and the second conductive layer 204SU may be included in the second conductive layer 204.

Each of the third electrodes 230 may extend in the second direction DR2. The third electrodes 230 may be arranged along the first direction DR1 so as to be spaced apart from one another. In an embodiment of the present disclosure, each of the third electrodes 230 may include a plurality of first auxiliary electrodes 230*s* connected in parallel with each other. The number of first auxiliary electrodes 230*s* included in each of the third electrodes 230 may be variously modified as needed or desired. For example, as the number of first auxiliary electrodes 230*s* included in each of the third electrodes 230 is increased, a resistance of each of the third electrodes 230 may be lowered, and thus, a power efficiency and a sensing sensitivity may be improved. On the other hand, as the number of first auxiliary electrodes 230*s* included in each of the third electrodes 230 is decreased, a loop coil pattern formed using the third electrodes 230 may be implemented in more various desired forms.

Although FIG. 16 illustrates an example in which one third electrode 230 includes two first auxiliary electrodes 230*s*, the present disclosure is not particularly limited thereto. The first auxiliary electrodes 230*s* may be disposed to correspond to the first electrodes 210 in a one-to-one manner. Accordingly, one sensing unit SU may include a portion of one first auxiliary electrode 230*s*.

A coupling capacitor may be defined between one first electrode 210 and one first auxiliary electrode 230*s*. In this case, an induced current generated when the pen is sensed may be transferred from the first auxiliary electrode 230*s* to the first electrode 210 through the coupling capacitor. In other words, the first auxiliary electrode 230*s* may serve to supplement a signal transferred from the first electrode 210 to the sensor driver 200C. Accordingly, a greatest effect may be obtained when the phase of a signal induced in the first auxiliary electrode 230*s* coincides with the phase of a signal induced in the first electrode 210. Thus, the centers of the first electrodes 210 in the second direction DR2 may overlap with the centers of the first auxiliary electrodes 230*s* in the second direction DR2. In addition, the centers of the first electrodes 210 in the first direction DR1 may overlap with the centers of the first auxiliary electrodes 230*s* in the first direction DR1.

In an embodiment of the present disclosure, because one third electrode 230 includes two first auxiliary electrodes 230*s*, the one third electrode 230 may correspond to (e.g., may overlap with) two first electrodes 210. Accordingly, the number of first electrodes 210 included in the sensor layer 200 may be greater than the number of third electrodes 230. For example, the number of first electrodes 210 may be equal to a product of the number of third electrodes 230 included in the sensor layer 200 and the number of first auxiliary electrodes 230*s* included in each of the third electrodes 230. In FIG. 16, the number of first electrodes 210 may be six, the number of third electrodes 230 may be three, and the number of first auxiliary electrodes 230*s* included in each of the third electrodes 230 may be two.

The fourth electrodes 240 may be arranged along the second direction DR2. The fourth electrodes 240 may extend in the first direction DR1. In an embodiment of the present disclosure, each of the fourth electrodes 240 may include second auxiliary electrodes 240*s*1 or 240*s*2 that are connected in parallel with each other. The second auxiliary electrodes 240*s*1 or 240*s*2 may be referred to as second-first auxiliary electrodes 240*s*1 or second-first auxiliary electrodes 240*s*2.

The routing directions of the second auxiliary electrode 240*s*1 and the second auxiliary electrode 240*s*2 may be different from each other. In FIG. 16, two fourth electrodes 240 and five second auxiliary electrodes 240*s*1 or 240*s*2 included in each of the fourth electrodes 240 are illustrated as an example.

As used herein, when the routing directions are different from each other, the connection positions of the electrodes and the trace lines may be different from each other. For example, a first connection position of a fourth trace line 240*t*2 electrically connected with the second auxiliary electrode 240*s*1 may be different from a second connection position of a fourth trace line 24012 electrically connected with the second auxiliary electrode 240*s*2. The first connection position may be a left end with respect to the second auxiliary electrode 240*s*1, and the second connection position may be a right end with respect to the second auxiliary electrode 240*s*2.

In an embodiment of the present disclosure, the sensor layer 200 may include one fourth electrode. In this case, the fourth electrode may include ten second auxiliary electrodes that are connected in parallel with each other. The number of second auxiliary electrodes is illustratively provided based on the illustration of FIG. 16, and the number of second auxiliary electrodes included in the fourth electrode is not particularly limited thereto.

FIG. 16 illustrates an example in which five second auxiliary electrodes 240*s*1 are electrically connected together, and five second auxiliary electrodes 240*s*2 are electrically connected together. In other words, a ratio between the areas of two fourth electrodes 240 or a ratio between the numbers of the second auxiliary electrodes included in the two fourth electrodes 240 may be 1:1. However, the present disclosure is not particularly limited thereto. For example, the number of second auxiliary electrodes 240*s*1 and the number of second auxiliary electrodes 240*s*2 may be different from each other.

In an embodiment of the present disclosure, when each of the fourth electrodes 240 includes the second auxiliary electrodes 240*s*1 or 240*s*2 that are connected in parallel with each other, an effect of increasing the area of one fourth electrode may be obtained. In addition, a resistance of each of the fourth electrodes 240 may be lowered, and thus, the sensing sensitivity for the second input 3000 (e.g., refer to FIG. 6A) may be improved.

A coupling capacitor may be defined between one second electrode 220 and one second auxiliary electrode 240*s*1. In this case, an induced current generated when the pen is sensed may be transferred from the second auxiliary electrode 240*s*1 to the second electrode 220 through the coupling capacitor. In other words, the second auxiliary electrode 240*s*1 may serve to supplement a signal transferred from the second electrode 220 to the sensor driver 200C. Accordingly, a greatest effect may be obtained when the phase of a signal induced in the second auxiliary electrode 240*s*1 coincides with the phase of a signal induced in the second electrode 220. Thus, the centers of the second electrodes 220 in the first direction DR1 may overlap with the centers of the second auxiliary electrodes 240*s*1 in the first direction DR1. In addition, the centers of the second electrodes 220 in the second direction DR2 may overlap with the centers of the second auxiliary electrodes 240s1 in the second direction DR2.

Referring to FIGS. 16, 18A, and 18B, each of the first auxiliary electrodes 230s included in the third electrode 230 may include a third-first pattern 231 and a third-second pattern 232. The third-first pattern 231 and the third-second pattern 232 may be disposed at (e.g., in or on) different layers from each other. The third-first pattern 231 and the third-second pattern 232 may be electrically connected with each other through a second contact CNb. The third-first pattern 231 may be included in the first conductive layer 202SU, and the third-second pattern 232 may be included in the second conductive layer 204SU.

In an embodiment of the present disclosure, a portion of the third-first pattern 231 may overlap with a portion of each of the first divided electrodes 210dv1 and 210dv2. Accordingly, a coupling capacitance may be provided (e.g., may be formed) between the first electrode 210 and the third electrode 230.

Referring to FIGS. 16, 18A, and 18B, each of the second auxiliary electrodes 240s1 or 240s2 included in the fourth electrode 240 may include a fourth-first pattern 241, a fourth-second pattern 242, and a fourth-third pattern 243. The fourth-second pattern 242 and the fourth-third pattern 243 may be disposed at (e.g., in or on) the same layer as each other, and the fourth-first pattern 241 may be disposed at (e.g., in or on) a layer different from the layer at (e.g., in or on) which the fourth-second pattern 242 and the fourth-third pattern 243 are disposed. The fourth-first pattern 241 and the fourth-second pattern 242 may be electrically connected with each other through a third contact CNc. The fourth-first pattern 241 and the fourth-third pattern 243 may be electrically connected with each other through a fourth contact CNd. The fourth-second pattern 242 and the fourth-third pattern 243 may be included in the first conductive layer 202SU, and the fourth-first pattern 241 may be included in the second conductive layer 204SU.

In an embodiment of the present disclosure, a portion of the fourth-second pattern 242 may overlap with the sensing pattern 221 of each of the second divided electrodes 220dv1 and 220dv2. Accordingly, a coupling capacitor may be defined (e.g., may be provided or formed) between the second electrode 220 and the fourth electrode 240.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted as needed or desired. Because the dummy patterns DMP may be disposed in empty spaces, a probability that specific patterns will be visually recognized due to a reflection of external light may be reduced. In other words, the electronic device 1000 (e.g., refer to FIG. 1A) may be provided in which a visibility depending on a reflection of external light is improved.

The sensor layer 200 may further include a plurality of first trace lines 210t disposed in the peripheral area 200NA, a plurality of first pads PD1 connected to the first trace lines 210t in a one-to-one correspondence, a plurality of second trace lines 220t, and a plurality of second pads PD2 connected to the second trace lines 220t in a one-to-one correspondence.

The first trace lines 210t may be electrically connected to the first electrodes 210 in a one-to-one correspondence. Two first divided electrodes 210dv1 and 210dv2 included in one first electrode 210 may be connected to one first trace line from among the first trace lines 210t. Each of the first trace lines 210t may include a plurality of branch portions for a connection to the two first divided electrodes 210dv1 and 210dv2. In an embodiment of the present disclosure, the two first divided electrodes 210dv1 and 210dv2 may be connected with each other in the sensing area 200A.

The second trace lines 220t may be electrically connected to the second electrodes 220 in a one-to-one correspondence. Two second divided electrodes 220dv1 and 220dv2 included in one second electrode 220 may be connected to one second trace line from among the second trace lines 220t. Each of the second trace lines 220t may include a plurality of branch portions for a connection to the two second divided electrodes 220dv1 and 220dv2. In an embodiment of the present disclosure, the two second divided electrodes 210dv1 and 210dv2 may be connected with each other in the sensing area 200A.

The sensor layer 200 may further include a third trace line 230rt1 disposed in the peripheral area 200NA, a plurality of third pads PD3 connected to one end and an opposite end of the third trace line 230rt1, fourth trace lines 240t-1 and 240t-2, and fourth pads PD4 connected to the fourth trace lines 240t-1 and 240t-2 in a one-to-one correspondence.

The third trace line 230rt1 may be electrically connected with at least one first auxiliary electrode 230s from among the first auxiliary electrodes 230s. In an embodiment of the present disclosure, the third trace line 230rt1 may be electrically connected with all of the first auxiliary electrodes 230s. In other words, the third trace line 230rt1 may be electrically connected to all of the third electrodes 230. The third trace line 230rt1 may include a first line portion 231t that extends in the first direction DR1 and is electrically connected to the third electrodes 230, a second line portion 232t extending from a first end of the first line portion 231t in the second direction DR2, and a third line portion 233t extending from a second end of the first line portion 231t in the second direction DR2.

In an embodiment of the present disclosure, each of a resistance of the second line portion 232t and a resistance of the third line portion 233t may be the same or substantially the same as a resistance of one third electrode from among the third electrodes 230. Accordingly, the second line portion 232t and the third line portion 233t may serve as the third electrodes 230, and the same or substantially the same effect as disposing the third electrodes 230 in the peripheral area 200NA may be obtained. For example, one of the second line portion 232t and/or the third line portion 233t and one of the third electrodes 230 may form a coil. Accordingly, the pen located in an area adjacent to the peripheral area 200NA may also be sufficiently charged by a loop including the second line portion 232t or the third line portion 233t.

In an embodiment of the present disclosure, to adjust the resistance of the second line portion 232t and the resistance of the third line portion 233t, the widths of the second line portion 232t and the third line portion 233t in the first direction DR1 may be adjusted. However, the present disclosure is not limited thereto, and the first to third line portions 231t, 232t, and 233t may have the same or substantially the same width as each other.

The fourth trace lines 240t-1 and 240t-2 may be spaced apart from each other with the sensing area 200A therebetween. The fourth trace line 240t-1 may be electrically connected to at least one second auxiliary electrode 240s1 from among the second auxiliary electrodes 240s1. For example, one end of each of the second auxiliary electrodes 240s1 may be connected to the fourth trace line 240t-1. The fourth trace line 240t-2 may be electrically connected to at least one second auxiliary electrode 240s2 from among the second auxiliary electrodes 240s2. For example, one end of each of the second auxiliary electrodes 240s2 may be connected to the fourth trace line 240t-2.

Referring to FIGS. 18A and 18B, in the second conductive layer 204SU in one sensing unit SU, the area occupied by the components included in the first electrode 210 and the second electrode 220 may be greater than the area occupied by the components included in the third electrode 230 and the fourth electrode 240. A change in a capacitance by the first input 2000 (e.g., refer to FIG. 6A) may be increased as the distance is decreased. Accordingly, a component for sensing the first input 2000 (e.g., refer to FIG. 6A) may be disposed in a relatively larger area in a layer that is adjacent to the surface of the electronic device 1000 (e.g., refer to FIG. 1A). Thus, a touch performance may be improved.

Although FIGS. 18A and 18B illustrate a structure in which the first to fourth electrodes 210, 220, 230, and 240 are distributed and arranged in the two conductive layers 202SU and 204SU, the present disclosure is not particularly limited thereto. For example, the first to fourth electrodes 210, 220, 230, and 240 may be distributed and arranged in three conductive layers or four conductive layers.

In an embodiment of the present disclosure, the third electrode 230 to which a signal is applied in the charging driving mode may be included in a third conductive layer disposed under the first and second conductive layers 202SU and 204SU. For example, the third conductive layer may be provided under the sensor base layer 201. The third conductive layer may be disposed between the sensor base layer 201 and the display layer 100, may be disposed under the display layer 100, or may be included in the display layer 100.

The first, second, and fourth electrodes 210, 220, and 240 may be included in the first and second conductive layers 202SU and 204SU. For example, when the third electrode 230 is implemented as a separate conductive layer, such as in the third conductive layer, the shape of the third electrode 230 may be more freely designed. For example, the third electrode 230 may be provided in a form including a plurality of coils. In addition, the third electrode 230 may be provided more densely by using the third conductive layer. In this case, a pen sensing sensitivity may be improved. In an embodiment of the present disclosure, the fourth electrode 240 instead of the third electrode 230 may be included in the third conductive layer.

Figure 20A:
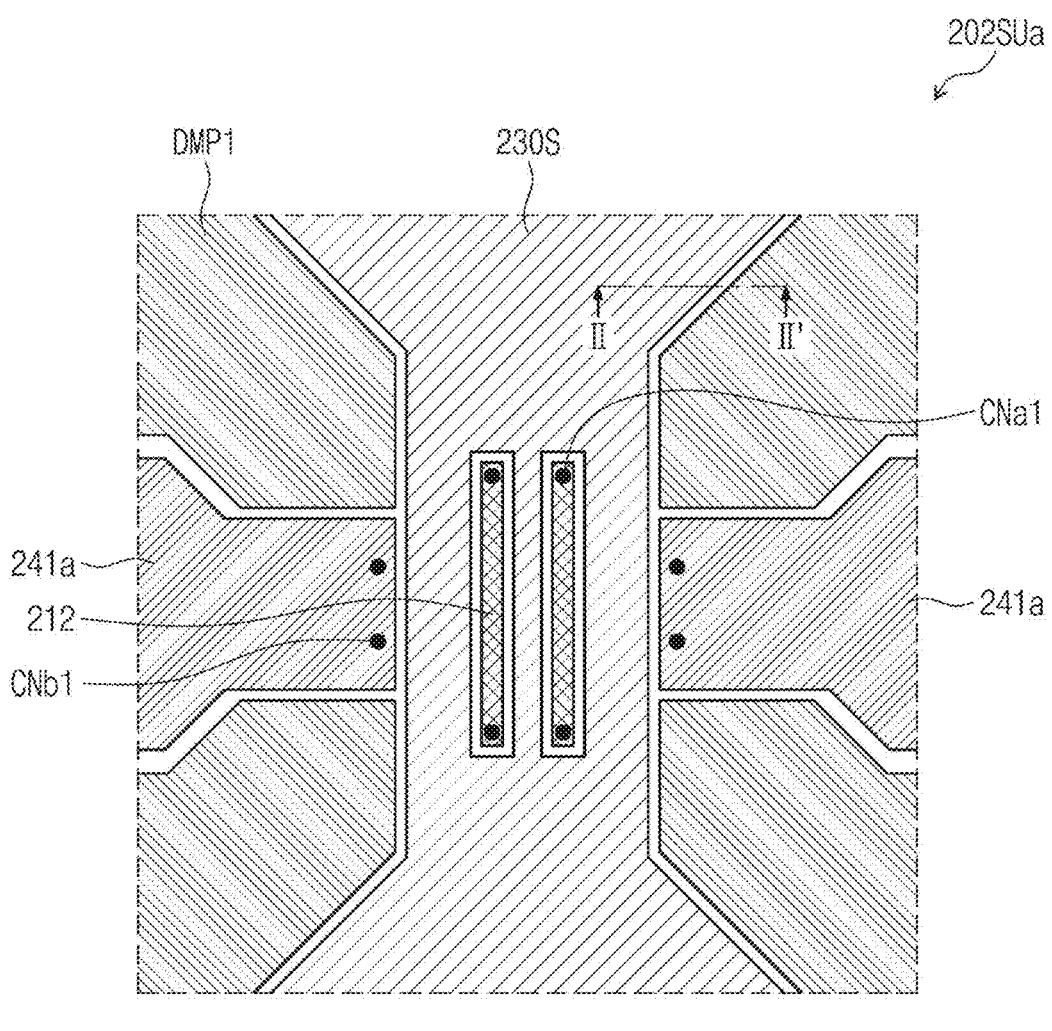
FIG. 20A is a plan view illustrating a first conductive layer of a sensing unit according to an embodiment of the present disclosure.
Figure 20A:
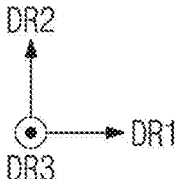
Figure 20B:
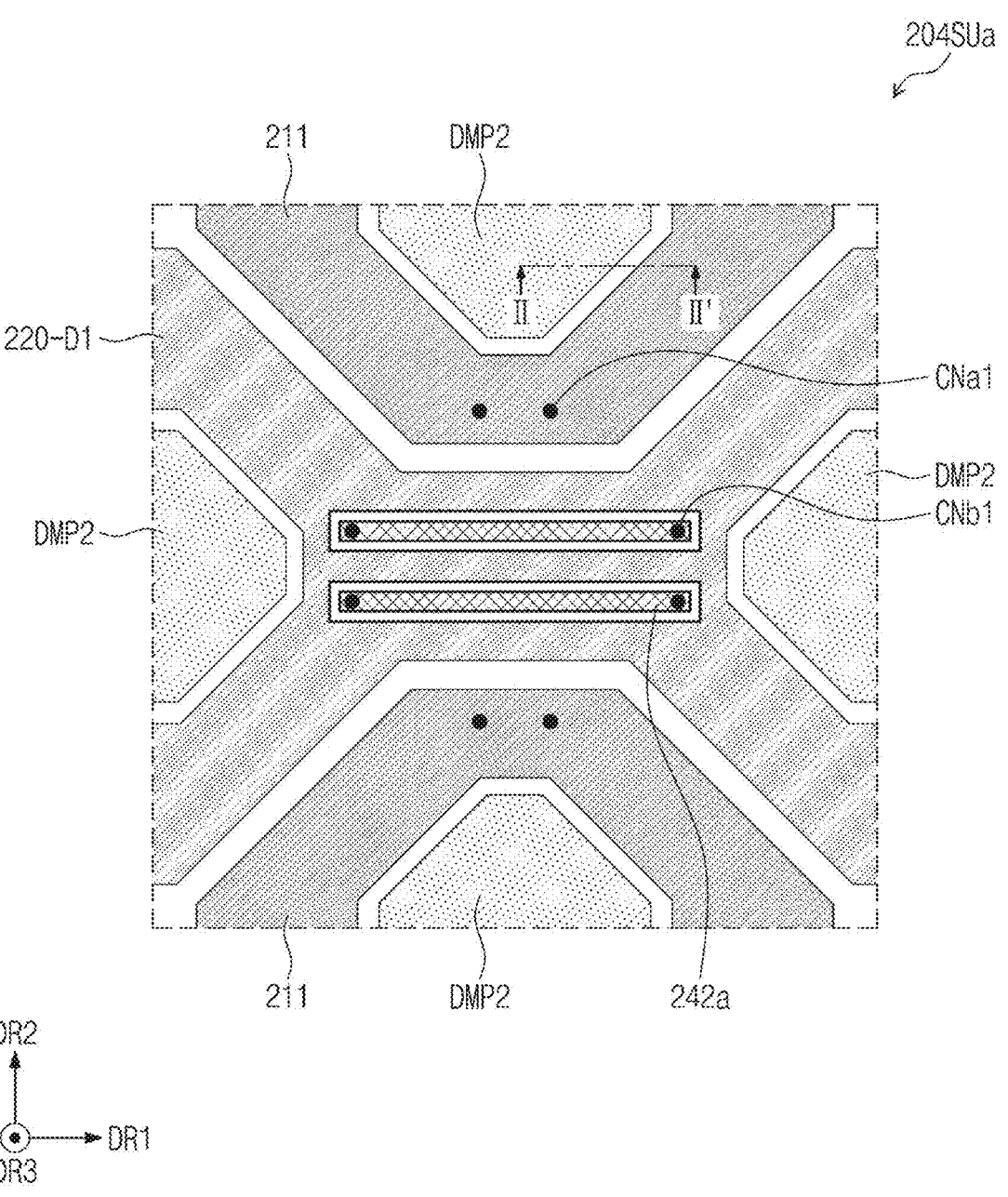
FIG. 20B is a plan view illustrating a second conductive layer of the sensing unit according to an embodiment of the present disclosure.
Figure 20C:
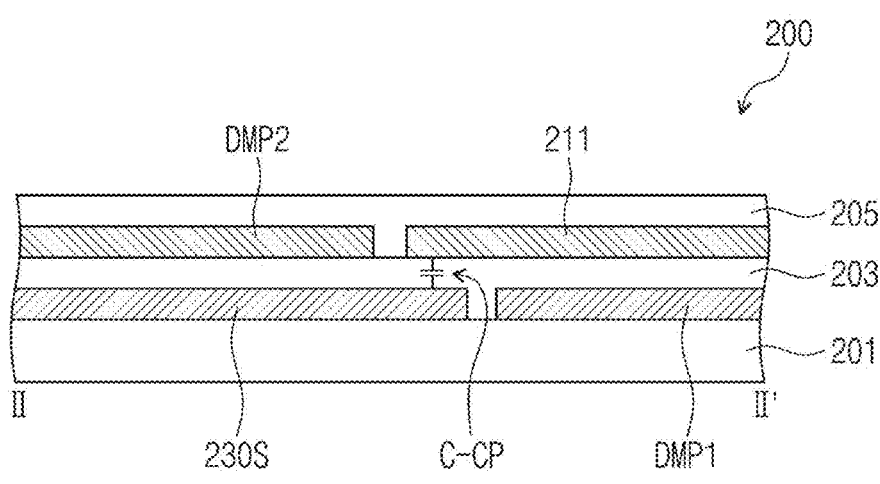
FIG. 20C is a sectional view of the sensor layer taken along the line II-II' illustrated in FIGS. 20A and 20B according to an embodiment of the present disclosure.
Figure 20C:
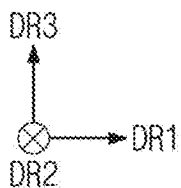

FIG. 20A is a plan view illustrating a first conductive layer 202SUa of a sensing unit according to an embodiment of the present disclosure. FIG. 20B is a plan view illustrating a second conductive layer 204SUa of the sensing unit according to an embodiment of the present disclosure. FIG. 20C is a sectional view of the sensor layer taken along the line II-II' illustrated in FIGS. 20A and 20B according to an embodiment of the present disclosure.

Referring to FIGS. 17, 20A, 20B, and 20C, each of first electrode groups 210G may include a plurality of first sensing patterns 211 and a plurality of first bridge patterns 212. The first sensing patterns 211 may be spaced apart from one another in the second direction DR2. The first bridge patterns 212 may extend in the second direction DR2, and may be electrically connected to the first sensing patterns 211 through a first contact CNa1. Although FIGS. 20A and 20B illustrate an example in which two first sensing patterns 211 that are adjacent to each other are electrically connected with each other by two first bridge patterns 212, the present disclosure is not particularly limited thereto. For example, two first sensing patterns 211 that are adjacent to each other may be electrically connected with each other by one first bridge pattern 212, or may be electrically connected with each other by three or more first bridge patterns 212.

In FIG. 20B, a first divided electrode 220-D1 is illustrated as an example. The first sensing patterns 211 that are adjacent to each other in the second direction DR2 may be spaced apart from each other with the first divided electrode 220-D1 therebetween. In an embodiment of the present disclosure, the first sensing patterns 211, the first divided electrode 220-D1, and the second divided electrode 220-D2 may be included in the second conductive layer 204SUa, and the first bridge patterns 212 may be included in the first conductive layer 202SUa. The first bridge patterns 212 may be insulated from the first divided electrode 220-D1 or the second divided electrode 220-D2 that overlaps with the first bridge patterns 212, and may cross the first divided electrode 220-D1 or the second divided electrode 220-D2.

Each of first auxiliary electrodes 230S included in a third electrode group 230G may extend in the second direction DR2. The first auxiliary electrodes 230S may be included in the first conductive layer 202SUa. One or more holes may be defined in each of the first auxiliary electrodes 230S. One first bridge pattern 212 may be disposed in one hole. Accordingly, the first bridge pattern 212 may be electrically insulated from the first auxiliary electrodes 230S.

Each of second auxiliary electrodes 240S included in a fourth electrode group 240G may include a plurality of second sensing patterns 241a and a plurality of second bridge patterns 242a. The second sensing patterns 241a may be spaced apart from one another in the first direction DR1. The second bridge patterns 242a may extend in the first direction DR1, and may be electrically connected to the second sensing patterns 241a through a second contact CNb1.

Although FIGS. 20A and 20B illustrate an example in which two second sensing patterns 241a that are adjacent to each other are electrically connected with each other by two second bridge patterns 242a, the present disclosure is not particularly limited thereto. For example, two second sensing patterns 241a that are adjacent to each other may be electrically connected with each other by one second bridge pattern 242a, or may be electrically connected with each other by three or more second bridge patterns 242a.

In an embodiment of the present disclosure, the second sensing patterns 241a and the first auxiliary electrodes 230S may be included in the first conductive layer 202SUa, and the second bridge patterns 242a may be included in the second conductive layer 204SUa. The second bridge patterns 242a may be insulated from the first auxiliary electrodes 230S overlapping with the second bridge patterns 242a, and may cross the first auxiliary electrodes 230S.

Referring to FIGS. 20A and 20B, in the second conductive layer 204SUa in one sensing unit SU, an area occupied by the components included in the first electrode group 210G and the second electrode group 220G may be greater than the area occupied by the components included in the third electrode group 230G and the fourth electrode group 240G. A change in a capacitance by the first input 2000 (e.g., refer to FIG. 6A) may be increased as the distance is decreased. Accordingly, a component for sensing the first input 2000 (e.g., refer to FIG. 6A) may be disposed in a relatively larger area in a layer that is adjacent to the surface of the electronic device 1000 (e.g., refer to FIG. 1A). Thus, a touch performance may be improved.

In an embodiment of the present disclosure, the first conductive layer 202SUa may further include first dummy patterns DMP1, and the second conductive layer 204SUa may further include second dummy patterns DMP2. The first dummy patterns DMP1 and the second dummy patterns DMP2 may be floated, or may be electrically floated. The first dummy patterns DMP1 and the second dummy patterns DMP2 may each be divided into a plurality of conductive patterns. For example, one first dummy pattern DMP1 may include a plurality of floating dummy patterns that are separated or electrically isolated from one another.

Referring to FIG. 20C, the area of the first auxiliary electrode 230S and the area of the first sensing pattern 211 may be adjusted. For example, a position of the boundary between the first auxiliary electrode 230S and the first dummy patterns DMP1 and a position of the boundary between the first sensing pattern 211 and the second dummy patterns DMP2 may be adjusted. In this case, the area of the overlapping area between the first auxiliary electrode 230S and the first sensing pattern 211 may be adjusted, and the magnitude of the capacitance of a coupling capacitor C-CP between the first auxiliary electrode 230S and the first sensing pattern 211 may be adjusted accordingly.

Figure 21A:
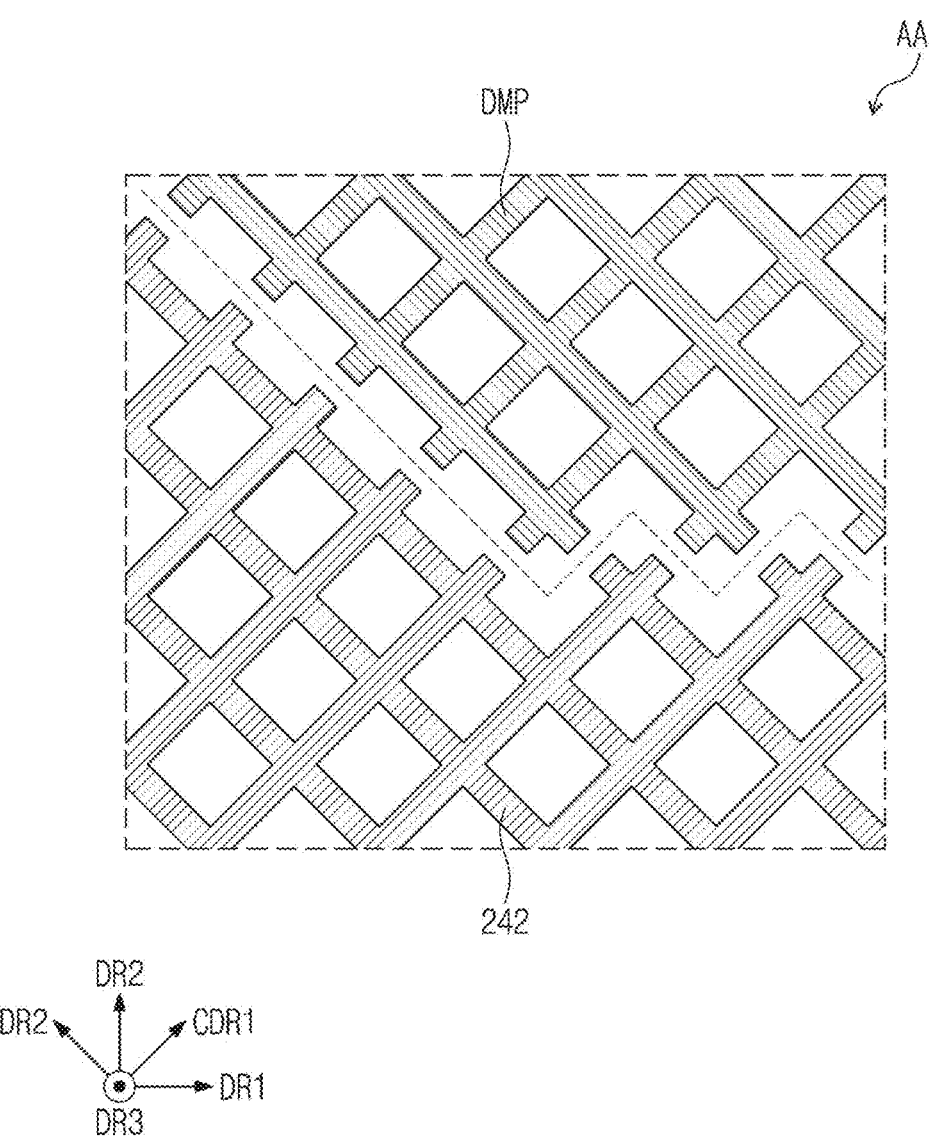
FIG. 21A is an enlarged plan view of the area AA' illustrated in FIG. 18A.
Figure 21B:
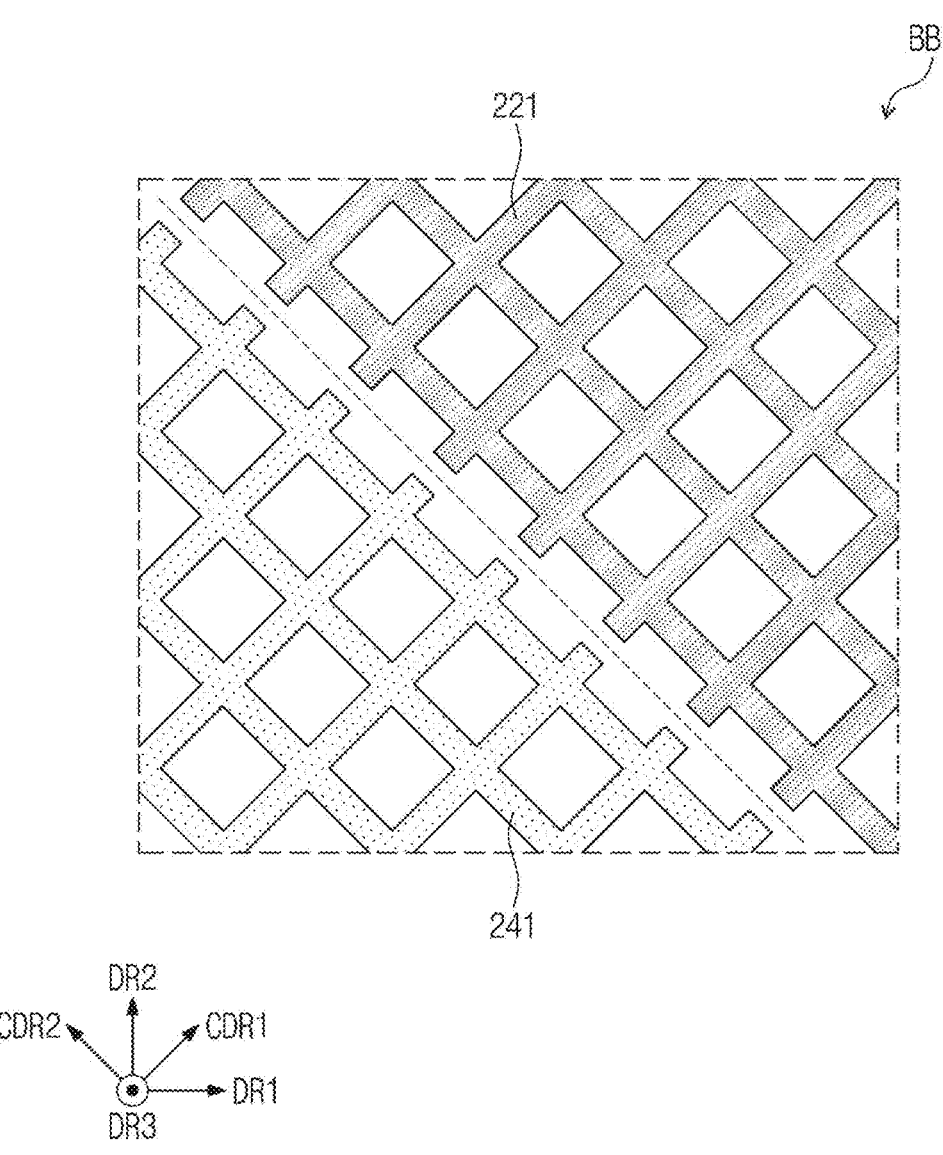
FIG. 21B is an enlarged plan view of the area BB' illustrated in FIG. 18B.

FIG. 21A is an enlarged plan view of the area AA' illustrated in FIG. 18A. FIG. 21B is an enlarged plan view of the area BB' illustrated in FIG. 18B.

Referring to FIGS. 18A, 18B, 21A, and 21B, the first electrodes 210, the second electrodes 220, the third electrodes 230, the fourth electrodes 240, and the dummy patterns DMP may each have a mesh structure. The mesh structure may include a plurality of mesh lines. The plurality of mesh lines may have straight-line shapes extending in suitable directions (e.g., certain or predetermined directions), and may be connected with one another. Openings where the mesh structure is not disposed may be defined (e.g., may be provided or formed) in each of the first electrodes 210, the second electrodes 220, the third electrodes 230, the fourth electrodes 240, and the dummy patterns DMP.

FIGS. 21A and 21B illustrate an example in which the mesh structure includes mesh lines extending in a first crossing direction CDR1 that crosses the first direction DR1 and the second direction DR2, and mesh lines extending in a second crossing direction CDR2 that crosses the first crossing direction CDR1. However, the extension directions of the mesh lines constituting the mesh structure are not particularly limited to those illustrated in FIGS. 21A and 21B. For example, the mesh structure may include mesh lines (e.g., may only include mesh lines) extending in the first direction DR1 and the second direction DR2, or may include mesh lines extending in the first direction DR1, the second direction DR2, the first crossing direction CDR1, and the second crossing direction CDR2. In other words, the mesh structure may be variously modified as needed or desired.

Figure 22:
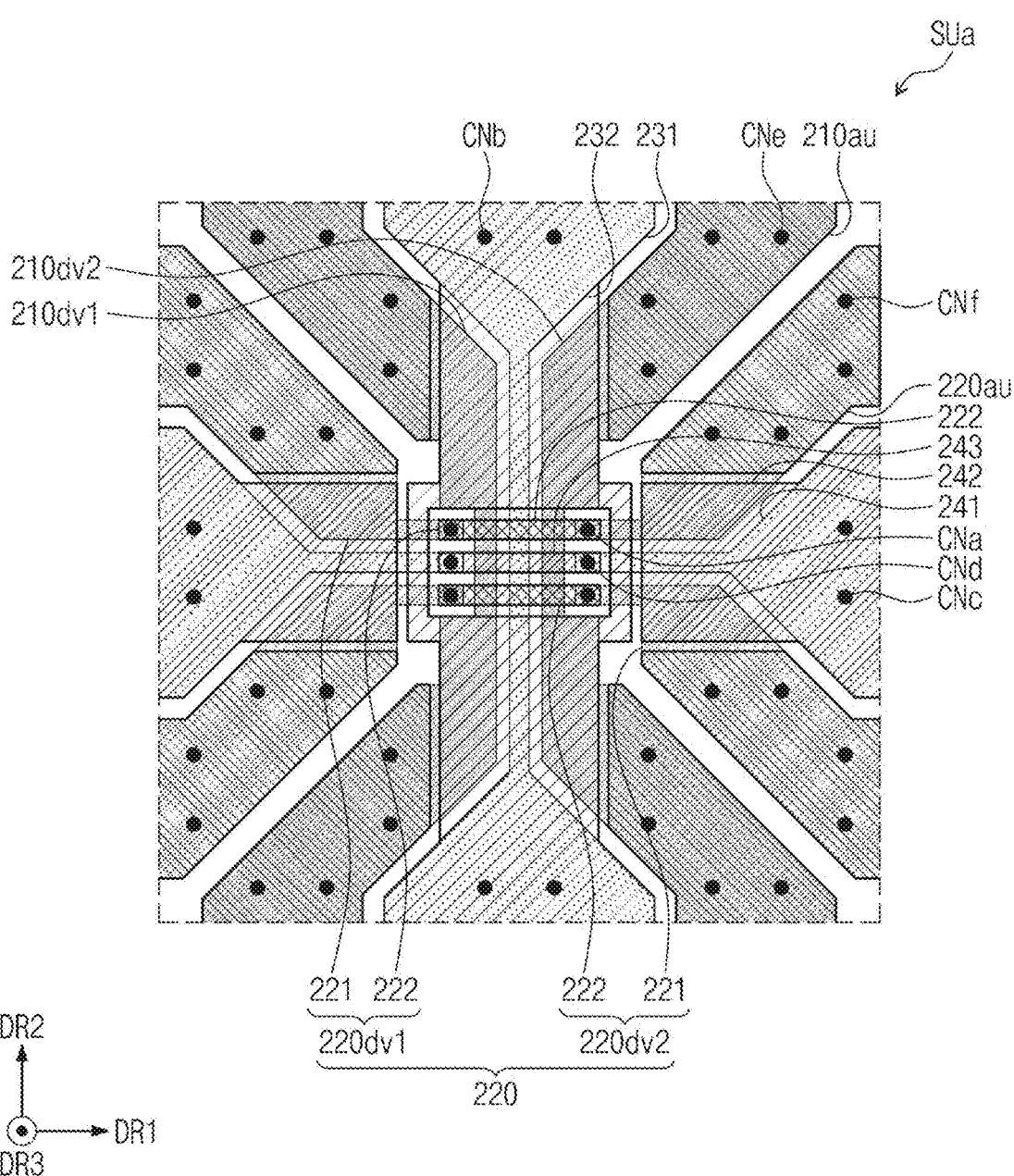
FIG. 22 is an enlarged plan view illustrating one sensing unit according to an embodiment of the present disclosure.
Figure 23A:
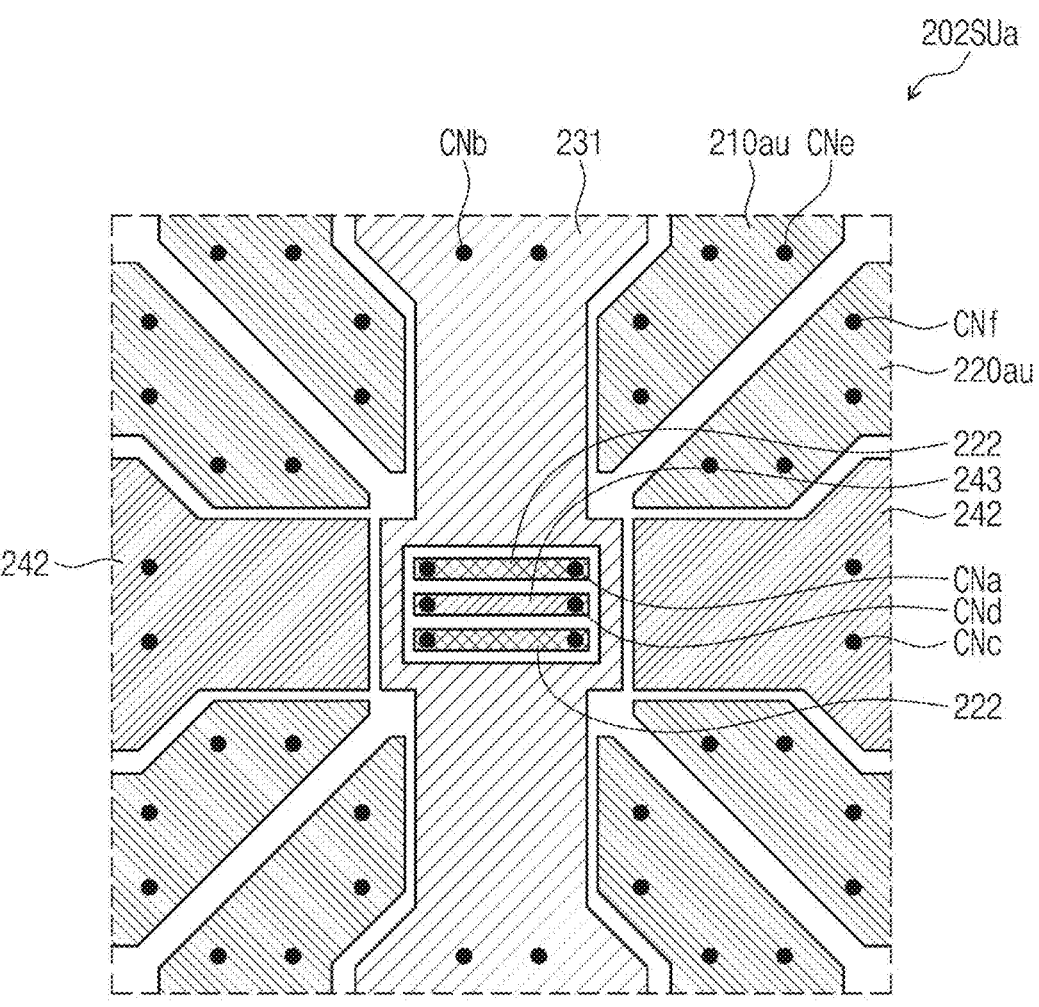
FIG. 23A is a plan view illustrating a first conductive layer of the sensing unit according to an embodiment of the present disclosure.
Figure 23A:
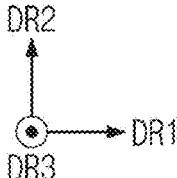
Figure 23B:
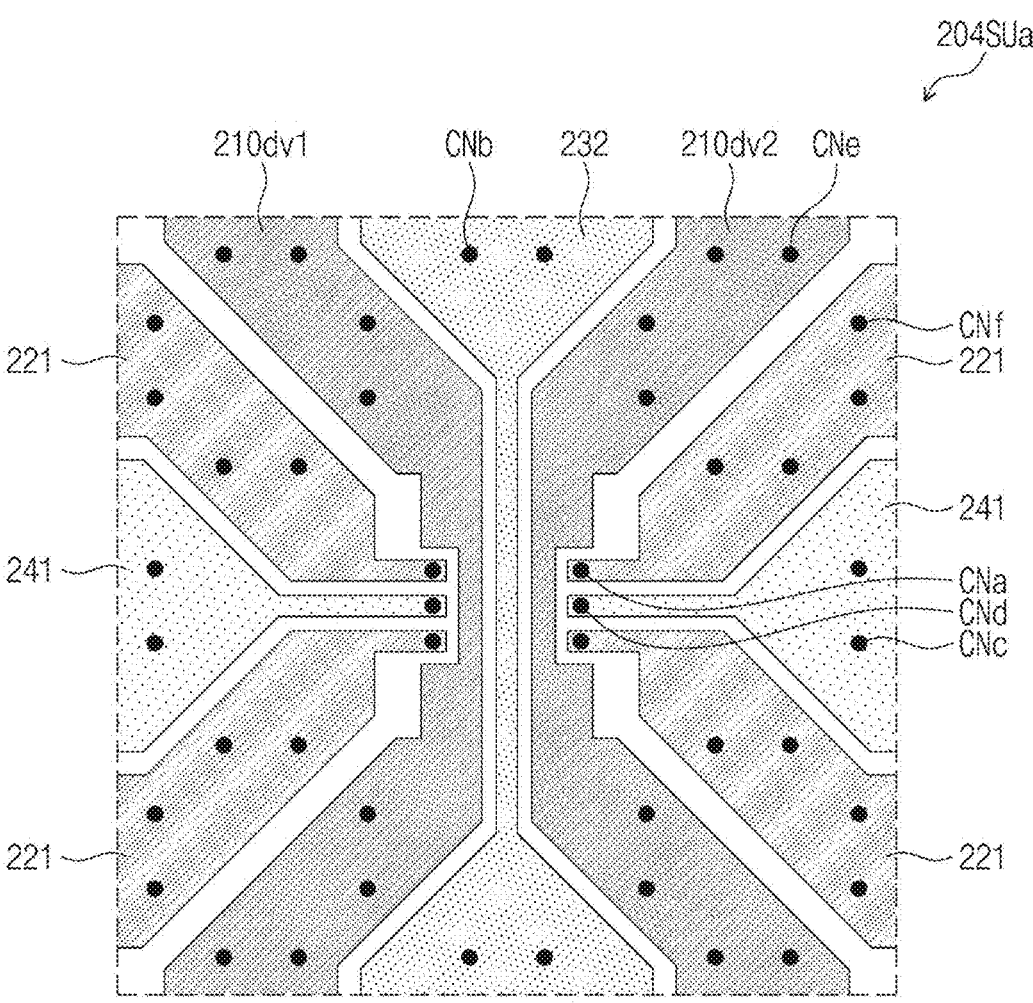
FIG. 23B is a plan view illustrating a second conductive layer of the sensing unit according to an embodiment of the present disclosure.
Figure 23B:
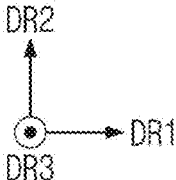

FIG. 22 is an enlarged plan view illustrating one sensing unit SUa according to an embodiment of the present disclosure. FIG. 23A is a plan view illustrating a first conductive layer 202SUa of the sensing unit SUa according to an embodiment of the present disclosure. FIG. 23B is a plan view illustrating a second conductive layer 204SUa of the sensing unit SUa according to an embodiment of the present disclosure.

Referring to FIGS. 22, 23A, and 23B, the dummy patterns DMP described above with reference to FIG. 18A may be electrically connected with a first electrode 210 or a second electrode 220. For example, first auxiliary electrode patterns 210au and second auxiliary electrode patterns 220au may be disposed in the first conductive layer 202SUa. The first auxiliary electrode patterns 210au may overlap with first divided electrodes 210dv1 and 210dv2, and may be electrically connected with each other through fifth contacts CNe. The second auxiliary electrode patterns 220au may overlap with sensing patterns 221, and may be electrically connected with each other through sixth contacts CNf.

Figure 24:
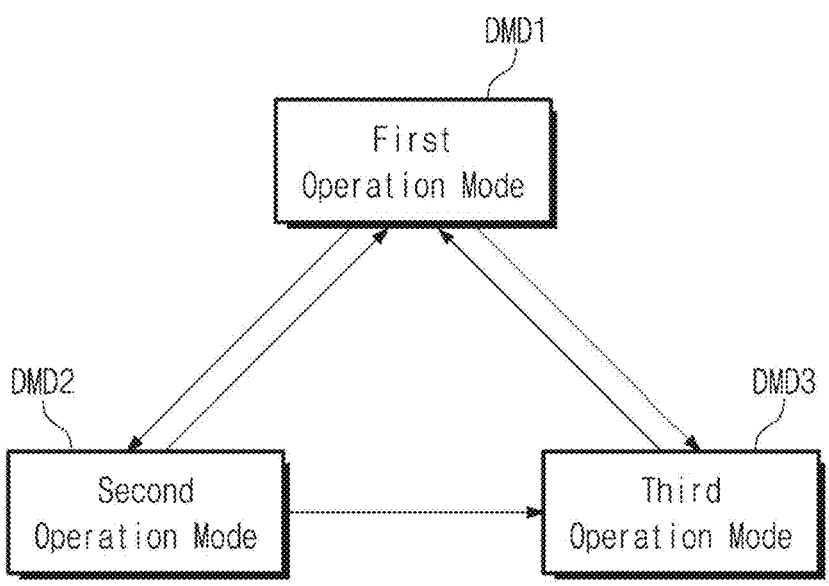
FIG. 24 is a view illustrating an operation of a sensor driver according to an embodiment of the present disclosure.

FIG. 24 is a view illustrating an operation of the sensor driver 200C according to an embodiment of the present disclosure. For example, the sensor driver 200C may correspond to the sensor driver 200C described above with reference to FIG. 6A.

Referring to FIGS. 6A and 24, the sensor driver 200C may be selectively driven in one of a first operation mode DMD1, a second operation mode DMD2, and a third operation mode DMD3.

The first operation mode DMD1 may be referred to as a touch and pen standby mode. The second operation mode DMD2 may be referred to as a touch activation and pen standby mode. The third operation mode DMD3 may be referred to as a pen activation mode. The first operation mode DMD1 may be a mode in which the sensor driver 200C waits for the first input 2000 and the second input 3000. The second operation mode DMD2 may be a mode in which the sensor driver 200C senses the first input 2000 and waits for the second input 3000. The third operation mode DMD3 may be a mode in which the sensor driver 200C senses the second input 3000.

In an embodiment of the present disclosure, the sensor driver 200C may first be driven in the first operation mode DMD1. When the first input 2000 is sensed in the first operation mode DMD1, the sensor driver 200C may be switched (e.g., changed) to the second operation mode DMD2. As another example, when the second input 3000 is sensed in the first operation mode DMD1, the sensor driver 200C may be switched (e.g., changed) to the third operation mode DMD3.

In an embodiment of the present disclosure, when the second input 3000 is sensed in the second operation mode DMD2, the sensor driver 200C may be switched to the third operation mode DMD3. When the first input 2000 is released (e.g., not sensed) in the second operation mode DMD2, the sensor driver 200C may be switched to the first operation mode DMD1. When the second input 3000 is released (e.g., not sensed) in the third operation mode DMD3, the sensor driver 200C may be switched to the first operation mode DMD1.

Figure 25:
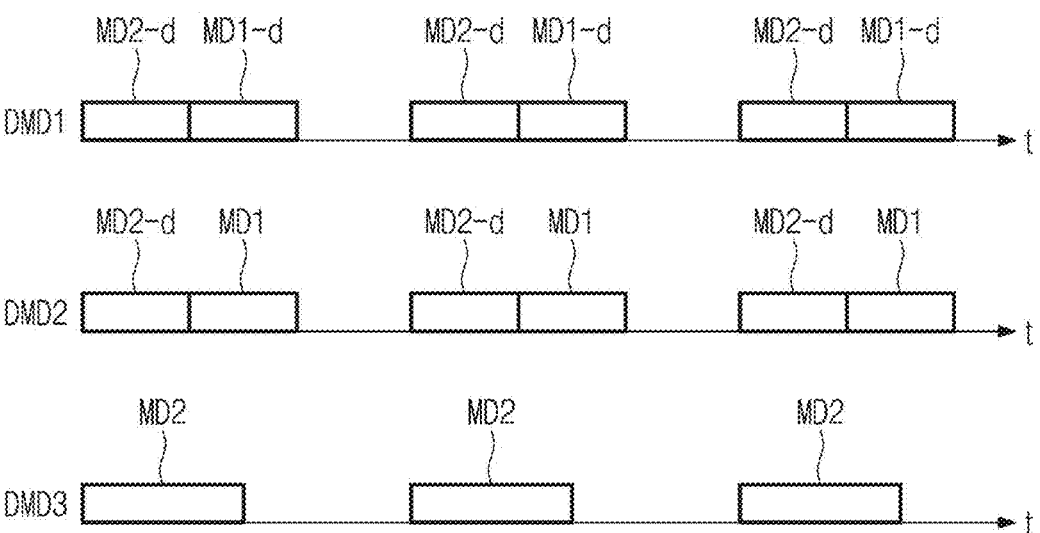
FIG. 25 is a view illustrating an operation of the sensor driver according to an embodiment of the present disclosure.

FIG. 25 is a view illustrating an operation of the sensor driver 200C according to an embodiment of the present disclosure.

Referring to FIGS. 6A, 24, and 25, operations in the first to third operation modes DMD1, DMD2, and DMD3 are illustrated in the order of time (t).

In the first operation mode DMD1, the sensor driver 200C may be repeatedly driven in a second mode MD2-d and a first mode MD1-d. During the second mode MD2-d, the sensor layer 200 may be scan-driven to detect the second input 3000. During the first mode MD1-d, the sensor layer 200 may be scan-driven to detect the first input 2000. Although FIG. 24 illustrates an example that the sensor driver 200C operates in the first mode MD1-d continuously after the second mode MD2-d, the order is not limited thereto.

In the second operation mode DMD2, the sensor driver 200C may be repeatedly driven in a second mode MD2-d and a first mode MD1. During the second mode MD2-d, the sensor layer 200 may be scan-driven to detect the second input 3000. During the first mode MD1, the sensor layer 200 may be scan-driven to detect the coordinates by the first input 2000.

In the third operation mode DMD3, the sensor driver 200C may be driven in a second mode MD2. During the second mode MD2, the sensor layer 200 may be scan-driven to detect the coordinates by the second input 3000. In the third operation mode DMD3, the sensor driver 200C may not operate in the first mode MD1-D or MD1 until the second input 3000 is released (e.g., not sensed).

Referring to FIG. 16 together, in the first mode MD1-*d* and the first mode MD1, the third electrodes 230 and the fourth electrodes 240 may all be grounded. Accordingly, a touch noise may be prevented or substantially prevented from being introduced through the third electrodes 230 and the fourth electrodes 240.

In the second mode MD2-*d* of the first operation mode DMD1 or the second operation mode DMD2 and the second mode MD2 of the third operation mode DMD3, first ends of the third electrodes 230 and the fourth electrodes 240 may all be floated. In addition, in the second mode MD2-*d* and the second mode MD2, second ends of the third electrodes 230 and the fourth electrodes 240 may all be grounded or floated. Accordingly, a compensation of a sensing signal may be maximized or increased by the coupling between the first electrodes 210 and the third electrodes 230 and the coupling between the second electrodes 220 and the fourth electrodes 240.

As described above, two coils may be disposed in the lower conductive layer to overlap with each other, and one connecting pin may be commonly connected to the two coils. Accordingly, the total number of connecting pins provided in the lower conductive layer may be decreased.

In addition, because the number of connecting pins may be decreased, the number of elements connected to the lower conductive layer and the sizes of parts connected thereto may be decreased, and thus, a configuration of the electronic device may be simplified.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a display layer;

a sensor layer over the display layer; and a lower conductive layer under the sensor layer, and comprising:

first coils spaced from one another along a first direction;

second coils spaced from one another along the first direction, each of the second coils crossing two first coils adjacent to each other from among the first coils; and connecting pins connecting ends of the first coils and ends of the second coils to one another.

2. The electronic device of claim 1, wherein a first-first coil from among the two first coils comprises:

a first-first extension part extending in a second direction crossing the first direction;

a first-second extension part spaced from the first-first extension part in the first direction; and a first-first connecting part connecting the first-first extension part and the first-second extension part to each other, wherein a first-second coil from among the two first coils comprises:

a second-first extension part extending in the second direction crossing the first direction;

a second-second extension part spaced from the second-first extension part in the first direction; and a first-second connecting part connecting the second-first extension part and the second-second extension part to each other, and wherein each of the second coils comprises:

a third extension part extending in the second direction crossing the first direction;

a fourth extension part spaced from the third extension part in the first direction; and a second connecting part connecting the third extension part and the fourth extension part to each other.

3. The electronic device of claim 2, wherein the first-second extension part and the third extension part are connected to a first connecting pin from among the connecting pins, and wherein the second-first extension part and the fourth extension part are connected to a second connecting pin from among the connecting pins.

4. The electronic device of claim 2, wherein the second connecting part crosses the first-second extension part and the second-first extension part.

5. The electronic device of claim 4, wherein the second connecting part comprises:

a plurality of body portions; and a bridge portion electrically connecting the body portions to each other, wherein the body portions, the first-second extension part, and the second-first extension part are located on a first layer, and wherein the bridge portion is located on a second layer different from the first layer.

6. The electronic device of claim 5, wherein the sensor layer comprises:

a sensor base layer; and a conductive layer on the sensor base layer, and wherein the bridge portion is located on the sensor base layer.

7. The electronic device of claim 4, wherein a gap between the second-first extension part and the second-second extension part is equal to a gap between the third extension part and the fourth extension part.

8. The electronic device of claim 4, wherein a gap between the first-first extension part and the first-second extension part is equal to at least one of a gap between the third extension part and the fourth extension part or a gap between the second-first extension part and the second-second extension part.

9. The electronic device of claim 4, wherein a first sub-gap between the first-second extension part and the third extension part is equal to a second sub-gap between the second-first extension part and the fourth extension part.

10. The electronic device of claim 9, wherein a third sub-gap between the first-second extension part and the second-first extension part is equal to each of the first and second sub-gaps.

11. The electronic device of claim 2, wherein the lower conductive layer comprises:
   an effective area; and
   a non-effective area surrounding around the effective area,
   wherein the first-first connecting part, the first-second connecting part, and the second connecting part do not overlap with the effective area in a plan view, and
   wherein the connecting pins do not overlap with the effective area in a plan view.

12. The electronic device of claim 11, wherein a first outermost coil adjacent to a first side of the effective area from among the first coils comprises a first-first outermost extension part and a first-second outermost extension part, the first-first outermost extension part does not overlap with the effective area, and the first-second outermost extension part overlaps with the effective area, and
   wherein a second outermost coil adjacent to a second side of the effective area from among the first coils comprises a second-first outermost extension part and a second-second outermost extension part, the second-first outermost extension part overlaps with the effective area, and the second-second outermost extension part does not overlap with the effective area.

13. The electronic device of claim 12, wherein the connecting pins comprise:
   a first outermost connecting pin connected to the first-first outermost extension part; and
   a second outermost connecting pin connected to the second-second outermost extension part.

14. The electronic device of claim 1, wherein the lower conductive layer further comprises a dummy electrode that does not overlap with the first coils and the second coils.

15. The electronic device of claim 14, wherein the dummy electrode comprises a plurality of dummy bar patterns extending in a second direction crossing the first direction, and located along the first direction.

16. The electronic device of claim 14, wherein the dummy electrode comprises a plurality of dummy electrode patterns located in a matrix form along the first direction and a second direction crossing the first direction.

17. The electronic device of claim 14, wherein the dummy electrode is configured to be electrically floated.

18. The electronic device of claim 1, wherein the lower conductive layer further comprises:
   third coils spaced from one another along a second direction crossing the first direction;
   fourth coils spaced from one another along the second direction, each of the fourth coils crossing two third coils adjacent to each other from among the third coils; and
   connecting pins connecting ends of the third coils and ends of the fourth coils to one another.

19. The electronic device of claim 18, wherein the third coils and the fourth coils cross the first coils and the second coils.

20. The electronic device of claim 1, wherein the lower conductive layer is located under the display layer.

21. The electronic device of claim 1, wherein the lower conductive layer is located between the display layer and the sensor layer.

22. The electronic device of claim 1, wherein the sensor layer comprises:
   a plurality of first electrodes along the first direction, and extending in a second direction crossing the first direction;
   a plurality of second electrodes along the second direction, and extending in the first direction;
   a plurality of third electrodes along the first direction, extending in the second direction, and overlapping with the plurality of first electrodes; and
   a plurality of fourth electrodes along the second direction, extending in the first direction, and overlapping with the plurality of second electrodes.

23. The electronic device of claim 22, further comprising:
   a sensor driver configured to drive the sensor layer,
   wherein the sensor driver is configured to selectively operate in a first mode to sense a touch input, or in a second mode to sense an input of a pen, and
   wherein the second mode comprises:
      a sensing driving mode in which the sensor layer is configured to sense the input of the pen; and
      a charging driving mode in which the lower conductive layer is configured to charge the pen.

24. The electronic device of claim 1, further comprising:
   a sensor driver configured to drive the lower conductive layer,
   wherein the sensor driver is configured to operate in a sensing driving mode to sense an input of a pen, or in a charging driving mode to charge the pen, and
   wherein the sensor driver is configured to alternately drive the lower conductive layer in the sensing driving mode and the charging driving mode.

25. The electronic device of claim 24, wherein the sensor driver comprises:
   a charging circuit configured to apply a first charging signal to one of two connecting pins selected from among the connecting pins, and apply a second charging signal to another one of the two connecting pins in the charging driving mode;
   a sensor circuit electrically connected to the connecting pins, and configured to sense currents induced in the first and second coils by the pen in the sensing driving mode;
   first switching elements between the connecting pins and the charging circuit; and
   second switching elements between the connecting pins and the sensor circuit.

26. The electronic device of claim 25, wherein the first and second charging signals are alternating current signals having opposite phases from each other.

27. An electronic device comprising:
   a display layer;
   a sensor layer over the display layer;
   a lower conductive layer under the sensor layer; and
   a sensor driver configured to drive the sensor layer and the lower conductive layer, and operate in a pen sensing mode,
   wherein the lower conductive layer comprises:
      first coils spaced from one another along a first direction;

second coils spaced from one another along the first direction, each of the second coils crossing two first coils adjacent to each other from among the first coils; and connecting pins connecting ends of the first coils and ends of the second coils to each other, and wherein the pen sensing mode comprises:

a sensing driving mode in which the sensing layer is configured to sense an input of a pen; and a charging driving mode in which the lower conductive layer is configured to charge the pen.

28. The electronic device of claim 27, wherein the sensor layer comprises:

a plurality of first electrodes along the first direction, and extending in a second direction crossing the first direction;

a plurality of second electrodes along the second direction, and extending in the first direction;

a plurality of third electrodes along the first direction, extending in the second direction, and overlapping with the plurality of first electrodes; and a plurality of fourth electrodes along the second direction, extending in the first direction, and overlapping with the plurality of second electrodes.

29. The electronic device of claim 28, wherein the sensor driver is configured to additionally operate in a touch sensing mode to sense a touch input, wherein the sensor driver is configured to sense the touch input using the first and second electrodes in the touch sensing mode, and wherein the sensor driver is configured to sense the input of the pen using the third and fourth electrodes in the sensing driving mode.

30. The electronic device of claim 27, wherein the sensor driver comprises:

a charging circuit configured to apply a first charging signal to one of two connecting pins selected from the connecting pins, and apply a second charging signal to another one of the two connecting pins, in the charging driving mode;

a sensor circuit electrically connected to the connecting pins, and configured to sense currents induced in the first and second coils by the pen in the sensing driving mode;

first switching elements between the connecting pins and the charging circuit; and second switching elements between the connecting pins and the sensor circuit.

31. The electronic device of claim 27, wherein a first-first coil of the two first coils comprises:

a first-first extension part extending in a second direction crossing the first direction;

a first-second extension part spaced from the first-first extension part in the first direction; and a first-first connecting part connecting the first-first extension part and the first-second extension part to each other, wherein a first-second coil of the two first coils comprises:

a second-first extension part extending in the second direction crossing the first direction;

a second-second extension part spaced from the second-first extension part in the first direction; and a first-second connecting part connecting the second-first extension part and the second-second extension part to each other, and wherein each of the second coils comprises:

a third extension part extending in the second direction crossing the first direction;

a fourth extension part spaced from the third extension part in the first direction; and a second connecting part connecting the third extension part and the fourth extension part to each other.

32. The electronic device of claim 31, wherein the first-second extension part and the third extension part are connected to a first connecting pin from among the connecting pins, and wherein the second-first extension part and the fourth extension part are connected to a second connecting pin from among the connecting pins.

* * * * *